United States Patent
Hinton et al.

(10) Patent No.: US 7,698,375 B2
(45) Date of Patent: Apr. 13, 2010

(54) METHOD AND SYSTEM FOR PLUGGABILITY OF FEDERATION PROTOCOL RUNTIMES FOR FEDERATED USER LIFECYCLE MANAGEMENT

(75) Inventors: Heather Maria Hinton, Austin, TX (US); Dolapo Martin Falola, Austin, TX (US); Anthony Scott Moran, Santa Cruz, CA (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 10/896,353

(22) Filed: Jul. 21, 2004

(65) Prior Publication Data

US 2006/0020679 A1 Jan. 26, 2006

(51) Int. Cl.
*G06F 15/16* (2006.01)
(52) U.S. Cl. ............... 709/217; 709/203; 709/219; 709/227; 709/230
(58) Field of Classification Search ............ 709/203, 709/217–219, 223–229, 231
See application file for complete search history.

(56) References Cited

U.S. PATENT DOCUMENTS

| 7,016,875 | B1 * | 3/2006 | Steele et al. ............ 705/44 |
| 7,221,935 | B2 * | 5/2007 | Barriga-Caceres et al. ............ 455/414.1 |
| 2003/0172172 | A1 * | 9/2003 | de Bonet et al. ............ 709/230 |

* cited by examiner

*Primary Examiner*—Shawki S Ismail
(74) *Attorney, Agent, or Firm*—Jeffrey S. LaBaw; David H. Judson

(57) ABSTRACT

A method and a system are presented in which federated domains interact within a federated environment. Domains within a federation can initiate federated operations for a user at other federated domains. A point-of-contact server within a domain relies upon a trust proxy within the domain to manage trust relationships between the domain and the federation. The point-of-contact server receives incoming requests directed to the domain and interfaces with a first application server and a second application server, wherein the first application server responds to requests for access to controlled resources and the second application server responds to requests for access to federated user lifecycle management functions, which are implemented using one or more pluggable modules that interface with the second application server.

41 Claims, 16 Drawing Sheets

METHOD AND SYSTEM FOR PLUGGABILITY OF FEDERATION PROTOCOL RUNTIMES FOR FEDERATED USER LIFECYCLE MANAGEMENT

CROSS-REFERENCE TO RELATED APPLICATIONS

The present application is related to the following applications with a common assignee:

U.S. application Ser. No. 10/896,316, filed Jul. 21, 2004, titled "METHOD AND SYSTEM FOR ENABLING FEDERATED USER LIFECYCLE MANAGEMENT";

U.S. application Ser. No. 10/896,286, filed Jul. 21, 2004, titled "METHOD AND SYSTEM FOR ENABLING TRUST INFRASTRUCTURE SUPPORT FOR FEDERATED USER LIFECYCLE MANAGEMENT"; and U.S. application Ser. No. 10/896,285, filed Jul. 21, 2004, titled "METHOD AND SYSTEM FOR ESTABLISHING FEDERATION RELATIONSHIPS THROUGH IMPORTED CONFIGURATION FILES".

BACKGROUND OF THE INVENTION

1. Field of the Invention

The present invention relates to an improved data processing system and, in particular, to a method and apparatus for multicomputer data transferring. Still more particularly, the present invention is directed networked computer systems.

2. Description of Related Art

Enterprises generally desire to provide authorized users with secure access to protected resources in a user-friendly manner throughout a variety of networks, including the Internet. Although providing secure authentication mechanisms reduces the risks of unauthorized access to protected resources, those authentication mechanisms may become barriers to accessing protected resources. Users generally desire the ability to change from interacting with one application to another application without regard to authentication barriers that protect each particular system supporting those applications.

As users get more sophisticated, they expect that computer systems coordinate their actions so that burdens on the user are reduced. These types of expectations also apply to authentication processes. A user might assume that once he or she has been authenticated by some computer system, the authentication should be valid throughout the user's working session, or at least for a particular period of time, without regard to the various computer architecture boundaries that are almost invisible to the user. Enterprises generally try to fulfill these expectations in the operational characteristics of their deployed systems, not only to placate users but also to increase user efficiency, whether the user efficiency is related to employee productivity or customer satisfaction.

More specifically, with the current computing environment in which many applications have a Web-based user interface that is accessible through a common browser, users expect more user-friendliness and low or infrequent barriers to movement from one Web-based application to another. In this context, users are coming to expect the ability to jump from interacting with an application on one Internet domain to another application on another domain without regard to the authentication barriers that protect each particular domain. However, even if many systems provide secure authentication through easy-to-use, Web-based interfaces, a user may still be forced to reckon with multiple authentication processes that stymie user access across a set of domains. Subjecting a user to multiple authentication processes in a given time frame may significantly affect the user's efficiency.

For example, various techniques have been used to reduce authentication burdens on users and computer system administrators. These techniques are generally described as "single-sign-on" (SSO) processes because they have a common purpose: after a user has completed a sign-on operation, i.e. been authenticated, the user is subsequently not required to perform another authentication operation. Hence, the goal is that the user would be required to complete only one authentication process during a particular user session.

To reduce the costs of user management and to improve interoperability among enterprises, federated computing spaces have been created. A federation is a loosely coupled affiliation of enterprises which adhere to certain standards of interoperability; the federation provides a mechanism for trust among those enterprises with respect to certain computational operations for the users within the federation. For example, a federation partner may act as a user's home domain or identity provider. Other partners within the same federation may rely on the user's identity provider for primary management of the user's authentication credentials, e.g., accepting a single-sign-on token that is provided by the user's identity provider.

As enterprises move to support federated business interactions, these enterprises should provide a user experience that reflects the increased cooperation between two businesses. As noted above, a user may authenticate to one party that acts as an identity provider and then single-sign-on to a federated business partner that acts as a service provider. In conjunction with this single-sign-on functionality, additional user lifecycle functionality, such as account linking/de-linking and single-sign-off, should also be supported, particularly in a manner such that this federated user lifecycle management (FULM) functionality does not require a change of infrastructure at either party.

Current computing environments have solved this problem by only providing single-sign-on functionality or by using proprietary protocols. However, these solutions do not scale to allow for a "loosely coupled" environment, one in which it is easy to bring new partners online or remove old partners from the computing environment without changes to the environment at either side. In addition, these previous solutions do not allow a single entity to assume multiple roles; e.g., a business should be able to act as an identity provider with one partner and then act as a service provider with another partner.

Therefore, it would be advantageous to have methods and systems in which an enterprise can implement federated user lifecycle management functionality in a highly configurable fashion. In addition, this solution should provide support for multiple variations of federated user lifecycle management within a single environment without requiring infrastructure changes or additional instances of the FULM application itself.

SUMMARY OF THE INVENTION

A method and a system are presented in which federated domains interact within a federated environment. Domains within a federation can initiate federated operations for a user at other federated domains. A point-of-contact server within a domain relies upon a trust proxy within the domain to manage trust relationships between the domain and the federation. The point-of-contact server receives incoming requests directed to the domain and interfaces with a first application server and a second application server, wherein the first application server responds to requests for access to controlled resources and the second application server responds to requests for access to federated user lifecycle management functions, which are implemented using one or more pluggable modules that interface with the second application server.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
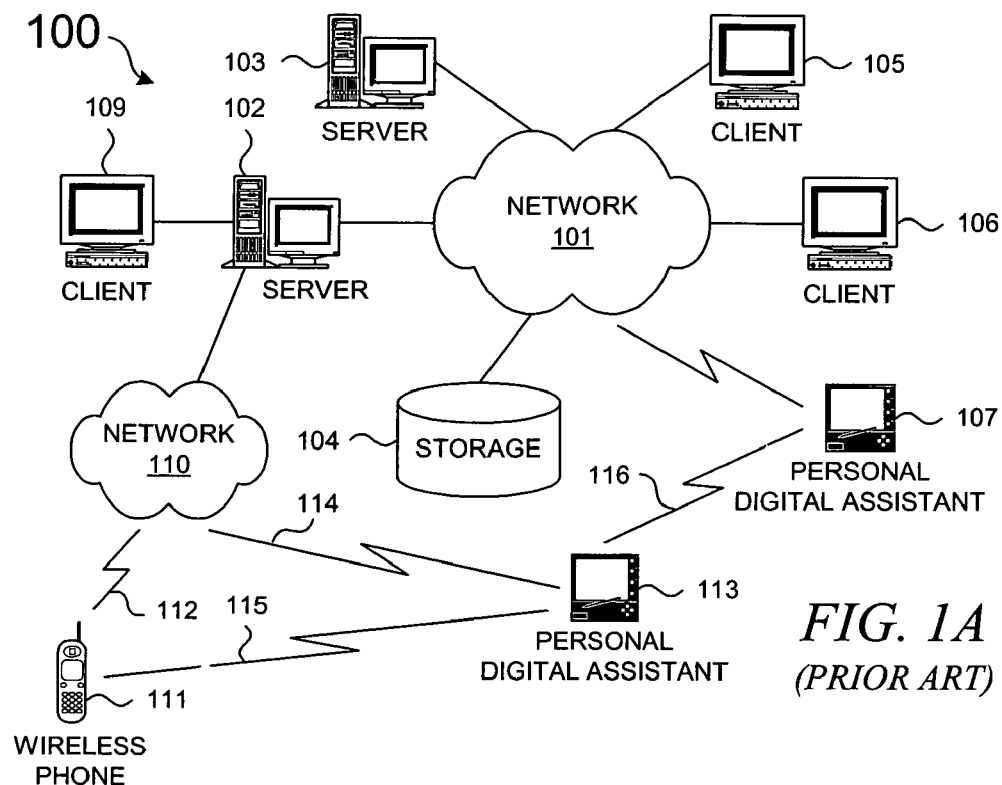
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
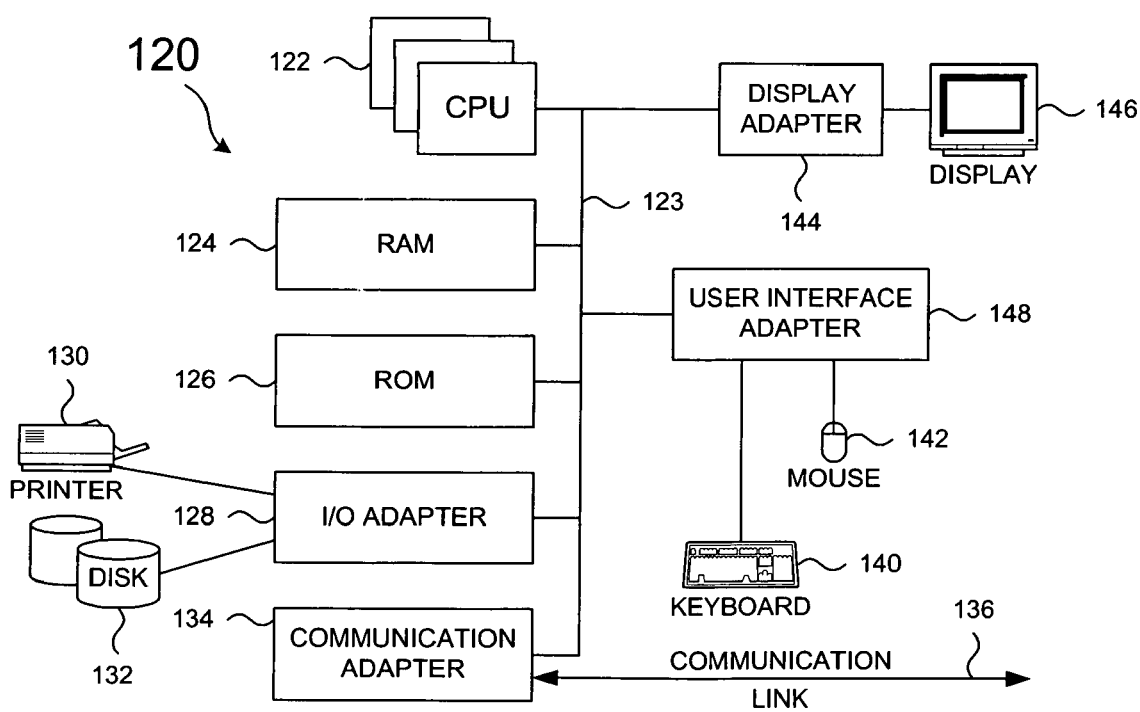
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Figure 1C:
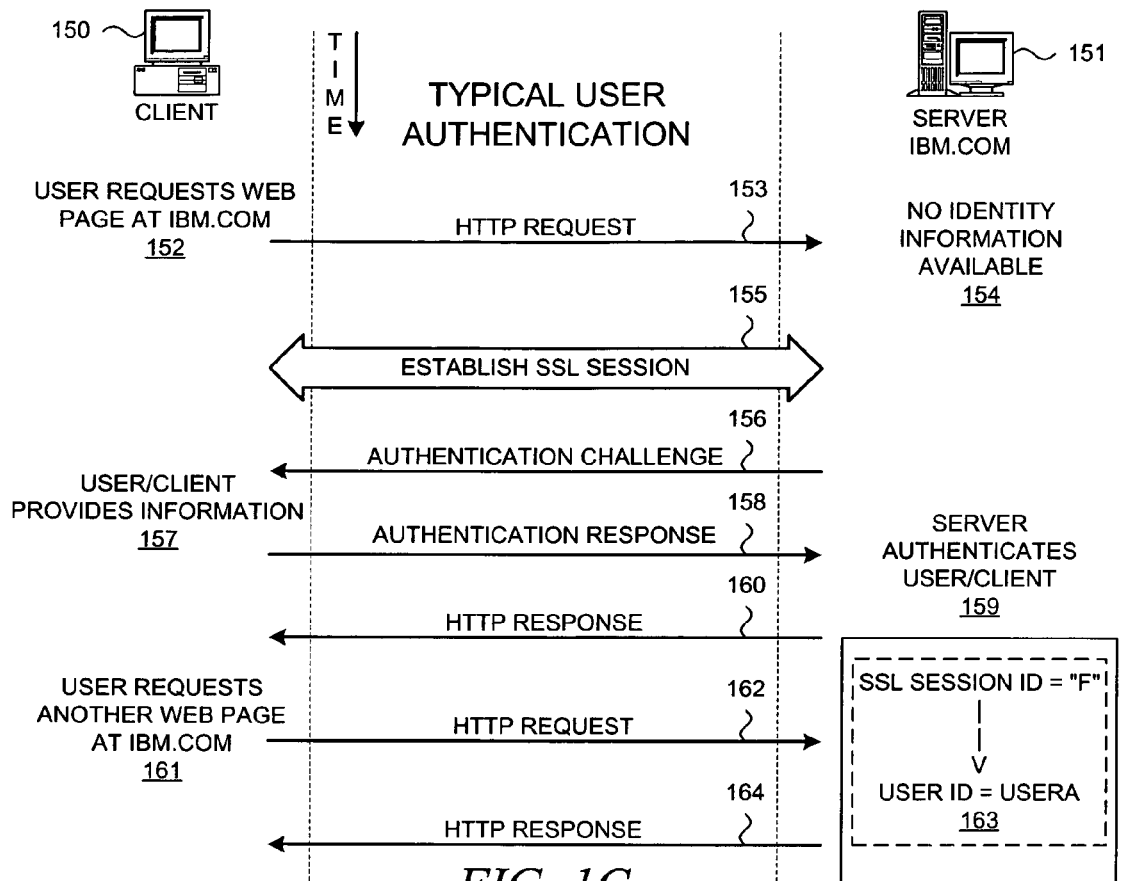
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected or controlled resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and/or authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client. The server creates a session identifier for the client, and any subsequent request messages from the client within the session would be accompanied by the session identifier.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163) because the user's session identifier is returned to the server in the HTTP request message, and the server sends the requested web page back to the client in another HTTP response message (step 164). Although FIG. 1C depicts a typical prior art process, it should be noted that other alternative session state management techniques may be depicted, such as URL rewriting or using cookies to identify users with active sessions, which may include using the same cookie that is used to provide proof of authentication.

Figure 1D:
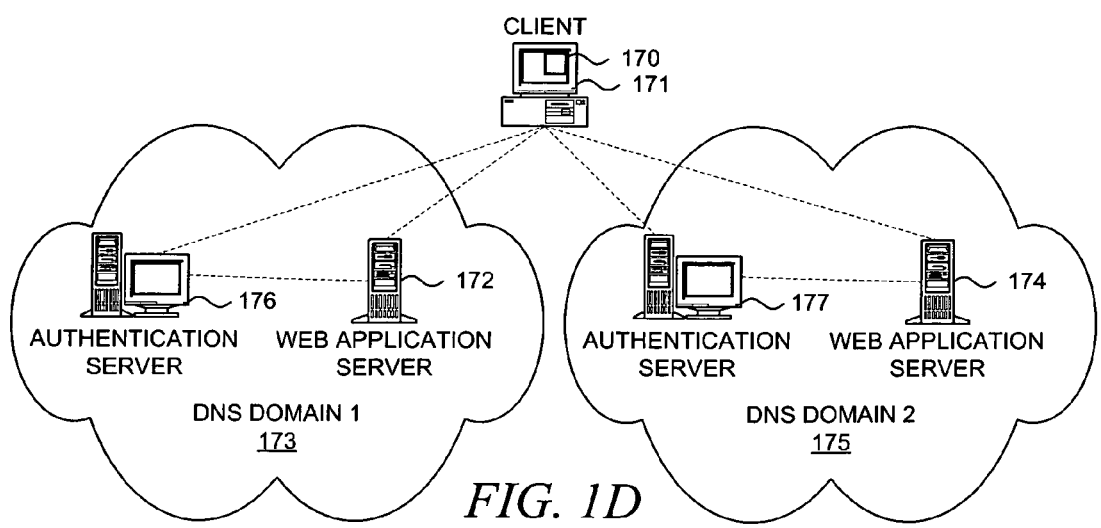
FIG. 1D depicts a network diagram that illustrates a typical Web-based environment in which the present invention may be implemented.

With reference now to FIG. 1D, a network diagram illustrates a typical Web-based environment in which the present invention may be implemented. In this environment, a user of a browser 170 at client 171 desires to access a protected resource on web application server 172 in DNS domain 173, or on web application server 174 in DNS domain 175.

In a manner similar to that shown in FIG. 1C, a user can request a protected resource at one of many domains. In contrast to FIG. 1C, which shows only a single server at a particular domain, each domain in FIG. 1D has multiple servers. In particular, each domain may have an associated authentication server 176 and 177.

In this example, after client 171 issues a request for a protected resource at domain 173, web application server 172 determines that it does not have an active session for client 171, and it requests that authentication server 176 perform an appropriate authentication operation with client 171. Authentication server 176 communicates the result of the authentication operation to web application server 172. If the user (or browser 170 or client 171 on behalf of the user) is successfully authenticated, then web application server 172 establishes a session for client 171 and returns the requested protected resource. Typically, once the user is authenticated by the authentication server, a cookie may be set and stored in a cookie cache in the browser. FIG. 1D is merely an example of one manner in which the processing resources of a domain may be shared amongst multiple servers, particularly to perform authentication operations.

In a similar manner, after client 171 issues a request for a protected resource at domain 175, authentication server 177 performs an appropriate authentication operation with client 171, after which web application server 174 establishes a session for client 171 and returns the requested protected resource. Hence, FIG. 1D illustrates that client 171 may have multiple concurrent sessions in different domains yet is required to complete multiple authentication operations to establish those concurrent sessions.

Figure 1E:
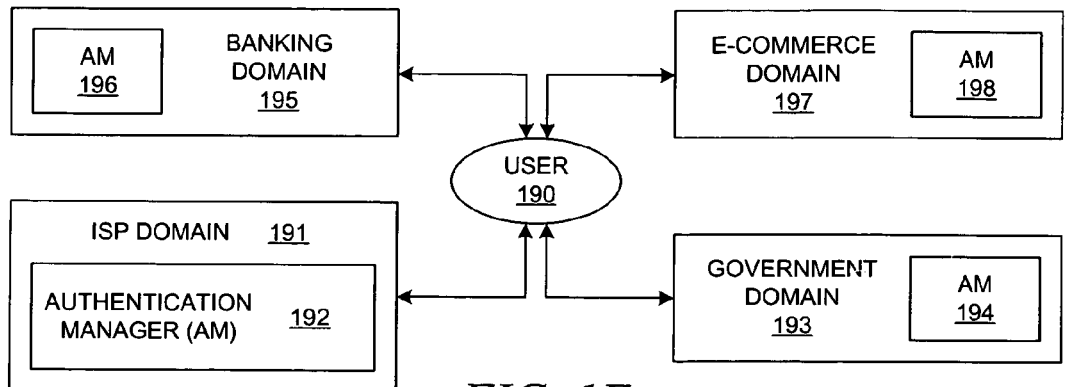
FIG. 1E depicts a block diagram that illustrates an example of a typical online transaction that might require multiple authentication operations from a user.

With reference now to FIG. 1E, a block diagram depicts an example of a typical online transaction that might require multiple authentication operations from a user. Referring again to FIG. 1C and FIG. 1D, a user may be required to complete an authentication operation prior to gaining access to a controlled resource, as shown in FIG. 1C. Although not shown in FIG. 1C, an authentication manager may be deployed on server 151 to retrieve and employ user information that is required to authenticate a user. As shown in FIG. 1D, a user may have multiple current sessions within different domains 173 and 175, and although they are not shown in FIG. 1D, each domain may employ an authentication manager in place of or in addition to the authentication servers. In a similar manner, FIG. 1E also depicts a set of domains, each of which support some type of authentication manager. FIG. 1E illustrates some of the difficulties that a user may experience when accessing multiple domains that require the user to complete an authentication operation for each domain.

User 190 may be registered at ISP domain 191, which may support authentication manager 192 that authenticates user 190 for the purpose of completing transactions with respect to domain 191. ISP domain 191 may be an Internet Service Provider (ISP) that provides Internet connection services, email services, and possibly other e-commerce services. Alternatively, ISP domain 191 may be an Internet portal that is frequently accessed by user 190.

Similarly, domains 193, 195, and 197 represent typical web service providers. Government domain 193 supports authentication manager 194 that authenticates users for completing various government-related transactions. Banking domain 195 supports authentication manager 196 that authenticates users for completing transactions with an online bank. E-commerce domain 197 supports authentication manager 198 that authenticates users for completing online purchases.

As noted previously, when a user attempts to move from one domain to another domain within the Internet or World Wide Web by accessing resources at the different domains, a user may be subjected to multiple user authentication requests or requirements, which can significantly slow the user's progress across a set of domains. Using FIG. 1E as an exemplary environment, user 190 may be involved in a complicated online transaction with e-commerce domain 197 in which the user is attempting to purchase an on-line service that is limited to users who are at least 18 years old and who have a valid driver license, a valid credit card, and a U.S. bank account. This online transaction may involve domains 191, 193, 195, and 197.

Typically, a user might not maintain an identity and/or attributes within each domain that participates in a typical online transaction. In this example, user 190 may have registered his or her identity with the user's ISP, but to complete the online transaction, the user might also be required to authenticate to domains 193, 195, and 197. If each of the domains does not maintain an identity for the user, then the user's online transaction may fail. Even if the user can be authenticated by each domain, then it is not guaranteed that the different domains can transfer information between themselves in order to complete the user's transaction. For user 190 shown in FIG. 1E, there is no prior art environment that allows user 190 to authenticate to a first web site, e.g., ISP 191, and then transfer an authentication token to other web service providers, such as domains 193, 195, and 197, for single-sign-on purposes.

Given the preceding brief description of some current technology, the description of the remaining figures relates to federated computer environments in which the present invention may operate. Prior to discussing the present invention in more detail, however, some terminology is introduced.

Terminology

The terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used in the present invention. More information on Kerberos may be found in Kohl et al., "The Kerberos Network Authentication Service (V5)", Internet Engineering Task Force (IETF) Request for Comments (RFC) 1510, 09/1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used within the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, various assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, etc. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Distinguishing Prior-Art Single-Sign-On Solutions

As noted above, prior-art single-sign-on solutions are limited to homogeneous environments in which there are pre-established business agreements between participating enterprises. These business agreements establish trust and define secure transfers of information between enterprises. These business agreements also include technological agreements on rules on how to translate, or map, user identities from one enterprise to another, and how to transfer the information used to vouch for users between participating enterprises.

In other words, previous single-sign-on solutions allow one enterprise to trust an authentication assertion (along with the identity of the user provided in the assertion) produced by a different enterprise based on the pre-negotiated or pre-configured agreements. Each distinct enterprise knows how to create and interpret authentication assertions that can be understood by other enterprises that have exchanged similar agreements, such as enterprises within an e-commerce marketplace. These homogeneous environments are tightly coupled because there is a deterministic relationship known by the enterprises for mapping the user identities across these systems. This tight coupling is possible because of the business agreements that are used to establish the single-sign-on environment.

Federation Model of Present Invention

In the context of the World Wide Web, users are coming to expect the ability to jump from interacting with an application on one Internet domain to another application on another domain with minimal regard to the information barriers between each particular domain. Users do not want the frustration that is caused by having to authenticate to multiple domains for a single transaction. In other words, users expect that organizations should interoperate, but users generally want domains to respect their privacy. In addition, users may prefer to limit the domains that permanently store private information. These user expectations exist in a rapidly evolving heterogeneous environment in which many enterprises and organizations are promulgating competing authentication techniques.

In contrast to prior-art systems, the present invention provides a federation model for allowing enterprises to provide a single-sign-on experience to a user. In other words, the present invention supports a federated, heterogeneous environment. As an example of an object of the present invention, referring again to FIG. 1E, user 190 is able to authenticate to domain 191 and then have domain 191 provide the appropriate assertions to each downstream domain that might be involved in a transaction. These downstream domains need to be able to understand and trust authentication assertions and/or other types of assertions, even though there are no pre-established assertion formats between domain 191 and these other downstream domains. In addition to recognizing the assertions, the downstream domains need to be able to translate the identity contained within an assertion to an identity that represents user 190 within a particular domain, even though there is no pre-established identity mapping relationship. It should be noted, though, that the present invention is applicable to various types of domains and is not limited to ISP-type domains that are represented within FIG. 1E as exemplary domains.

The present invention is directed to a federated environment. In general, an enterprise has its own user registry and maintains relationships with its own set of users. Each enterprise typically has its own means of authenticating these users. However, the federated scheme of the present invention allows enterprises to cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

In the present invention, a federation is a set of distinct entities, such as enterprises, organizations, institutions, etc., that cooperate to provide a single-sign-on, ease-of-use experience to a user. In the present invention, a federated environment differs from a typical single-sign-on environment in that two enterprises need not have a direct, pre-established, relationship defining how and what information to transfer about a user. Within a federated environment, entities provide services which deal with authenticating users, accepting authentication assertions, e.g., authentication tokens, that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain/identity provider.

The present invention also concerns a federated identity management system that establishes a foundation in which loosely coupled authentication, user enrollment, user profile management and/or authorization services, collaborate across security domains. Federated identity management allows services residing in disparate security domains to securely interoperate and collaborate even though there may be differences in the underlying security mechanisms and operating system platforms at these disparate domains. A single-sign-on experience is established once a user establishes their participation in a federation.

Home Domain or Identity Provider vs. Relying Domain or Service Provider

As explained in more detail further below, the present invention provides significant user benefits. The present invention allows a user to authenticate at a first entity, hereinbelow also referred to as the user's home domain, the user's authentication home domain, or the user's identity provider. This first entity may act as an issuing party, which issues an authentication assertion about the user for use at a second entity, which may be regarded as a generalized service provider. The user can then access protected resources at a second, distinct entity, termed the relying party, by presenting the authentication assertion that was issued by the first entity without having to explicitly re-authenticate at the second entity, i.e. service provider. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user.

Figure 2A:
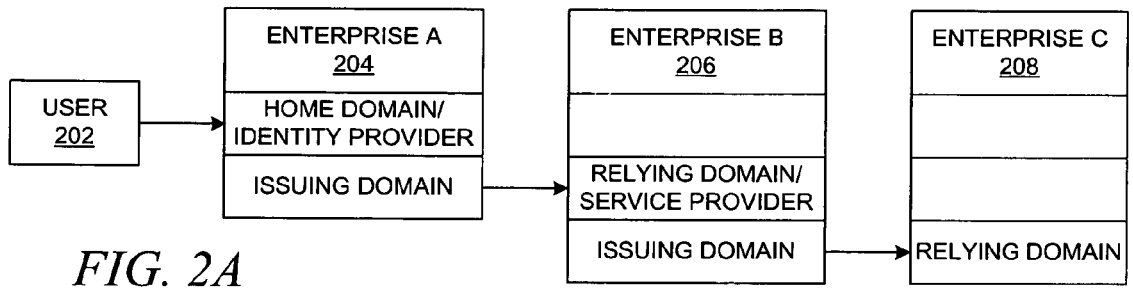
FIG. 2A depicts a block diagram that illustrates the terminology of the federated environment with respect to a transaction that is initiated by a user to a first federated enterprise, which, in response, invokes actions at downstream entities within the federated environment.

With reference now to FIG. 2A, a block diagram depicts the terminology of the federated environment with respect to a transaction that is initiated by a user to a first federated enterprise, which, in response, invokes actions at downstream entities within the federated environment. FIG. 2A shows that the terminology may differ depending on the perspective of an entity within the federation for a given federated operation. More specifically, FIG. 2A illustrates that the present invention supports the transitivity of trust and the transitivity of the authentication assertion process; a domain can issue an assertion based on its trust in an identity as asserted by another domain. User 202 initiates a transaction through a request for a protected resource at enterprise 204. If user 202 has been authenticated by enterprise 204 or will eventually be authenticated by enterprise 204 during the course of a transaction, then enterprise 204 is the user's home domain, i.e. the user's identity provider, for this federated session. Assuming that the transaction requires some type of operation by enterprise 206 and enterprise 204 transfers an assertion to enterprise 206, then enterprise 204 is the issuing domain with respect to the particular operation, and enterprise 206 is the relying domain for the operation; in other words, enterprise 206 is the service provider for the current transaction. Assuming that the transaction requires further operations such that enterprise 206 transfers an assertion to enterprise 208, then enterprise 206 is the issuing domain with respect to the requested operation, and enterprise 208 is the relying domain for the operation; in this case, enterprise 208 may be regarded as another downstream service provider, although a federated transaction can usually be described as involving only two domains, the identity provider and the service provider.

In the federated environment of the present invention, the domain at which the user authenticates is termed the user's (authentication) home domain or the user's identity provider. The identity provider maintains authentication credentials, which may be physically supported by the user's employer, the user's ISP, or some other commercial entity. Although it may be possible that there could be multiple enterprises within a federated environment that could act as a user's home domain because there may be multiple enterprises that have the ability to generate and validate a user's authentication credentials, a federated transaction can usually be described as involving only a single identity provider.

From an authentication perspective, an issuing party for an authentication assertion is usually the user's identity provider, i.e. the user's authentication home domain. The user's home domain may or may not maintain personal information or profile information for the user. Hence, from an attribute perspective involving personally identifiable information, personalization information, or other user attributes, an issuing party for an attribute assertion may or may not be the user's home domain. To avoid any confusion, separate terminology can be employed for attribute home domains and authentication home domains, but the term "home domain" hereinbelow may be interpreted as referring to an authentication home domain.

Within the scope of a given federated session, however, there is usually one and only one domain that acts as the user's identity provider, i.e. the user's home domain. Once a user has authenticated to this domain, all other domains or enterprises in the federation are treated as merely service providers, i.e. relying parties, for the duration of that session.

Given that the present invention provides a federated infrastructure that can be added to existing systems while minimizing the impact on an existing, non-federated architecture, authentication at a user's home domain is not necessarily altered by the fact that the home domain may also participate within a federated environment. In other words, even though the home domain may be integrated into a federated environment that is implemented in accordance with the present invention, the user should have the same end-user experience while performing an authentication operation at the user's home domain. It should be noted, though, that not all of a given enterprise's users will necessarily participate in the federated environment.

Moreover, user registration, e.g., establishment of a user account, is not necessarily altered by the fact that the home domain may also participate within a federated environment. For example, a user may still establish an account at a domain through a legacy or pre-existing registration process that is independent of a federated environment. In other words, the establishment of a user account at a home domain may or may not include the establishment of account information that is valid across a federation, e.g., via identity translation information. However, if there is a single federated domain that is able to authenticate a user, i.e. there is one and only one domain within the federation with whom the user has registered, then it would be expected that this domain would act as the user's home domain or identity provider in order to support the user's transactions throughout the federated environment.

If a user has multiple possible home domains within a federated environment, then a user may enter the federation via more than one entry point. In other words, the user may have accounts at multiple domains that are able to act as an identity provider for the user, and these domains do not necessarily have information about the other domains nor about a user's identity at the other domains.

While the domain at which the user authenticates is termed the user's home domain or the user's identity provider, the issuing domain is a federation entity that issues an assertion for use by another domain, i.e. the relying domain. An issuing domain is usually, but not necessarily, the user's home domain or the user's identity provider. Hence, it would usually be the case that the issuing party has authenticated the user through typical authentication protocols, as mentioned above. However, it is possible that the issuing party has previously acted as a relying party whereby it received an assertion from a different issuing party. In other words, since a user-initiated transaction may cascade through a series of enterprises within a federated environment, a receiving party may subsequently act as an issuing party for a downstream transaction. In general, any domain that has the ability to issue authentication assertions on behalf of a user can act as an issuing domain.

The relying domain is a domain that receives an assertion from an issuing party. The relying party is able to accept, trust, and understand an assertion that is issued by a third party on behalf of the user, i.e. the issuing domain. It is generally the relying party's duty to use an appropriate authentication authority to interpret an authentication assertion. In addition, it is possible that the relying party is able to authenticate a particular user, i.e. to act as a user's home domain or identity provider, but it is also possible that a relying party may not be able to authenticate a particular user through conventional methods. Hence, a relying party is a domain or an enterprise that relies on the authentication assertion that is presented by a user and that provides a user with a single-sign-on experience instead of prompting the user for the user's authentication credentials as part of an interactive session with the user.

Federated Architecture—Federated Front-End for Legacy Systems

Figure 2C:
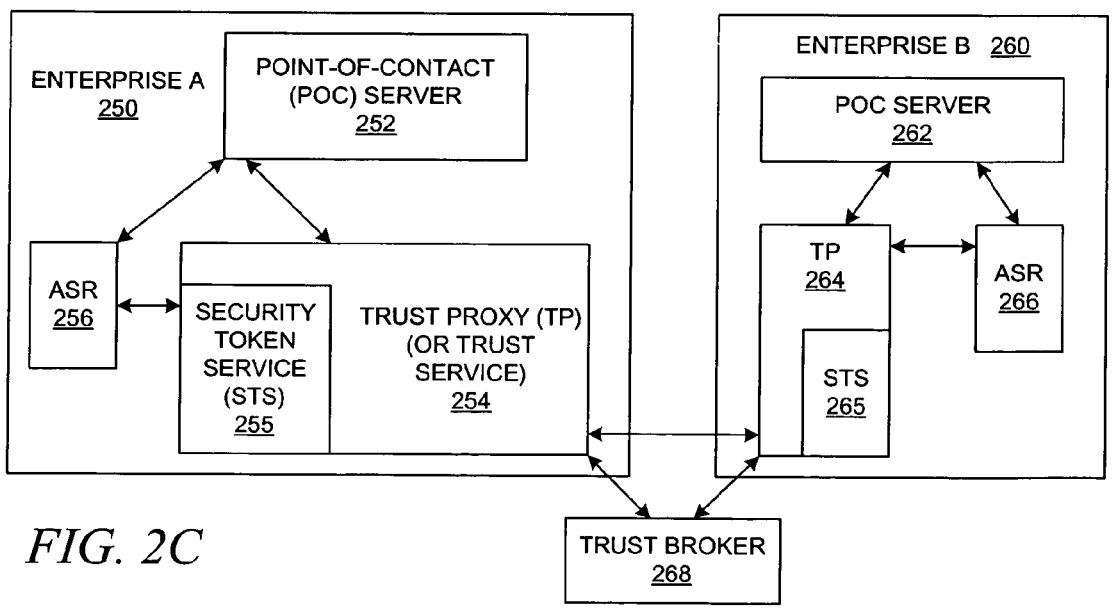
FIG. 2C depicts a block diagram that illustrates a federated architecture in accordance with an implementation of the present invention.
Figure 2B:
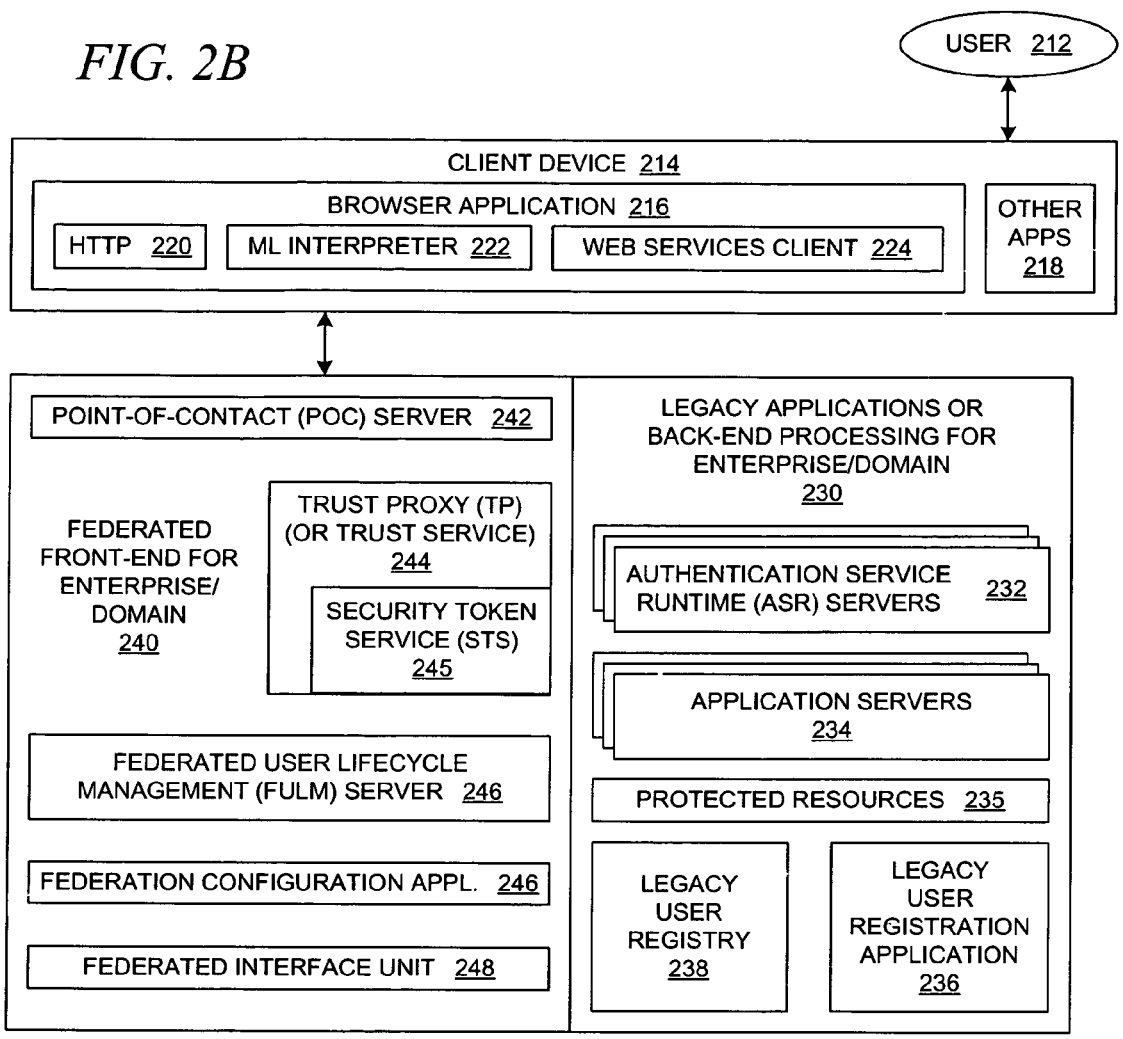
FIG. 2B depicts a block diagram that illustrates the integration of pre-existing systems at a given domain with some of the federated architecture components of the present invention in accordance with an embodiment of the present invention.

With reference now to FIG. 2B, a block diagram depicts the integration of pre-existing systems at a given domain with some of the federated architecture components of the present invention in accordance with an embodiment of the present invention. A federated environment includes federated entities that provide a variety of services for users. User 212 interacts with client device 214, which may support browser application 216 and various other client applications 218. User 212 is distinct from client device 214, browser 216, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, etc., that may be assumed to act on behalf of the user.

Browser application 216 may be a typical browser, including those found on mobile devices, that comprises many modules, such as HTTP communication component 220 and markup language (ML) interpreter 222. Browser application 216 may also support plug-ins, such as web services client 224, and/or downloadable applets, which may or may not require a virtual machine runtime environment. Web services client 224 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined datatypes; and a convention for representing remote procedure calls and responses. User 212 may access web-based services using browser application 216, but user 212 may also access web services through other web service clients on client device 214. Some of the examples of the present invention that are shown in the following figures employ HTTP redirection via the user's browser to exchange information between entities in a federated environment. However, it should be noted that the present invention may be conducted over a variety of communication protocols and is not meant to be limited to HTTP-based communications. For example, the entities in the federated environment may communicate directly when necessary; messages are not required to be redirected through the user's browser.

The present invention may be implemented in a manner such that components that are required for a federated environment can be integrated with pre-existing systems. FIG. 2B depicts one embodiment for implementing these components as a front-end to a pre-existing system. The pre-existing components at a federated domain can be considered as legacy applications or back-end processing components 230, which include authentication service runtime (ASR) servers 232 in a manner similar to that shown in FIG. 2C. ASR servers 232 are responsible for authenticating users when the domain controls access to application servers 234, which can be considered to generate, retrieve, or otherwise support or process protected resources 235. The domain may continue to use legacy user registration application 236 to register users for access to application servers 234. Information that is needed to authenticate a registered user is stored in legacy user registry 238.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federated front-end processing 240, which includes point-of-contact server 242 and trust proxy server 244 (or more simply, trust proxy 244 or trust service 244) which itself interacts with Security Token Service (STS) 245, along with federated user lifecycle management server/service 246, all of which are described in more detail below with respect to FIG. 2C. Federation configuration application 247 allows an administrative user to configure the federated front-end components to allow them to interface with the legacy back-end components through federated interface unit 248.

Legacy or pre-existing authentication services at a given enterprise may use various, well known, authentication methods or tokens, such as username/password or smart card token-based information. However, with the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federated front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy such that it appears as if the user was engaged in an authentication dialog.

Federated Architecture—Point-of-Contact Servers, Trust Proxies, and Trust Brokers With reference now to FIG. 2C, a block diagram depicts a federated architecture in accordance with an implementation of the present invention. A federated environment includes federated enterprises or similar entities that provide a variety of services for users. A user, through an application on a client device, may attempt to access resources at various entities, such as enterprise 250. A point-of-contact server at each federated enterprise, such as point-of-contact (POC) server 252 at enterprise 250, is the user's entry point into the federated environment. The point-of-contact server minimizes the impact on existing components within an existing, non-federated architecture, e.g., legacy systems, because the point-of-contact server handles many of the federation requirements. The point-of-contact server provides session management, protocol conversion, and possibly initiates authentication and/or attribute assertion conversion. For example, the point-of-contact server may translate HTTP or HTTPS messages to SOAP and vice versa. As explained in more detail further below, the point-of-contact server may also be used to invoke a trust proxy to translate assertions, e.g., a SAML token received from an issuing party can be translated into a Kerberos token understood by a receiving party.

A trust proxy (a trust proxy server or a trust service), such as trust proxy (TP) 254 at enterprise 250, establishes and maintains a trust relationship between two entities in a federation. A trust proxy generally has the ability to handle authentication token format translation (through the security token service, which is described in more detail further below) from a format used by the issuing party to one understood by the receiving party.

Together, the use of a point-of-contact server and a trust proxy minimize the impact of implementing a federated architecture on an existing, non-federated set of systems. Hence, the federated architecture of the present invention requires the implementation of at least one point-of-contact server and at least one trust proxy per federated entity, whether the entity is an enterprise, a domain, or other logical or physical entity. The federated architecture of the present invention, though, does not necessarily require any changes to the existing, non-federated set of systems. Preferably, there is a single trust proxy for a given federated entity, although there may be multiple trust proxies for availability purposes, or there may be multiple trust proxies for a variety of smaller entities within a federated entity, e.g., separate subsidiaries within an enterprise. It is possible that a given entity could belong to more than one federation, although this scenario would not necessarily require multiple trust proxies as a single trust proxy could manage trust relationships within multiple federations.

One role of a trust proxy may be to determine or to be responsible for determining the required token type by another domain and/or the trust proxy in that domain. A trust proxy has the ability or the responsibility to handle authentication token format translation from a format used by the issuing party to one understood by the receiving party. Trust proxy 254 may also be responsible for any user identity translation or attribute translation that occurs for enterprise 250. In addition, a trust proxy can support the implementation of aliases as representatives of a user identity that uniquely identify a user without providing any addition information about the user's real world identity. Furthermore, a trust proxy can issue authorization and/or session credentials for use by the point-of-contact server. However, a trust proxy may invoke a trust broker for assistance, as described further below. Identity translation may be required to map a user's identity and attributes as known to an issuing party to one that is meaningful to a receiving party. This translation may be invoked by either a trust proxy at an issuing domain, a trust proxy at a receiving domain, or both.

Trust proxy 254 may include (or interact with) an internalized component, shown as security token service (STS) component 255, which will provide token translation and will invoke authentication service runtime (ASR) 256 to validate and generate tokens. The security token service provides the token issuance and validation services required by the trust proxy, which may include identity translation. The security token service therefore includes an interface to existing authentication service runtimes, or it incorporates authentication service runtimes into the service itself. Rather than being internalized within the trust proxy, the security token service component may also be implemented as a stand-alone component, e.g., to be invoked by the trust proxy, or it may be internalized within a transaction server, e.g., as part of an application server.

For example, an STS component may receive a request to issue a Kerberos token. As part of the authentication information of the user for whom the token is to be created, the request may contain a binary token containing a username and password. The STS component will validate the username and password against, e.g., an LDAP runtime (typical authentication) and will invoke a Kerberos KDC (Key Distribution Center) to generate a Kerberos ticket for this user. This token is returned to the trust proxy for use within the enterprise; however, this use may include externalizing the token for transfer to another domain in the federation.

In a manner similar to that described with respect to FIG. 1D, a user may desire to access resources at multiple enterprises within a federated environment, such as both enterprise 250 and enterprise 260. In a manner similar to that described above for enterprise 250, enterprise 260 comprises point-of-contact server 262, trust proxy 264, security token service 265, and authentication service runtime 266. Although the user may directly initiate separate transactions with each enterprise, the user may initiate a transaction with enterprise 250 which cascades throughout the federated environment. Enterprise 250 may require collaboration with multiple other enterprises within the federated environment, such as enterprise 260, to complete a particular transaction, even though the user may not have been aware of this necessity when the user initiated a transaction. Enterprise 260 becomes involved as a downstream domain, and the present invention allows enterprise 250 to present a federated assertion to enterprise 260 if necessary in order to further the user's transaction.

It may be the case that a trust proxy does not know how to interpret the authentication token that is received by an associated point-of-contact server and/or how to translate a given user identity and attributes. In this case, the trust proxy may choose to invoke functionality at a trust broker component, such as trust broker 268. A trust broker maintains relationships with individual trust proxies, thereby providing transitive trust between trust proxies. Using a trust broker allows each entity within a federated environment, such enterprises 250 and 260, to establish a trust relationship with the trust broker rather than establishing multiple individual trust relationships with each domain in the federated environment. For example, when enterprise 260 becomes involved as a downstream domain for a transaction initiated by a user at enterprise 250, trust proxy 254 at enterprise 250 can be assured that trust proxy 264 at enterprise 260 can understand an assertion from trust proxy 254 by invoking assistance at trust broker 268 if necessary. Although FIG. 2C depicts the federated environment with a single trust broker, a federated environment may have multiple trust brokers.

It should be noted that although FIG. 2C depicts point-of-contact server 252, trust proxy 254, security token service component 255, and authentication service runtime 256 as distinct entities, it is not necessary for these components to be implemented on separate devices. For example, it is possible for the functionality of these separate components to be implemented as applications on a single physical device or combined in a single application. In addition, FIG. 2C depicts a single point-of-contact server, a single trust proxy, and a single security token server for an enterprise, but an alternative configuration may include multiple point-of-contact servers, multiple trust proxies, and multiple security token servers for each enterprise. The point-of-contact server, the trust proxy, the security token service, and other federated entities may be implemented in various forms, such as software applications, objects, modules, software libraries, etc.

A trust proxy/STS may be capable of accepting and validating many different authentication credentials, including traditional credentials such as a username and password combinations and Kerberos tickets, and federated authentication token formats, including authentication tokens produced by a third party. A trust proxy/STS may allow the acceptance of an authentication token as proof of authentication elsewhere. The authentication token is produced by an issuing party and is used to indicate that a user has already authenticated to that issuing party. The issuing party produces the authentication token as a means of asserting the authenticated identity of a user. A trust proxy/STS is also able to process attribute tokens or tokens that are used to secure communication sessions or conversations, e.g., those that are used to manage session information in a manner similar to an SSL session identifier.

A security token service invokes an authentication service runtime as necessary. The authentication service runtime supports an authentication service capable of authenticating a user. The authentication service acts as an authentication authority that provides indications of successful or failed authentication attempts via authentication responses. The trust proxy/STS may internalize an authentication service, e.g., a scenario in which there is a brand-new installation of a web service that does not need to interact with an existing legacy infrastructure. Otherwise, the STS component will invoke external authentication services for validation of authentication tokens. For example, the STS component could "unpack" a binary token containing a username/password and then use an LDAP service to access a user registry to validate the presented credentials.

When used by another component such as an application server, the STS component can be used to produce tokens required for single-sign-on to legacy authentication systems. Hence, the STS component can be used for token translation for internal purposes, i.e. within an enterprise, and for external purposes, i.e. across enterprises in a federation. As an example of an internal purpose, a Web application server may interface to a mainframe via an IBM CICS (Customer Information Control System) transaction gateway; CICS is a family of application servers and connectors that provides enterprise-level online transaction management and connectivity for mission-critical applications. The Web application server may invoke the STS component to translate a Kerberos ticket (as used internally by the Web Application server) to a an IBM RACF® passticket required by the CICS transaction gateway.

The entities that are shown in FIG. 2C can be explained using the terminology that was introduced above, e.g., "issuing party" and "relying party" or "identity provider" and "service provider". As part of establishing and maintaining trust relationships, an identity provider's trust proxy can determine what token types are required/accepted by a service provider's trust proxy. Thus, trust proxies use this information when invoking token services from a security token service. When an identity provider's trust proxy is required to produce an authentication assertion for a service provider, the trust proxy determines the required token type and requests the appropriate token from the security token service.

When a service provider's trust proxy receives an authentication assertion from an identity provider, the trust proxy knows what type of assertion that it expected and what type of assertion that it needs for internal use within the service provider. The service provider's trust proxy therefore requests that the security token service generate the required internal-use token based on the token in the received authentication assertion.

Both trust proxies and trust brokers have the ability to translate an assertion received from an identity provider into a format that is understood by a service provider. The trust broker has the ability to interpret the assertion format (or formats) for each of the trust proxies with whom there is a direct trust relationship, thereby allowing the trust broker to provide assertion translation between an identity provider and a service provider. This translation can be requested by either party through its local trust proxy. Thus, the identity provider's trust proxy can request translation of an assertion before it is sent to the service provider. Likewise, the service provider's trust proxy can request translation of an assertion received from an identity provider.

Assertion translation comprises user identity translation, authentication assertion translation, attribute assertion translation, or other forms of assertion translation. Reiterating the point above, assertion translation is handled by the trust components within a federation, i.e. trust proxies and trust brokers. A trust proxy may perform the translation locally, either at the identity provider or at the service provider, or a trust proxy may invoke assistance from a trust broker.

Assuming that an identity provider and a service provider already have individual trust relationships with a trust broker, the trust broker can dynamically create, i.e. broker, new trust relationships between issuing parties and relying parties if necessary. After the initial trust relationship brokering operation that is provided by the trust broker, the identity provider and the service provider may directly maintain the relationship so that the trust broker need not be invoked for future translation requirements. It should be noted that translation of authentication tokens can happen at three possible places: the identity provider's trust proxy, the service provider's trust proxy, and the trust broker. Preferably, the identity provider's trust proxy generates an authentication assertion that is understood by the trust broker to send to the service provider. The service provider then requests a translation of this token from the trust broker into a format recognizable by the service provider. Token translation may occur before transmission, after transmission, or both before and after transmission of the authentication assertion.

Trust Relationships Within Federated Architecture

Within a federated environment that is implemented in accordance with the present invention, there are two types of "trust domains" that must be managed: enterprise trust domains and federation trust domains. The differences between these two types of trust domain are based in part on the business agreements governing the trust relationships with the trust domain and the technology used to establish trust. An enterprise trust domain contains those components that are managed by the enterprise; all components within that trust domain trust each other. In general, there are no business agreements required to establish trust within an enterprise because the deployed technology creates inherent trust within an enterprise, e.g., by requiring mutually authenticated SSL sessions between components or by placing components within a single, tightly controlled data center such that physical control and proximity demonstrate implicit trust. Referring to FIG. 2B, the legacy applications and back-end processing systems may represent an enterprise trust domain, wherein the components communicate on a secure internal network.

Federation trust domains are those that cross enterprise boundaries; from one perspective, a federation trust domain may represent trust relationships between distinct enterprise trust domains. Federation trust domains are established through trust proxies across enterprise boundaries between federation partners. Trust relationships involve some sort of a bootstrapping process by which initial trust is established between trust proxies. Part of this bootstrap process may include the establishment of shared secret keys and rules that define the expected and/or allowed token types and identifier translations. In general, this bootstrapping process can be implemented out-of-band as this process may also include the establishment of business agreements that govern an enterprise's participation in a federation and the liabilities associated with this participation.

There are a number of possible mechanisms for establishing trust in a federated business model. In a federation model, a fundamental notion of trust between the federation participants is required for business reasons in order to provide a level of assurance that the assertions (including tokens and attribute information) that are transferred between the participants are valid. If there is no trust relationship, then the service provider cannot depend upon the assertions received from the identity provider; they cannot be used by the service provider to determine how to interpret any information received from the identity provider.

For example, a large corporation may want to link several thousand global customers, and the corporation could use prior art solutions. As a first example, the corporation could require global customers to use a digital certificate from a commercial certificate authority to establish mutual trust. The commercial certificate authority enables the servers at the corporation to trust servers located at each of the global customers. As a second example, the corporation could implement third-party trust using Kerberos; the corporation and its global customers could implement a trusted third-party Kerberos domain service that implements shared-secret-based trust. As a third example, the corporation could establish a private scheme with a proprietary security message token that is mutually-trusted by the servers of its global customers.

Any one of these approaches may be acceptable if the corporation needed to manage trust relationships with a small number of global customers, but this may become unmanageable if there are hundreds or thousands of potential federation partners. For example, while it may be possible for the corporation to force its smaller partners to implement a private scheme, it is unlikely that the corporation will be able to impose many requirements on its larger partners.

With the present invention, the enterprise will employ trust relationships established and maintained through trust proxies and possibly trust brokers. An advantage of the federated architecture of the present invention is that it does not impose additional requirements above and beyond the current infrastructures of an enterprise and its potential federation partners.

However, the present invention does not relieve an enterprise and its potential federation partners from the preliminary work required to establish business and liability agreements that are required for participation in the federation. In addition, the participants cannot ignore the technological bootstrapping of a trust relationship. The present invention allows this bootstrapping to be flexible, e.g., a first federation partner can issue a Kerberos ticket with certain information, while a second federation partner can issue a SAML authentication assertion with certain information.

In the present invention, the trust relationships are managed by the trust proxies, which may include (or may interact with) a security token service that validates and translates a token that is received from an identity provider based on the pre-established relationship between two trust proxies. In situations where it is not feasible for a federated enterprise to establish trust relationships (and token translation) with another federated enterprise, a trust broker may be invoked; however, the federated enterprise would need to establish a relationship with a trust broker.

Figure 2D:
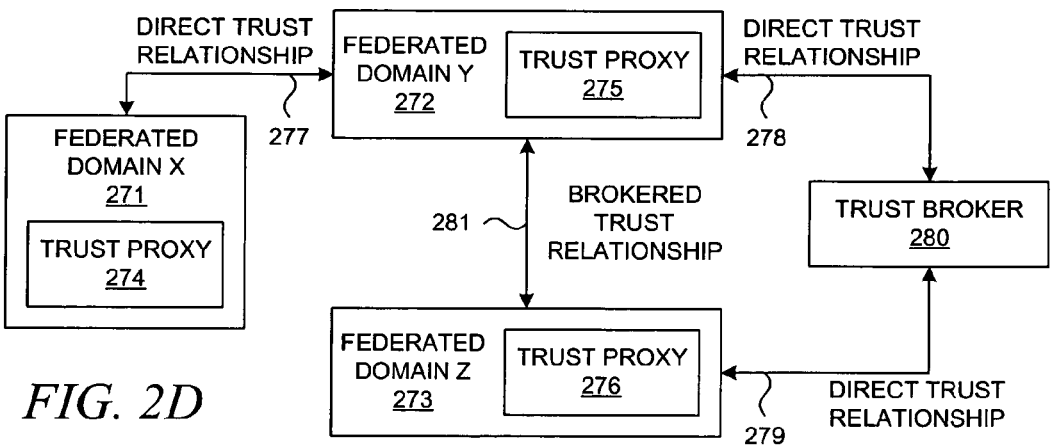
FIG. 2D depicts a block diagram that illustrates an exemplary set of trust relationships between federated domains using trust proxies and a trust broker in accordance with the present invention.

With reference now to FIG. 2D, a block diagram depicts an exemplary set of trust relationships between federated domains using trust proxies and a trust broker in accordance with the present invention. Although FIG. 2C introduced the trust broker, FIG. 2D illustrates the importance of transitive trust relationships within the federated architecture of the present invention.

Federated domains 271-273 incorporate trust proxies 274-276, respectively. Trust proxy 274 has direct trust relationship 277 with trust proxy 275. Trust broker 280 has direct trust relationship 278 with trust proxy 275, and trust broker 280 has direct trust relationship 279 with trust proxy 276. Trust broker 280 is used to establish, on behalf of a federation participant, a trust relationship based on transitive trust with other federation partners. The principle of transitive trust allows trust proxy 275 and trust proxy 276 to have brokered trust relationship 281 via trust broker 280. Neither trust proxy 275 nor 276 need to know how to translate or validate the other's assertions; the trust broker may be invoked to translate an assertion into one that is valid, trusted, and understood at the other trust proxy.

Business agreements that specify contractual obligations and liabilities with respect to the trust relationships between federated enterprises can be expressed in XML through the use of the ebXML (Electronic Business using XML) standards. For example, a direct trust relationship could be represented in an ebXML document; each federated domain that shares a direct trust relationship would have a copy of a contract that is expressed as an ebXML document. Operational characteristics for various entities within a federation may be specified within ebXML choreographies and published within ebXML registries; any enterprise that wishes to participate in a particular federation, e.g., to operate a trust proxy or trust broker, would need to conform to the published requirements that were specified by that particular federation for all trust proxies or trust brokers within the federation. A security token service could parse these ebXML documents for operational details on the manner in which tokens from other domains are to be translated. It should be noted, though, that other standards and mechanisms could be employed by the present invention for specifying the details about the manner in which the trust relationships within a federation are implemented.

Assertion Processing Within Federated Architecture

As noted above, a user's experience within a federation is governed in part by the assertions about the user or for the user that are transferred across domains. Assertions provide information about the user's authentication status, attribute information, and other information. Using authentication assertions can remove the need for a user to re-authenticate at every site that the user visits. Within a federated environment, there are two models to get an assertion from an issuing domain to a relying domain: push models and pull models. In a push model, the user's assertions travel with the user's request to the relying domain. In a pull model, the user's request is received at a relying domain without some required information, and the relying domain then requests the relevant or required assertions from the issuing domain.

Figure 3A:
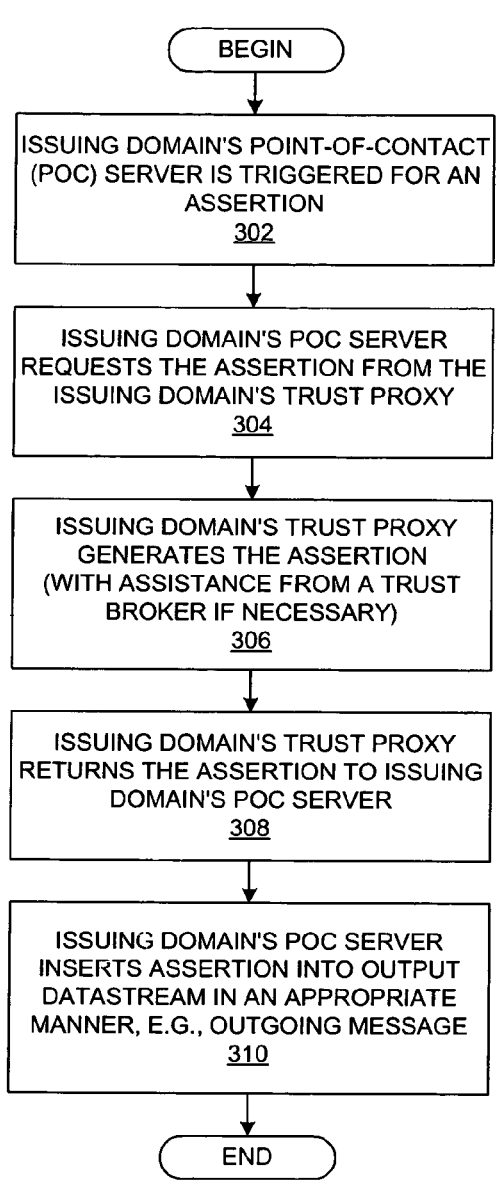
FIG. 3A depicts a flowchart that illustrates a generalized process at an issuing domain for creating an assertion within a federated environment.
Figure 3B:
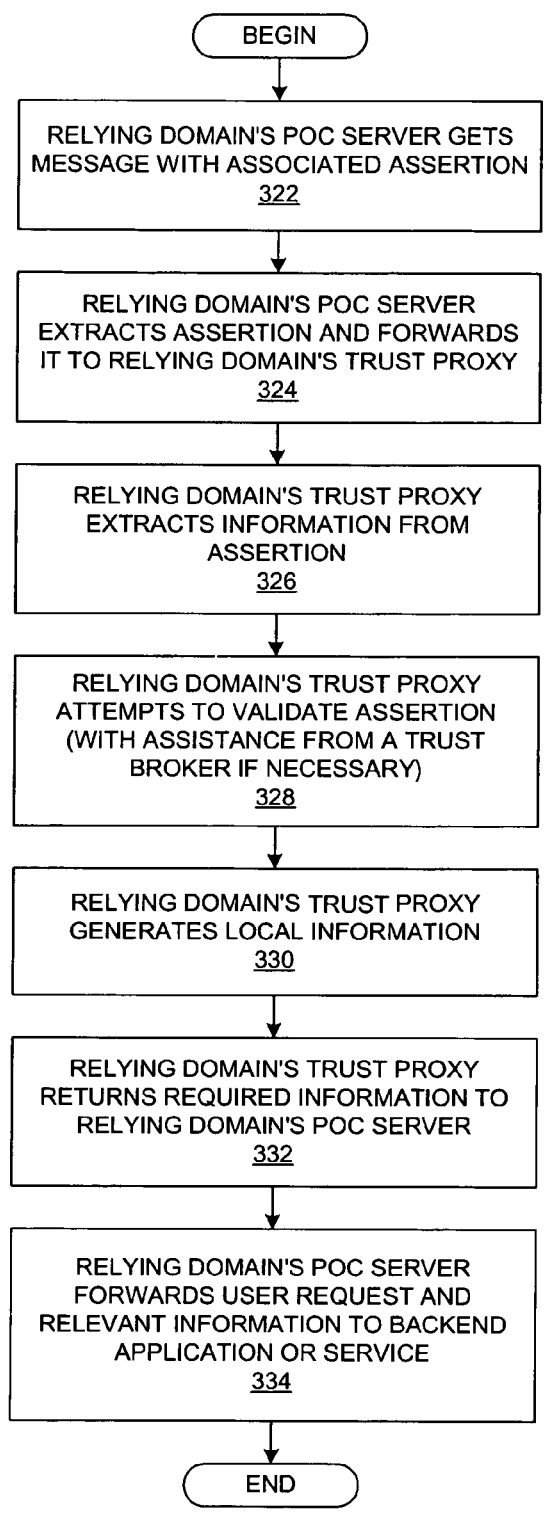
FIG. 3B depicts a flowchart that illustrates a generalized process at a relying domain for tearing down an assertion.
Figure 3C:
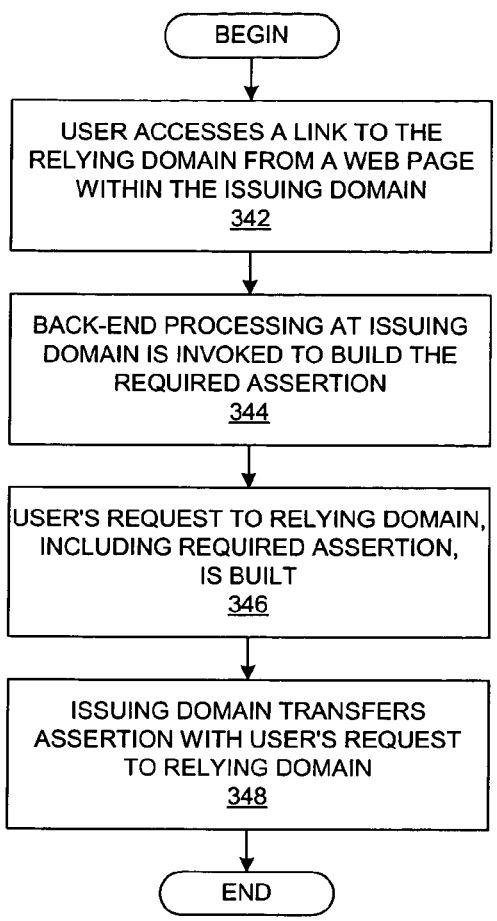
FIG. 3C depicts a flowchart that illustrates a specific process for pushing an assertion from an issuing domain to a relying domain in response to a user action at the issuing domain.
Figure 3D:
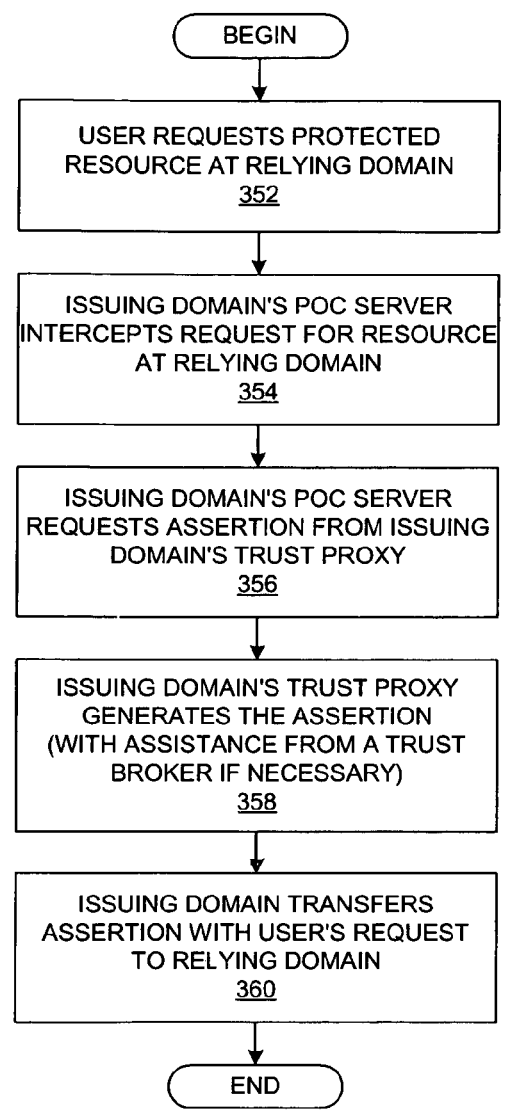
FIG. 3D depicts a flowchart that illustrates a specific process for pushing an assertion from an issuing domain to a relying domain in response to the issuing domain actively intercepting an outgoing request to the relying domain.
Figure 3E:
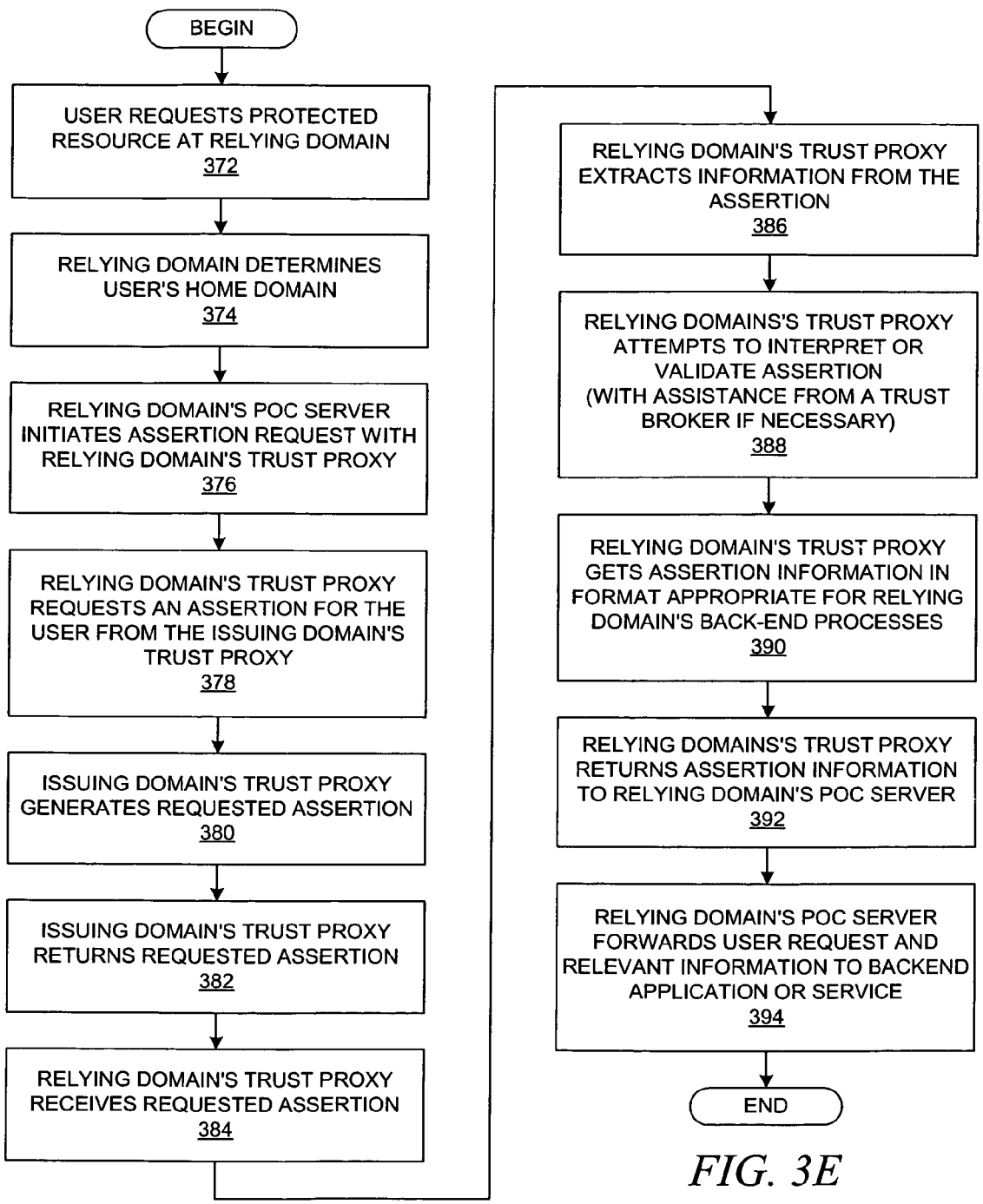
FIG. 3E depicts a flowchart that illustrates a pull model in which a relying domain requests any required assertions for a user from an issuing domain while attempting to satisfy a resource request that was received by the relying domain from the requesting user.

Given these models for using assertions within a federated environment, the description of the present invention now turns to a set of figures that describe a set of processes for creating and using assertions within the federated environment of the present invention. FIG. 3A depicts a generalized process at an issuing domain or an issuing party for creating an assertion within a federated environment, whereas FIG. 3B depicts a generalized process at a relying domain or a relying party for "tearing down" an assertion, i.e. for reducing an assertion to its essential information by extracting and analyzing its information. FIG. 3C and FIG. 3D show more detailed processes for the generalized process that is shown in FIG. 3A by depicting two variants of a push model in which an assertion is produced within an issuing domain and is then transferred with a user's request to the relying domain. FIG. 3E depicts a pull model in which a relying domain requests any required assertions for a user from an issuing domain while attempting to satisfy a resource request that was received by the relying domain from the requesting user.

With reference now to FIG. 3A, a flowchart depicts a generalized process at an issuing domain for creating an assertion within a federated environment. The process begins when the issuing domain's point-of-contact server is triggered for an assertion (step 302). The point-of-contact server may receive a request for a particular assertion for a given user from a relying domain, or it may intercept an outgoing request to a known relying domain that requires an assertion; these scenarios are described in more detail below with respect to FIG. 3C and FIG. 3D, respectively. In response to being triggered for an assertion, the issuing domain's point-of-contact server requests the assertion from the issuing domain's trust proxy (step 304), which generates the assertion (step 306), along with adding trust information, such as encryption/signature of the assertion/token; the issuing domain's trust proxy may request assistance from a trust broker to generate the required assertion if necessary. After generating the assertion, the issuing domain's trust proxy then returns the assertion to the issuing domain's point-of-contact server (step 308), which then injects the assertion into the output datastream in an appropriate manner (step 310), e.g., by inserting the assertion into an outgoing HTTP or SOAP message, thereby completing the process.

FIG. 3A depicts a process for creating an assertion at an issuing domain without the use of a "local wallet". However, the present invention allows for the inclusion of local wallet functionality. In general, a local wallet is client-side code that may act as a secure datastore for user attribute information or other information for facilitating transactions; the client-side code may also participate in the push and/or pull models of assertion transfer. When the local wallet actively participates in the protocol, it implements a subset of the functionality of the point-of-contact server functionality in terms of generating and inserting assertions into the protocol flow. Using a local wallet does not allow for the local wallet to implement the trust-based interactions that occur between a point-of-contact server and the trust proxy. In cases in which additional trust relationships are required, the point-of-contact server must be invoked.

With reference now to FIG. 3B, a flowchart depicts a generalized process at a relying domain for tearing down an assertion. The process begins when a relying domain's point-of-contact server receives a message with an associated assertion (step 322), after which it extracts the assertion and forwards the assertion to the relying domain's trust proxy (step 324). The relying domain's trust proxy extracts information from the assertion, including the token received from the issuing domain (step 326); the relying domain's trust proxy will invoke the security token service to validate this token, including the information in the token and the trust information on the token such as encryption and signatures, thereafter returning a locally valid token for the user if appropriate (step 328).

As part of step 326, the trust proxy will determine the source, i.e. issuing party, of the assertion. If the trust proxy is able to understand a trust assertion received from this issuing domain, the trust proxy will perform step 328 internally. If the trust proxy is not able to understand/trust assertions received from the issuing domain, the trust proxy may invoke assistance from a trust broker. If the assertion cannot be validated, then an appropriate error response would be generated.

Assuming that the assertion is validated, then the relying domain's trust proxy builds the local information that is required for the user (step 330). For example, the local information may include authentication credentials that are required by a back-end legacy application. The relying domain's trust proxy returns the required information to the relying domain's point-of-contact server (step 332), which builds a local session for the user.

After the point-of-contact server builds a session for user, the user appears as an authenticated user. The point-of-contact server can use this session information to further govern any transactions the user has with the domain until a logout or timeout event is initiated. Given that the point-of-contact server has an authenticated identity for the user, the point-of-contact server may obtain authorization for this request if necessary based on this particular user's identity and any authorization policies that are associated with this particular user. The point-of-contact server then forwards the user's request with any relevant information to the requested back-end application or service (step 334), thereby completing the process.

It should be noted that the data items that are transferred between the point-of-contact server and the trust proxy and the format of those data items may vary. Rather than extracting an assertion from the message and forwarding only the assertion to the trust proxy, the point-of-contact server may forward the entire message to the trust proxy. For example, the processing at the trust proxy may include steps like signature validation on a SOAP message, which would require the entire SOAP envelope.

With reference now to FIG. 3C, a flowchart depicts a specific process for pushing an assertion from an issuing domain to a relying domain in response to a user action at the issuing domain. The process begins when a user accesses a link to the relying domain from a Web page or similar resource within the issuing domain (step 342), thereby invoking some form of CGI-type (Common Gateway Interface) processing to build a particular assertion. The ability of the issuing domain to recognize the need for an assertion by the relying domain implies a tight integration with an existing legacy system on which the federated infrastructure of the present invention is implemented. It also implies a tight coupling between the issuing party and relying party such that the issuing party does not need to invoke a trust proxy to build the required assertion; this tight coupling may be appropriate between certain types of federated entities that have well-established trust relationships.

Back-end processing at the issuing domain is invoked to build the required assertion (step 344), which may include invoking functionality at the local trust proxy. The user's request to the relying domain, including the required assertion, is then built (step 346), and the issuing domain transfers the assertion along with the user's request to the relying domain (step 348), thereby completing the process. When the relying domain receives the request and its associated assertion, then the relying domain would validate the assertion in the manner shown in FIG. 3B.

With reference now to FIG. 3D, a flowchart depicts a specific process for pushing an assertion from an issuing domain to a relying domain in response to the issuing domain actively intercepting an outgoing request to the relying domain. The process begins when a user requests a protected resource at the relying domain (step 352). The point-of-contact server intercepts the outgoing request (step 354), e.g., by filtering outgoing messages for predetermined Uniform Resource Identifiers (URI's), certain types of messages, certain types of message content, or in some other manner. The issuing domain's point-of-contact server then requests the generation of an appropriate assertion from the issuing donain's trust proxy (step 356), which generates the assertion with assistance from a trust broker if necessary (step 358). The issuing domain then transfers the user's request along with the generated assertion to the relying party (step 360), thereby completing the process. When the relying domain receives the request and its associated assertion, then the relying domain would validate the assertion in the manner shown in FIG. 3B.

With reference now to FIG. 3E, a flowchart depicts a pull model in which a relying domain requests any required assertions for a user from an issuing domain while attempting to satisfy a resource request that was received by the relying domain from the requesting user. The process begins when the relying domain receives a user request for a protected resource (step 372). In contrast to the examples shown in FIG. 3C or FIG. 3D, the example that is shown in FIG. 3E describes the processing that is associated with a user's request that is received at a relying domain in absence of any required assertions about a user. In this case, the issuing domain has not had the ability to intercept or otherwise process the user's request in order to insert the required assertions in the user's request. For example, the user might have entered a Uniform Resource Locator (URL) or used a bookmarked reference to a resource in such a way that the outgoing request was not intercepted by an issuing domain's point-of-contact server. Hence, the relying domain requests the assertion from an issuing domain.

The relying domain then determines the user's home domain (step 374), i.e. the relevant issuing domain. In an HTTP-based implementation, the user may have pre-established a relationship with the relying domain that resulted in a persistent cookie being set by the relying domain at the user's client device. The persistent cookie would contain an identity of the user's home domain or identity provider, i.e. the relevant issuing domain. In a SOAP-based implementation in which the user is operating a web services client in some manner, the web service at the relying domain would have advertised the services requirements via WSDL (Web Services Description Language), including token requirements. This would then require the user's web services client/SOAP implementation to provide the required token type. If this requirement was not fulfilled, then the web service would technically return an error. In some cases, it may return an error code that would allow the user's web services client to be prompted for authentication information so that the request could be repeated with the appropriate token.

The relying domain's point-of-contact server initiates an assertion request with the relying domain's trust proxy (step 376), which requests an assertion for the user from the issuing domain's trust proxy (step 378). If the embodiment is employing HTTP-based communication, then an assertion request from the relying domain's trust proxy to the issuing domain's trust proxy may be transmitted by the relying domain's point-of-contact server via redirection through the user's browser application to the point-of-contact server at the issuing domain, which forwards the assertion request to the issuing domain's trust proxy.

If the embodiment is employing a SOAP-based implementation, then the relying party may return an error code to the user's web service client. This error code allows the user to be prompted for authentication information by their web services client. The web services client would then generate the requested token. The user's web services client could invoke a trust proxy directly provided that the relying domain's trust proxy was advertised in a UDDI (Universal Description, Discovery, and Integration) registry, allowing the user's web services client to find the trust proxy. In general, this scenario is valid only for an internal user, where the trust proxy was advertised in a private UDDI within the enterprise because it is not likely that a trust proxy will be advertised in a public UDDI on the Internet or generally accessible outside of a federation.

The issuing domain's trust proxy generates (step 380) and then returns the requested assertion (step 382) in a manner that mirrors the manner in which the assertion request was received. After the relying domain's trust proxy receives the requested assertion (step 384), then the relying domain's trust proxy extracts information from the assertion (step 386) and attempts to interpret and/or validate the assertion (step 388);

the trust proxy may invoke assistance from a trust broker if necessary for translation of the assertion. If the assertion cannot be validated, then an appropriate error response would be generated. Assuming that the assertion is validated, then the relying domain's trust proxy builds the local information in an appropriate format that is required for use by the back-end services that will attempt to fulfill the user's request for the protected resource (step 390). For example, the local information may include authentication credentials that are required by a back-end legacy application. The relying domain's trust proxy returns the required information to the relying domain's point-of-contact server (step 392), which then builds a local session for the user and forwards the user's request with any relevant information to the requested back-end application or service (step 394), thereby completing the process.

Single-Sign-On Within Federated Architecture

The description of FIGS. 2A-2D focuses on the operational characteristics of entities within a federated data processing environment in accordance with the present invention, whereas the description of FIGS. 3A-3E focuses on some of the processes that occur between those entities. In contrast to these descriptions, reference is made to FIG. 4 for a description of the present invention that focuses on the goals of completing transactions for a user while providing a single-sign-on experience for the user.

In other words, the description hereinbelow discusses the entities and processes that were already discussed above, although the following description focuses more on an overview perspective of the present invention with respect to the manner in which a user can have a single-sign-on experience within the user's session. A session can be defined as the set of transactions from (and including) the initial user authentication, i.e. logon, to logout. Within a session, a user's actions will be governed in part by the privileges granted to the user for that session. Within a federation, a user expects to have a single-sign-on experience in which the user completes a single authentication operation, and this authentication operation suffices for the duration of their session, regardless of the federation partners visited during that session.

During the user's session, the user may visit many federated domains to use the web services that are offered by those domains. Domains can publish descriptions of services that they provide using standard specifications such as UDDI and WSDL, both of which use XML as a common data format. The user finds the available services and service providers through applications that also adhere to these standard specifications. SOAP provides a paradigm for communicating requests and responses that are expressed in XML. Entities within a federated environment may employ these standards among others.

To facilitate a single-sign-on experience, web service that support the federated environment will also support using an authentication assertion or security token generated by a third-party to provide proof of authentication of a user. This assertion will contain some sort of evidence of the user's successful authentication to the issuing party together with an identifier for that user. Thus, a user may present traditional authentication credentials to one federation partner, e.g., username and password, and then provide a SAML authentication assertion that is generated by the authenticating/issuing party to a different federation partner.

Authentication in a web services environment is the act of verifying the claimed identity of the web services request so that the enterprise can restrict access to authorized clients. A user who requests or invokes a web service would almost always authenticated, so the need for authentication within the federated environment of the present invention is not any different from current requirements of web services for user authentication. The federated environment also allows web services or other applications to request web services, and these web services would also be authenticated.

Authentication of users that are not participating in a federated session are not impacted by the federated architecture of the present invention. For example, an existing user who authenticates with a forms-based authentication mechanism over HTTP/S to access non-federated resources at a particular domain is not affected by the introduction of support at the domain for the federated environment. Authentication is handled in part by a point-of-contact server, which in turn may invoke a separate trust proxy component. The use of a point-of-contact server minimizes the impact on the infrastructure of an existing domain. For example, the point-of-contact server can be configured to pass through all non-federated requests to be handled by the back-end or legacy applications and systems at the domain.

The point-of-contact server may choose to invoke an HTTP-based authentication method, such as basic authentication, forms-based authentication, or some other authentication method. The point-of-contact server also supports a federation trust domain by recognizing an assertion that has been presented by the user as proof of authentication, such as an SAML authentication assertion, wherein the assertion has crossed between enterprise trust domains. The point-of-contact server may invoke the trust proxy, which in turn may invoke its security token service for validation of authentication credentials/security tokens.

Authentication of web services or other applications comprises the same process as authentication of users. Requests from web services carry a security token containing an authentication assertion, and this security token would be validated by the trust proxy/security token service in the same manner as a token presented by a user. A request from a web service should always carry this token with it because the web service would have discovered what authentication assertions/security tokens were required by the requested service as advertised in UDDI.

Figure 4:
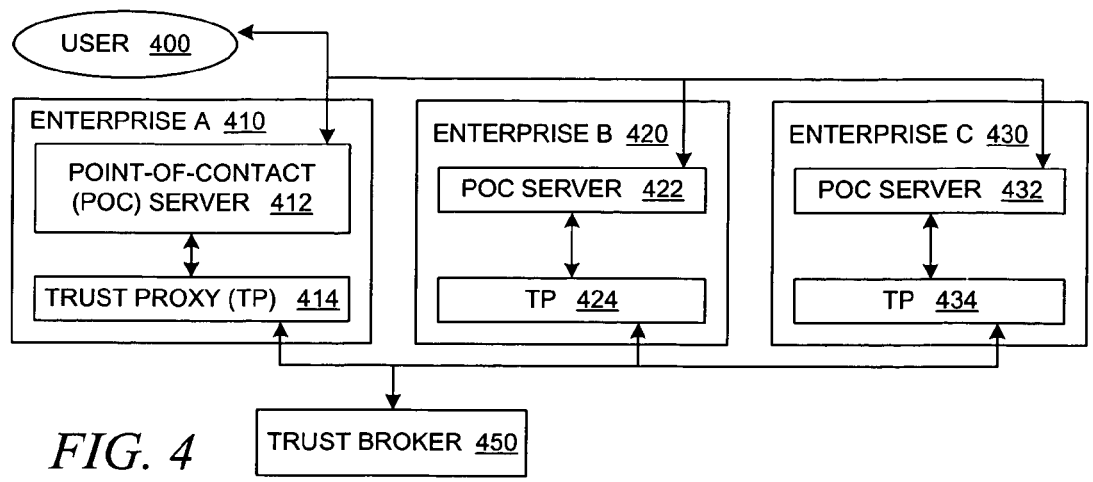
FIG. 4 depicts a block diagram that illustrates a federated environment that supports federated single-sign-on operations.

With reference now to FIG. 4, a block diagram depicts a federated environment that supports federated single-sign-on operations. User 400, through a client device and an appropriate client application, such as a browser, desires to access a web service that is provided by enterprise/domain 410, which supports data processing systems that act as a federated domain within a federated environment. Domain 410 supports point-of-contact server 412 and trust proxy 414; similarly, domain 420 supports point-of-contact server 422 and trust proxy 424, while domain 430 supports point-of-contact server 432 and trust proxy 434. The trust proxies rely upon trust broker 450 for assistance, as described above. Additional domains and trust proxies may participate in the federated environment. FIG. 4 describes a federated single-sign-on operation between domain 410 and domain 420; a similar operation may occur between domain 410 and domain 430.

The user completes an authentication operation with respect to domain 410; this authentication operation is handled by point-of-contact server 412. The authentication operation is triggered when the user requests access to some resource that requires an authenticated identity, e.g., for access control purposes or for personalization purposes. Point-of-contact server 412 may invoke a legacy authentication service, or it may invoke trust proxy 414 to validate the user's presented authentication credentials. Domain 410 becomes the user's identity provider or home domain for the duration of the user's federated session.

At some later point in time, the user initiates a transaction at a federation partner, such as enterprise 420 that also supports a federated domain, thereby triggering a federated single-sign-on operation. For example, a user may initiate a new transaction at domain 420, or the user's original transaction may cascade into one or more additional transactions at other domains. As another example, the user may invoke a federated single-sign-on operation to a resource in domain 420 via point-of-contact server 412, e.g., by selecting a special link on a web page that is hosted within domain 410 or by requesting a portal page that is hosted within domain 410 but that displays resources hosted in domain 420. Point-of-contact server 412 sends a request to trust proxy 414 to generated a federation single-sign-on token for the user that is formatted to be understood or trusted by domain 420. Trust proxy 414 returns this token to point-of-contact server 412, which sends this token to point-of-contact server 422 in domain. Domain 410 acts as an issuing party for the user at domain 420, which acts as a relying party. The user's token would be transferred with the user's request to domain 420; this token may be sent using HTTP redirection via the user's browser, or it may be sent by invoking the request directly of point-of-contact server 422 (over HTTP or SOAP-over-HTTP) on behalf of the user identified in the token supplied by trust proxy 414.

Point-of-contact server 422 receives the request together with the federation single-sign-on token and invokes trust proxy 424. Trust proxy 424 receives the federation single-sign-on token, validates the token, and assuming that the token is valid and trusted, generates a locally valid token for the user. Trust proxy 424 returns the locally valid token to point-of-contact server 422, which establishes a session for the user within domain 420. If necessary, point-of-contact server 422 can initiate a federated single-sign-on at another federated partner.

Validation of the token at domain 420 is handled by the trust proxy 424, possibly with assistance from a security token service. Depending on the type of token presented by domain 410, the security token service may need to access a user registry at domain 420. For example, domain 420 may provide a binary security token containing the user's name and password to be validated against the user registry at domain 420. Hence, in this example, an enterprise simply validates the security token from a federated partner. The trust relationship between domains 410 and 420 ensures that domain 420 can understand and trust the security token presented by domain 410 on behalf of the user.

Federated single-sign-on requires not only the validation of the security token that is presented to a relying domain on behalf of the user but the determination of a locally valid user identifier at the relying domain based on information contained in the security token. One result of a direct trust relationship and the business agreements required to establish such a relationship is that at least one party, either the issuing domain or the relying domain or both, will know how to translate the information provided by the issuing domain into an identifier valid at the relying domain. In the brief example above, it was assumed that the issuing domain, i.e. domain 410, is able to provide the relying domain, i.e. domain 420, with a user identifier that is valid in domain 420. In that scenario, the relying domain did not need to invoke any identity mapping functionality. Trust proxy 424 at domain 420 will generate a security token for the user that will "vouch-for" this user. The types of tokens that are accepted, the signatures that are required on tokens, and other requirements are all pre-established as part of the federation's business agreements. The rules and algorithms that govern identifier translation are also pre-established as part of the federation's business agreements. In the case of a direct trust relationship between two participants, the identifier translation algorithms will have been established for those two parties and may not be relevant for any other parties in the federation.

However, it is not always the case that the issuing domain will know how to map the user from a local identifier for domain 410 to a local identifier for domain 420. In some cases, it may be the relying domain that knows how to do this mapping, while in yet other cases, neither party will know how to do this translation, in which case a third party trust broker may need to be invoked. In other words, in the case of a brokered trust relationship, the issuing and relying domains do not have a direct trust relationship with each other. They will, however, have a direct trust relationship with a trust broker, such as trust broker 450. Identifier mapping rules and algorithms will have been established as part of this relationship, and the trust broker will use this information to assist in the identifier translation that is required for a brokered trust relationship.

Domain 420 receives the token that is issued by domain 410 at point-of-contract server 422, which invokes trust proxy 424 to validate the token and perform identity mapping. In this case, since trust proxy 424 is not able to map the user from a local identifier for domain 410 to a local identifier for domain 420, trust proxy 424 invokes trust broker 450, which validates the token and performs the identifier mapping. After obtaining the local identifier for the user, trust proxy 424, possibly through its security token service, can generate any local tokens that are required by the back-end applications at domain 420, e.g., a Kerberos token may be required to facilitate single-sign-on from the point-of-contact server to the application server. After obtaining a locally valid token, if required, the point-of-contact server is able to build a local session for the user. The point-of-contact server will also handle coarse-grained authorization of user requests and forward the authorized requests to the appropriate application servers within domain 420.

A user's session is terminated when they logout or sign-off. When a user logs out of a session with their home domain, then the home domain would notify all relying domains, i.e. those domains to which it has issued a security token, and invoke a user logout at these domains. If any of these relying domains has in turn acted as an issuing domain for the same user, then they would also notify all of their relying domains about the user logout request in a cascading fashion. The trust proxy at each domain would be responsible for notifying all relying domains of the user's logout request, and the trust proxy may invoke the trust broker as part of this process.

Federated User Lifecycle Management

A portion of the description of FIGS. 2A-4 above explained an organization of components that may be used in a federated environment while other portions explained the processes for supporting single-sign-on operations across the federated environment. Service providers or relying domains within a federated environment do not necessarily have to manage a user's authentication credentials, and those relying domains can leverage a single single-sign-on token that is provided by the user's identity provider or home domain. The description of FIGS. 2A-4 above, though, does not explain an explicit process by which federated user lifecycle management may be accomplished in an advantageous manner at the federated domains of federation partners.

Federated user lifecycle management functionality/service comprises functions for supporting or managing federated operations with respect to the particular user accounts or user profiles of a given user at multiple federated domains; in some cases, the functions or operations are limited to a given federated session for the user. In other words, federated user lifecycle management functionality refers to the functions that allow management of federated operations across a plurality of federated partners, possibly only during the lifecycle of a single user session within a federated computing environment.

Each federated domain might manage a user account, a user profile, or a user session of some kind with respect to the functions at each respective federated domain. For example, a particular federated domain might not manage a local user account or user profile within the particular federated domain, but the federated domain might manage a local user session for a federated transaction after the successful completion of a single-sign-on operation at the federated domain. As part of the federated user lifecycle management functionality that is supported by that particular federated domain, the federated domain can participate in a single-sign-off operation that allows the federated domain to terminate the local user session after the federated transaction is complete, thereby improving security and promoting efficient use of resources.

In another example of the use of federated user lifecycle management functionality, a user may engage in an online transaction that requires the participation of multiple federated domains. A federated domain might locally manage a user profile in order to tailor the user's experience with respect to the federated domain during each of the user's federated sessions that involve the federated domain. As part of the federated user lifecycle management functionality that is supported by that particular federated domain, the information in the federated domain's local user profile can be used in a seamless manner during a given federated transaction with information from other profiles at other federated domains that are participating in the given federated transaction. For example, the information from the user's multiple local user profiles might be combined in some type of merging operation such that the user's information is visually presented to the user, e.g., within a web page, in a manner such that the user is not aware of the different origins or sources of the user's information.

Federated user lifecycle management functionality may also comprise functions for account linking/delinking. A user is provided with a common unique user identifier across federation partners, which enables single-sign-on and the retrieval of attributes (if necessary) about a user as part of the fulfillment of a request at one federation partner. Furthermore, the federation partner can request additional attributes from an identity provider using the common unique user identifier to refer to the user in an anonymous manner.

After noting hereinabove some different examples of operations that may be accomplished using federated user lifecycle management functionality, the remaining figures hereinbelow illustrate the manner in which the present invention provides and supports federated user lifecycle management functionality in an advantageous manner.

Figure 5:
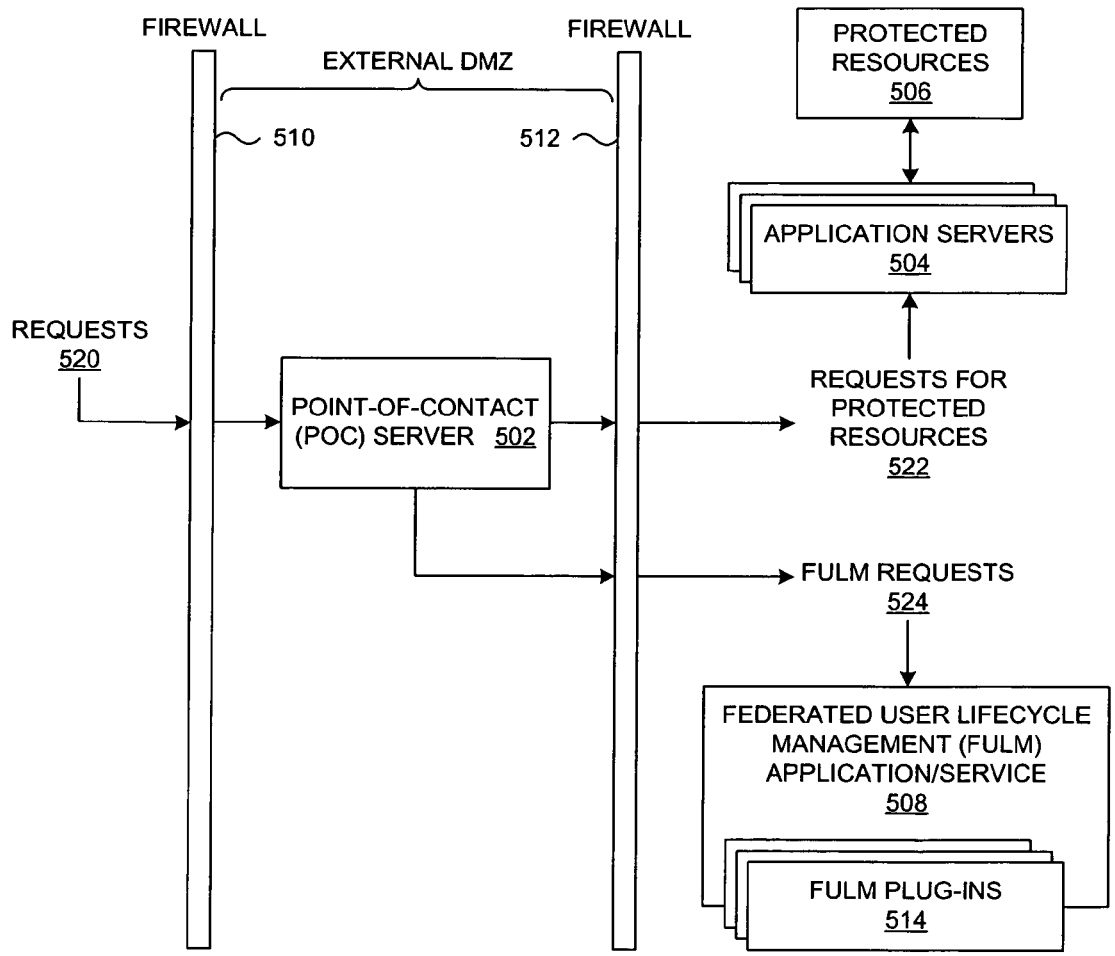
FIG. 5 depicts a block diagram that illustrates some of the components in a federated domain for implementing federated user lifecycle management functionality in accordance with an embodiment of the present invention.

With reference now to FIG. 5, a block diagram depicts some of the components in a federated domain for implementing federated user lifecycle management functionality in accordance with an embodiment of the present invention. FIG. 5 depicts elements at a single federated domain, such as the federated domain that is operated by enterprise 250 that is shown in FIG. 2C. Some of the elements in FIG. 5 are similar or identical to elements that have been discussed hereinabove with respect to other figures, such as FIG. 2B: point-of-contact server/service 502 is equivalent to point-of-contact server 242; application servers 504, i.e. resource controlling services, are equivalent to application servers 234; protected or controlled resources 506 are equivalent to protected resources 235; and federated user lifecycle management (FULM) application 508 is equivalent to federated user lifecycle management server 246. Although firewalls were not illustrated within FIG. 2B, firewalls are illustrated within FIG. 5. Firewall 510 and firewall 512 create an external DMZ (electronic DeMilitarized Zone) that protects the enterprise's computing environment from computing threats outside of the enterprise's domain, e.g., via the Internet.

The different perspectives that are shown in FIG. 5 and FIG. 2B are not incompatible or at cross-purposes. In contrast with the example that is shown in FIG. 5, FIG. 2B does not illustrate the firewalls, yet point-of-contact server 242 resides within federated front-end 240; in addition, federated user lifecycle management server 246 is contained within federated front-end 240. In FIG. 5, point-of-contact server 502 is illustrated as residing within the DMZ between firewalls 510 and 512, which form an electronic or physical front-end to the enterprise domain; in addition, federated user lifecycle management application/service 508 resides electronically behind firewall 512. The different perspectives can be reconciled by regarding federated front-end 240 and back-end 230 in FIG. 2B as a logical organization of components while regarding the DMZ and the other components in FIG. 5 as forming a physical or electronic front-end and a physical or electronic back-end, either of which may contain federated components.

Reiterating the roles of a point-of-contact entity/service, the point-of-contact entity provides session management, at least with respect to a user's interaction with the federation functionality with an enterprise's computing environment; applications within a legacy back-end of the enterprise's computing environment may also implement its own session management functionality. Assuming that an enterprise implements policy functionality with respect to the federated computing environment, the point-of-contact entity may act as a policy enforcement point to some other federation partner's policy decision point. In addition, assuming that it is permissible given the implementation of the federation functionality, the point-of-contact entity is responsible for initiating a direction authentication operation against a user in those scenarios in which a single-sign-on operation is not employed. As such, the point-of-contact entity may be implemented in a variety of forms, e.g., as a reverse proxy server, as a web server plug-in, or in some other manner. The point-of-contact functionality may also be implemented within an application server itself, in which case the federated user lifecycle management services may be located within the DMZ.

More importantly, referring again to FIG. 5, federated user lifecycle management application 508 also comprises support for interfacing to, interacting with, or otherwise interoperating with federated user lifecycle management plug-ins 514, which are not shown in FIG. 2B. In the present invention, federated protocol runtime plug-ins provide the functionality for various types of independently published or developed federated user lifecycle management standards or profiles, such as: WS-Federation Passive Client; Liberty Alliance ID-FF Single Sign On (B/A, B/P and LECP); Register Name Identifier; Federation Termination Notification; and Single Logout.

In an exemplary embodiment of the present invention, different sets of federated protocols may be accessed at different URI's. This approach allows the federated user lifecycle management application to concurrently support multiple standards or specifications of federated user lifecycle management, e.g., the WS-Federation web services specification versus the Liberty Alliance's specifications, within a single application, thereby minimizing the configuration impact on the overall environment for supporting different federation protocols.

More specifically, the appropriate federated user lifecycle management functionality is invoked by the point-of-contact server by redirecting and/or forwarding user requests to the federated user lifecycle management application as appropriate. Referring again to FIG. 5, point-of-contact server 502 receives user requests 520, which are then analyzed to determine the type of request that has been received, which might be indicated by the type of request message that has been received or, as noted above, by determining the destination URI within the request message. While requests 522 for protected resources continue to be forwarded to application servers 504, requests 524 for federated user lifecycle management functions, e.g., a request to invoke a single-sign-off operation, are forwarded to federated user lifecycle management application 508, which invokes the appropriate federated user lifecycle management plug-in as necessary to fulfill the received request. When a new federation protocol or a new federated function is defined, or when an existing one is somehow modified or refined, support can be added simply by plugging a new support module or can be refined by modifying a previously installed plug-in.

The exemplary implementation of a federated user lifecycle management application in FIG. 5 illustrates that the federated user lifecycle management application is able to support multiple, simultaneous, federated user lifecycle management functions while providing a pluggability feature, thereby allowing new functionality to be added to the federated user lifecycle management application in the form of a plug-in when needed without requiring any changes to the existing infrastructure. For example, assuming that the present invention is implemented using a Java™-based federated user lifecycle management application, support for a new federation protocol, such as a newly published single-sign-on protocol, can be added by configuring newly developed Java™ classes to the Java™ CLASSPATH of the federated user lifecycle management application, wherein these new classes support the new standard along with the protocol interface of the present invention.

The present invention leverages the existing environment in which a federated user lifecycle management solution is to be integrated. The federated user lifecycle management application can be easily modified to support new protocols/standards as they evolve with minimal changes to the overall infrastructure. Any changes that might be required to support new federated user lifecycle management functionality are located almost exclusively within the federated user lifecycle management application, which would require configuring the federated user lifecycle management application to understand the added functionality.

There may be minimal configuration changes in other federated components, e.g., at a point-of-contact server in order to allow the overall infrastructure to be able to invoke new federated user lifecycle management functionality while continuing to support existing federated user lifecycle management functionality. However, the federated user lifecycle management applications are functionally independent from the remainder of the federated components in that the federated user lifecycle management applications may require only minimal interaction with other federated components of the federated environment. For example, in an exemplary embodiment, the federated user lifecycle management functionality may integrate with an enterprise-based datastore, e.g., an LDAP datastore, if federated user lifecycle management information, such as Name Identifier values in accordance with the Liberty Alliance profiles, are to be stored in an externally-accessible federated user lifecycle management datastore as opposed to a private, internal, federated user lifecycle management datastore that is not apparent or accessible to external entities.

Hence, an existing environment needs minimal modifications to support federated user lifecycle management functionality when implemented in accordance with the present invention. Moreover, changes to federated user lifecycle management functionality, including the addition of new functionality, have minimal impact on an existing federated environment. Thus, when a new single-sign-on standard is published, support for this standard is easily added.

Traditional user authentication involves interaction between an enterprise's computing environment and the end-user only; the manner in which the enterprise chooses to implement this authentication interchange is the choice of the enterprise, which has no impact any other enterprise. When federation or cross-domain single-sign-on functionality is desired to be supported, however, it becomes a requirement that enterprise partners interact with each other. This requirement cannot be done scalably using proprietary protocols. Although adding support for standards-based federation protocols directly to a point-of-contact entity seems like a robust solution, the point-of-contact entity, which is already an existing component within the enterprise's computing environment, must be modified; moreover, it must be modified every time that one of these public federation protocols changes.

The present invention provides a more modular approach by moving this functionality out of the point-of-contact entity. However, the point-of-contact entity also has to deal with frequent changes to these public protocols, and allowing this functionality to be pluggable makes it easy to maintain migrations or updates to these protocols.

Functional Support for Federated User Lifecycle Management

Prior art, standards-based, single-sign-on solutions, such as the WS-Federation specification or the Liberty Alliance ID-FF profiles, provide models for federated user lifecycle management to some extent. These specifications are publicly available and can be implemented by independent vendors and businesses. However, these prior art specifications do not address the manner in which an existing environment should be modified in order to include the functionality that is defined within the specifications; there is an implication in these prior art specifications that the modifications that would be required on the infrastructure of existing computing environments in order to incorporate the specified functionality might inhibit the adoption of these specifications. For example, all prior art proprietary single-sign-on solutions have operated in this manner.

In contrast, a goal of the present invention is to provide methods and systems for incorporating functionality to implement federation specifications such that minimal modifications would be required on the infrastructure of existing computing environments, as previously discussed hereinabove. This goal is also applicable to the incorporation of functionality for supporting federated user lifecycle management. Whereas FIG. 2B and FIG. 5 illustrate examples of logical organizations of components that may be used to implement an embodiment of the present invention with respect to federated user lifecycle management functionality, FIG. 6 depicts a process for enabling federated user lifecycle management functionality in accordance with an embodiment of the present invention.

Figure 6:
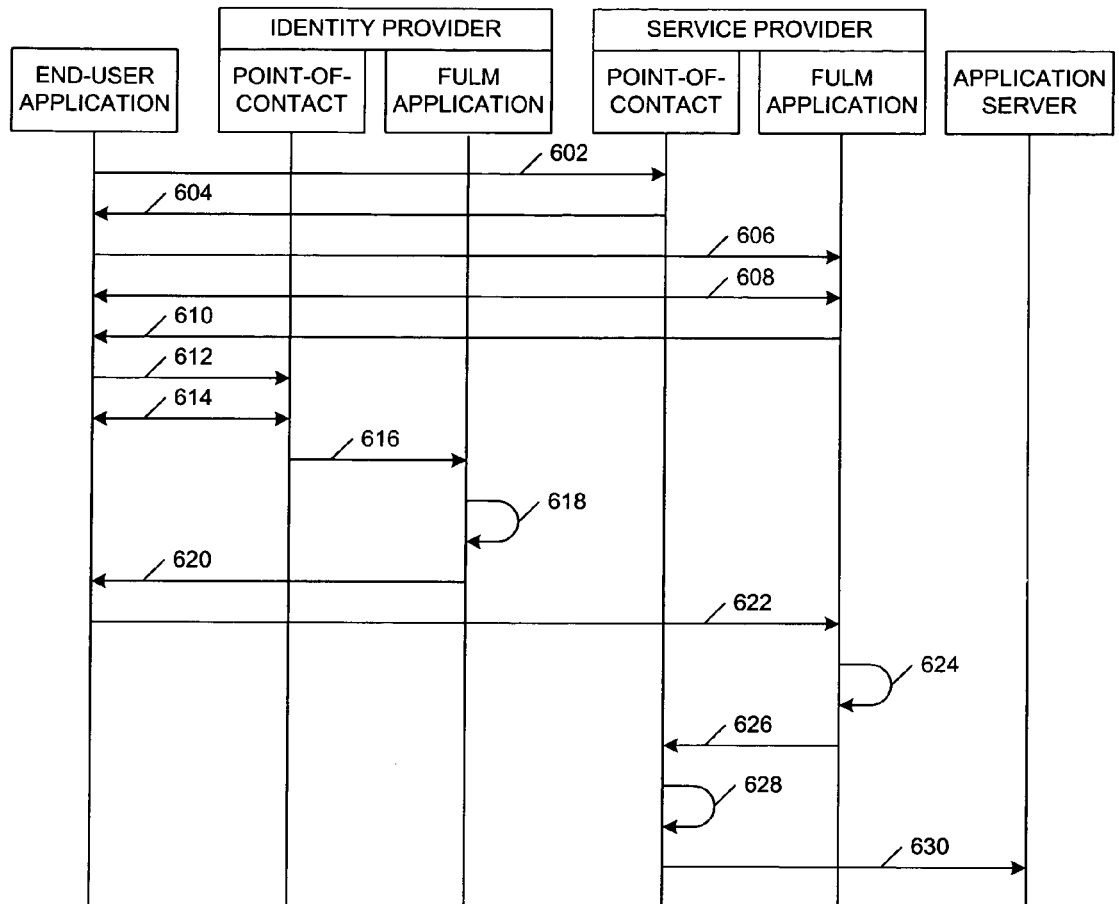
FIG. 6 depicts a dataflow diagram that illustrates a process for performing a single-sign-on operation using federated user lifecycle management functionality in accordance with an embodiment of the present invention.

More importantly, FIG. 6 illustrates a process that allows for federated user lifecycle management functionality to be implemented in a manner that is independent of the manner in which the point-of-contact functionality is implemented within a federated domain. A point-of-contact functional entity corresponds to an entity that is capable of performing session management for a user/client. Session management includes creating a session based on some form of information, whether a previously successful direct authentication operation, a presently successful direct authentication operation, and/or a successful single-sign-on operation; session management also comprises other operations on the session, which may include optional authorization decisions and may also include session termination, such as session expiration, deletion, inactivity timeout, etc. A point-of-contact server may continue to provide support for authentication operations in which it may handle a direct challenge/response interaction with a user. The point-of-contact entity may also act as a policy enforcement point, thereby enabling authorization services as part of session management.

Federated user lifecycle management functionality provides single-sign-on services (along with other federated operations) because these operations involve interaction with third parties, such as identity providers, and not just end-users; federated user lifecycle management functionality relies on the point-of-contact functionality for session management services. Federated user lifecycle management functionality requires or relies on a trust service that is provided by some other component, as explained in more detail hereinbelow; the trust service may be implemented in a manner such that it is logically separate, including distributed components or a logically separate component that is co-resident with the federated user lifecycle management components, or alternatively, the trust service may be implemented together with the federated user lifecycle management as part of a single application, e.g., such as an EAR file.

Although the preceding discussion of the figures hereinabove described a dedicated point-of-contact server that is supported within a federated domain, the process that is described with respect to FIG. 6 does not require a dedicated point-of-contact server. In the embodiment of the present invention that is illustrated in FIG. 6, the point-of-contact functionality can be implemented using any application or other entity that provides point-of-contact functionality; the point-of-contact application may be a reverse proxy server, a web server, a web server plug-in, a servlet filter, or some other type of server or application. In order to distinguish the point-of-contact functionality that is described hereinbelow with respect to the exemplary process for implementing the subsequent embodiments versus the point-of-contact server that was described hereinabove, the point-of-contact functionality hereinbelow is referenced as a point-of-contact entity or a point-of-contact service.

It should also be noted that although FIG. 6 depicts a single-sign-on operation within a federated computing environment, similar processes could be implemented for other types of federated operations, e.g., a single-sign-off operation, in accordance with different embodiments of the present invention.

With reference now to FIG. 6, a dataflow diagram depicts a process for performing a single-sign-on operation using federated user lifecycle management functionality in accordance with an embodiment of the present invention. FIG. 6 shows a pseudo-UML diagram of the dataflows and interactions between an identity provider and a service provider that support federated functionality in accordance with the present invention, particularly with respect to federated user lifecycle management functionality that is provided by the present invention. In general, the process that is shown in FIG. 6 commences when the point-of-contact entity of a service provider receives a request for a protected resource that is supported within the federated computing environment of the service provider. Instead of invoking its own authentication methods, the point-of-contact entity at the service provider redirects the request, forwards the request, or otherwise invokes functionality to send the initial request to the federated user lifecycle management application that is supported within the federated computing environment of an identity provider. As explained in more detail hereinbelow, the federated user lifecycle management application is able to determine the appropriate manner for authenticating the user and the appropriate manner for returning to the point-of-contact entity the information that is required by the point-of-contact entity to initiate a session for the user at the service provider and to process the remainder of the user's transaction at the service provider as if the user had completed an authentication operation directly with the service provider.

The process in FIG. 6 commences with the point-of-contact entity at the service provider receiving an original request for a controlled resource from an unauthenticated user (step 602); the original request can be regarded as initiating a transaction for the user, although the received request may be merely one of many downstream transactions that are supporting a more complex transaction. In one embodiment, the service provider may determine that the original request is from an unauthenticated user by detecting that the request is from a end-user or an end-application for which the service provider does not have a record of an ongoing session.

The point-of-contact entity then generates a request which redirects, forwards, or otherwise invokes functionality to send the original request to the federated user lifecycle management application at the service provider (step 604); the point-of-contact entity may use any means of invoking the federated user lifecycle management functionality that allows the federated user lifecycle management functionality to build the response message that must be sent to the identity provider; in other words, the point-of-contact entity does not have to include functionality to serve/respond to these complicated single-sign-on messages. In the example that is shown in FIG. 6, the original request is subsequently redirected (step 606) via the originating application, e.g., a browser application that is being operated by an end-user, to the federated user lifecycle management application at the service provider.

After receiving the request, the federated user lifecycle management application at the service provider then determines the appropriate identity provider for the user by communicating with the end-user application (step 608). This step is optional; given that the identity provider is a federated partner of the service provider within a particular federated computing environment, the service provider may be already configured with information for the location or the contact information of the point-of-contact entity at the identity provider, e.g., a URL; alternatively, the service provider may perform a lookup operation to obtain the location or the contact information of the point-of-contact entity at the identity provider after determining the identity of the particular identity provider that is to be used for the end-user's transaction. In some cases, the service provider may know the identity of the identity provider that is to be used because the service provider only knows about one identity provider, hence no choice is involved. In other cases, the service provider may know the identity of the identity provider based on some persistent, user-side-maintained information, such as a persistent HTTP cookie. In yet other cases, the service provider may need to interact with the user at step 608 to have the user provide information to the service provider about the identity of the identity provider that the user desires to employ for the current federated transaction. Once the service provider has the identity of the identity provider, the service provider can obtain the appropriate URI for that identity provider's single-sign-on functionality (or other federated functionality, depending on the type of federated operation or transaction that is currently being completed) from an appropriate datastore. The present invention is also compatible with another manner of performing step 608; the Liberty Alliance specifications describe interaction in which the user actually fronts a redirect to some other site from which information from a cookie can be obtained (performed in this manner due to restrictions on operations with respect to DNS cookies), which is then returned to the federated user lifecycle management functionality without direct user interaction, e.g., without the user having to provide information within an HTML form.

The federated user lifecycle management application at the service provider then generates and sends a request for a federated user lifecycle management function or operation at the identity provider (step 610), e.g., a request to obtain any appropriate information for successfully completing a single-sign-on operation. The request may be embedded within or accompanied by a security token that indicates that the identity provider can trust the communication from the service provider; preferably, trust between the service provider and the identity provider is provided by signatures and encryption on the request message, and a security token may be represented by a digital certificate that accompanies the request. The request for the federated user lifecycle management operation may be accompanied by information about the original request from the end-user application because the federated user lifecycle management operation may be performed in a variety of manners that is dependent upon the type of request that was made to the service provider by the end-user application.

The request for the federated user lifecycle management function or operation is received and redirected through the end-user application to the point-of-contact entity at the identity provider (step 612) using the previously determined contact information for the point-of-contact entity at the identity provider. The present invention is compatible with various ways of accomplishing step 612; for example, the Liberty Alliance specifications have allowances for the type of redirection to be device-specific, and the federated user lifecycle management functionality within the present invention can swap between an HTTP redirection in reaction to an HTTP response with status value "302" and an HTTP redirection in reaction to an HTTP response with status value "200" (OK) using an HTTP POST message based on mobile device versus Internet.

After the point-of-contact entity at the identity provider receives the request for the federated user lifecycle management function or operation, the point-of-contact entity at the identity provider may perform an optional authentication operation with respect to the end-user or the end-user's application (step 614). An authentication operation is always required if the identity provider does not have a valid session for the user; without this, the identity provider is not able to determine who the user is for single-sign-on purposes. Authentication may be required even if there is a valid session for the user in order to ensure that the user is still active or in order to be able to prove a higher level of credentials. It should be noted that the service provider may specify that a new authentication operation should not be performed by the identity provider, such that if there is no valid session for the user, then the single-sign-on operation must fail. The type of authentication operation may vary such that it may be performed automatically or may require input from the user, a biometric or other type of authentication device, or from some other information source. For example, if an new authentication operation is required, e.g., to maintain a high level of security that ensures that the end-user is an authorized requester for the controlled resource as identified within the original request, then the authentication operation may be required. In a different scenario, an authentication operation may be required, but the point-of-contact entity at the identity provider may have access to information that indicates that the identity provider already has an active session for the end-user, thereby obviating the need to complete a subsequent authentication operation at step 614.

The point-of-contact entity at the identity provider then sends the received request for the federated user lifecycle management function or operation that has been requested by the federated user lifecycle management application at the service provider to the federated user lifecycle management application at the identity provider (step 616). After analyzing the request, the federated user lifecycle management application at the identity provider builds (step 618) a response that contains or is accompanied by the end-user-specific information that is sought by the federated user lifecycle management application at the service provider. For example, the identity provider may support databases that contain confidential identity information or other attribute information about the end-user that is not stored elsewhere within a federated computing environment. As noted above, the received request for the federated user lifecycle management operation may have been accompanied by information about the original request from the end-user application because the federated user lifecycle management operation may be performed in a variety of manners that is dependent upon the type of request that was made to the service provider by the end-user application. Likewise, the response from the federated user lifecycle management application at the identity provider may be tailored in some manner to the originally identified, controlled resource.

The federated user lifecycle management application at the identity provider then sends the response to the end-user application (step 620), e.g., using an HTTP POST/Redirect message, which then redirects the message to the federated user lifecycle management application at the service provider (step 622). It should be noted that the identity provider may simply return a pointer or similar type of indirect reference data item that points to the information that is expected by the service provider; in that case, the service provider must use the received pointer (also known as an artifact) to retrieve the information, e.g., by performing a back-channel request to the identity provider to retrieve the user-specific information that is to be used by the service provider.

Assuming that the received message does not contain an error code or otherwise indicate that the federated user lifecycle management application at the identity provider was not able to successfully complete the requested federated user lifecycle management function or operation, then the federated user lifecycle management application at the service provider extracts the information that it requires from the received response and builds a response for the point-of-contact entity at the service provider (step 624). The federated user lifecycle management application at the service provider then sends/returns the generated response to the point-of-contact entity at the service provider in some manner (step 626).

The federated user lifecycle management application can be implemented as a Java™ application, e.g., as a. EAR file, that is installed behind a firewall within a domain. The characteristics of the response that is returned to the point-of-contact entity is configurable as part of the installation and configuration of the federated user lifecycle management application; hence, the federated user lifecycle management application is not dependent on the form of the point-of-contact entity. In other words, the federated user lifecycle management application does not depend on the nature of the point-of-contact entity other than its identifying or location information, i.e. the manner in which transactional control is returned to it, and the content of the information that it requires when returning transactional control to it. This approach minimizes the impact on the existing infrastructure of the computing environment of the federated partner by allowing any federated user lifecycle management functionality, e.g., single-sign-on operations, single-sign-off operations, account linking, account delinking, etc., to be de-coupled from the session management functionality that is offered by the point-of-contact entity.

Assuming that the point-of-contact entity at the service provider receives a successful response from the federated user lifecycle management application at the service provider, then the point-of-contact entity at the service provider proceeds to process the original request from the end-user application (step 628), which in this example includes building a user session, performing optional access or authorization control operations, then sending or forwarding a request for accessing a controlled resource to a back-end application server that manages or otherwise provides access the controlled resource (step 630), thereby concluding the process.

In summary of the example that is shown in FIG. 6, the end-user had not been authenticated with respect to the service provider when the original request was received at the point-of-contact entity of the service provider. Rather than directly performing an authentication operation under the control of the service provider, the service provider defers to an identity provider to complete a federated single-sign-on operation. The point-of-contact entity at the service provider waits for an indication/message that the federated single-sign-on operation has been successfully completed via federated user lifecycle management applications at the service provider and at the identity provider, which are partners within a federated computing environment. After the point-of-contact entity at the service provider receives an indication/message that the federated single-sign-on operation has been successfully completed, the original request is then further processed.

The present invention leverages the existing environment in which a federated user lifecycle management solution is to be integrated. The support for the federated user lifecycle management applications can be implemented as a J2EE/C# application, based on the existing environment. The federated user lifecycle management application is invoked by a point-of-contact entity in response to a request from an end-user. This request may be as simple as a request for a protected resource by an unauthenticated user or may be an explicit request for federated user lifecycle management functionality, as discussed above with respect to FIG. 5. The federated user lifecycle management applications are independent in that they do not require any interaction with other parts of the computing environment; once the required protocol has been successfully completed, control is returned to the point-of-contact entity at which the user's request was originally received. Hence, an existing environment needs minimal modifications to support this federated user lifecycle management functionality. For example, if the federated user lifecycle management functionality to be invoked is a single-sign-on request, this can be in response to a request for a protected resource by an unauthenticated user, where the federated user lifecycle management single-sign-on functionality is invoked instead of the normal authentication process. With the present invention, this requires a simple configuration change that allows the user to be redirected to the federated user lifecycle management application instead of a legacy login process.

Trust Infrastructure Support for Federated User Lifecycle Management

As noted hereinabove, prior art solutions for providing federated user lifecycle management functionality do not scale to allow for a loosely coupled environment in which it is easy to bring new partners online or remove old partners from the computing environment without changes to the environment at either side. The loosely-coupled characteristic that is enabled by a federated user lifecycle management solution relates to the correspondence between federated partners and the ability of an end-user to access controlled resources in the computing environments of those partner environments. This loosely-coupled characteristic does not generally apply to the trust relationships between federated partners or parties. Hence, there is a trade-off; the loosely-coupled characteristic is achieved by maintaining a tightly-coupled characteristic between the federated partners or enterprises with respect to their trust relationships. These tightly coupled trust relationships define the functionality that is available to an end-user within a federated environment and also define the computational mechanisms that are used to trust and to secure communications within this federated environment.

The present invention recognizes that the tightly-coupled characteristic of a trust relationship between two partners/parties can be represented by trust-related or security-related information. More specifically, the present invention implements a trust service that includes functionality for managing cryptographic keys, security tokens, and identity transformations that define a trust relationship.

It should be noted that there is a distinction between the kind of cryptographic trust that is employed by the present invention versus the trust at the transport layer with SSL certificates; when running trust at the protocol/application layer, there is a need for an additional "binding" of the identity that is claimed in a certificate to the identity with whom a business/legal agreement has been reached. Thus, it is not sufficient to simply leverage existing SSL/transport layer trust relationships as they do not have the sufficient additional bindings that are required for this type of functionality.

The combination of keys, tokens, and identity transformation has been selected to represent a trust relationship for the following reasons. In a given trust relationship, a set of cryptographic keys are used to sign and encrypt messages between partners. Knowledge of the keys that are to be used in transactions between the partners is normally established in advance of any transactions, thereby allowing one partner to sign/encrypt messages and the other partner to verify/decrypt these messages. Moreover, one of the elements of a message that may be signed/encrypted is the security token that is used to assert the end-user's identity or roles. The structure of this security token is also established in advance of any transactions between the partners so that both parties are guaranteed to understand the contents of the security token; this guarantee may be the result of an invocation of assistance at a third-party trust broker that is able to act as an intermediary between the partners. Furthermore, within the security token is a claimed identity, a set of roles, and/or a set of attributes that may be transformed from a data format that is asserted by an identity provider to a data format that is used by a service provider; this transformation is accomplished based on an identity transformation that has been, in turn, previously defined in accordance with agreed-upon attributes that are claimed within the security token.

Thus, the present invention provides support for representing the tightly-coupled characteristic of a trust relationship between two partners as a tuple of security-related information, specifically a set of information items comprising {cryptographic keys, security tokens, and identity transformations}; in other words, in the present invention, this tuple represents a trust relationship. The present invention is directed to methods and systems that allow for a separation of a trust relationship (and the management of that trust relationship) and the functionality that is required to provide a federated user lifecycle management functionality solution. More specifically, defining a trust relationship as comprising a tuple of cryptographic keys, security tokens, and identity transformations, and then binding a given tuple to a set of at least two federated partners in a manner that is independent of the definition of the functionality that is available to those federated partners, provides a scalable approach to federation management, as explained in more detail hereinbelow.

Figure 7:
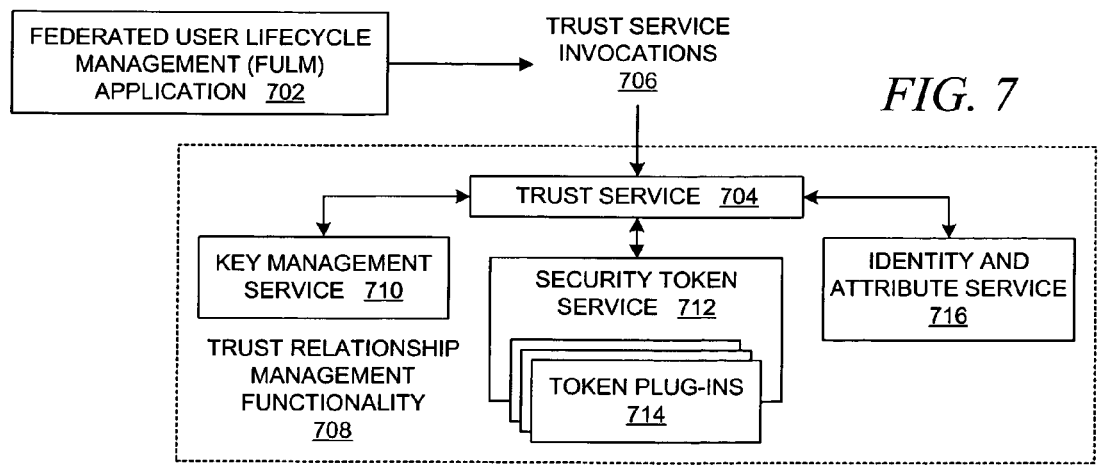
FIG. 7 depicts a block diagram that illustrates an organization of logical components that separates trust relationship management from the federated user lifecycle management.

With reference now to FIG. 7, a block diagram depicts an organization of logical components that separates trust relationship management from the federated user lifecycle management. Federated user lifecycle management application 702 is similar to federated user lifecycle management application 508 that is shown in FIG. 5. Federated user lifecycle management application 702 includes support for single-sign-on, single-sign-off, account linking/delinking, and/or any other additional federated functionality that may be implemented, such as identity provider determination. All of this functionality leverages, in some form, a trust relationship between partners. When federated user lifecycle management application 702 requires, for example, a security token to refer to an end-user/application within a federated environment, this information is requested from trust service 704 through trust service invocations/messages 706; various types of interfaces between the federated user lifecycle management application and the trust service may be implemented. In addition, the trust service may interface with other components within a federated domain, including a point-of-contact server. Trust relationship management functionality 708 is merely a logical boundary that demarcates the functional modules that participate in the support of the management of trust relationships for a given federated partner.

Trust service 704 is an exemplary embodiment of a trust proxy/service that is similar to the trust proxy/service that was discussed hereinabove, such as trust proxy/service 244 that is shown in FIG. 2B or trust proxy/service 254 that is shown in FIG. 2C. However, trust service 704 represents an embodiment of the present invention in which the trust proxy/service has been extended to include functionality for managing trust relationships in a particular manner. The trust relationship management of the present invention comprises functionality for cryptographic key management, security token management, and identity transformation management. Thus, trust service 704 is responsible for producing the appropriate security tokens, including the signing/encryption that is required on these tokens, and for the appropriate identification of the end-user/application on whose behalf a federation request is being made.

Trust service 704 can be regarded as brokering access to various independent, security-related or trust-related services. These independent services, including the trust service, may be implemented on a common device or server or within a common application; alternatively, each service is implemented as an independent server application. Key management service 710 manages the cryptographic keys and/or digital certificates that are required for communicating information within the context of a trust relationship. Security token service 712 is responsible for managing independent token instances that are used for secure communications or within security-relevant communications between partners; security token plug-ins 714 provide the functionality for various types of independently published or developed security token standards or specifications. Identity service 716 (or identity/attribute service 716) is responsible for managing the identities and/or attributes that are Contained within the security tokens, including locating attributes that must be added to a token and locating attributes that must be added to a local response to the point-of-contact server at the service provider based on a token that has been received from an identity provider.

Separating the federated user lifecycle management functionality from the trust relationship management functionality means that the management of the two different types of functionality can also be separated. This means that if information about a trust relationship should change, e.g., cryptographic keys are replaced for security purposes, then the required modification will not affect the federated user lifecycle management functionality. In addition, the same functionality can be made available to different partners because the trust relationship management of these partners is not bound to the federated user lifecycle management functionality. Further, separation of the trust relationship management means that a trust relationship can be maintained when new functionality is added to an existing trust relationship, e.g., if support for single-sign-off operations is added to a given relationship that previously only supported single-sign-on operations. Finally, separation of the trust management means that a trust relationship and its management can be reused within other contexts, such as web services security management or web-services-oriented architectures; hence, the present invention is not limited to a browser-based passive client architecture.

Establishing Federation Relationships Through Imported Configuration Files

The description of FIGS. 8A-8D hereinbelow serve to summarize some of the concepts of the present invention in order to provide a context for the explanation of the concept of a federation relationship and the subsequent explanation of an embodiment of the present invention in which the previously described features of the present invention facilitate the establishment of a federation relationship between business partners using electronic communications. FIGS. 8A-8D are block diagrams that emphasize the compartmentalization of functionality that is provided by the present invention. More specifically, FIGS. 8A-8D illustrate embodiments of the present invention in which different sets of functionality are compartmentalized to create efficiencies in implementing federated computing environments that are able to simultaneously address multiple federation specifications in conjunction with minimal modifications to pre-existing computing environments for interfacing with the federation functionality. The description of FIGS. 8A-8D refer to similar elements with common reference numerals.

Figure 8A:
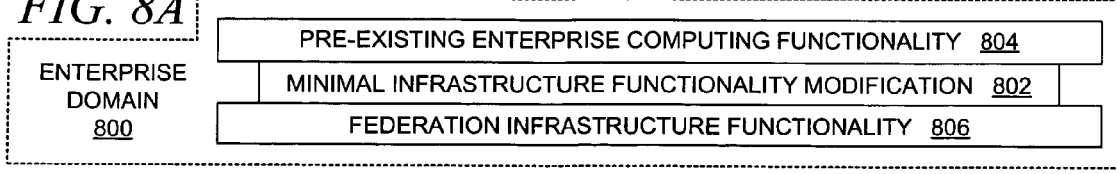
FIG. 8A depicts a block diagram that illustrates a high-level abstraction of the logical functionality of a federated computing environment.

With reference now to FIG. 8A, a block diagram depicts a high-level abstraction of the logical functionality of a federated computing environment. As noted briefly hereinabove, an enterprise and its potential federation partners must complete some amount of preparatory work prior to participating in a federated computing environment. An advantage of the federated architecture of the present invention is that, for a given enterprise domain 800, the present invention requires minimal infrastructure functionality modification 802 to pre-existing computing environment functionality 804 of an enterprise and its federation partners in order to interface with federation infrastructure functionality 806. These features were described in more detail hereinabove with respect to FIG. 2B.

Figure 8B:
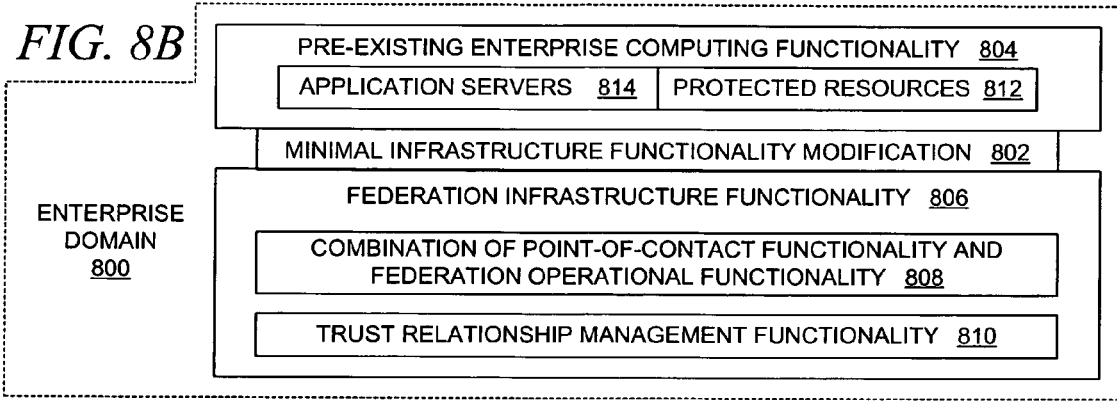
FIG. 8B depicts a block diagram that illustrates a high-level abstraction of the logical functionality of a federated computing environment that shows the manner in which the present invention provides for the separation of federation functionality and point-of-contact functionality from trust relationship management functionality.

With reference now to FIG. 8B, a block diagram depicts a high-level abstraction of the logical functionality of a federated computing environment that illustrates the manner in which the present invention provides for the separation of federation functionality and point-of-contact functionality from trust relationship management functionality. As explained hereinabove, within the federation infrastructure functionality 806 of the present invention, a combination of point-of-contact functionality and federation operational functionality 808 is separated from trust relationship management functionality 810, thereby allowing users within a federation to access protected resources 812 through pre-existing applications servers 814 via federation functionality in accordance with various embodiments of the present invention. This separation of point-of-contact functionality from trust relationship management functionality and the advantages therefrom are described hereinabove in more detail with respect to federated infrastructure components that are shown in FIG. 2C and FIG. 4 and with respect to functional processes that are shown in FIGS. 3A-3E.

It should be noted, though, that the explanation of the federation functionality in the preliminary figures, i.e. through FIG. 4, describes the point-of-contact server as performing point-of-contact operations along with federation functions and operations, e.g., such as the handling of the processing of security assertions and security tokens with the help of a trust proxy/service, particularly with respect to single-sign-on operations, i.e. federated authentication operations, without further distinguishing the many types of federation functions and operations that might be accomplished between federation partners. In other words, the explanation of the federation functionality in the preliminary figures does not distinguish between point-of-contact functionality and federation operational functionality; the point-of-contact server is described as performing a combination of functions, wherein a portion of the responsibilities of a point-of-contact server is to act as a point-of-contact entity for a federated enterprise domain and the remainder of the responsibilities of the point-of-contact server is to perform any federation operations and functions while relying on the trust proxy/service to handle trust/security operations. However, the description of the present invention subsequent to FIG. 4 provides further detail on the manner in which embodiments of the present invention can implement a distinction between point-of-contact functionality and other federation operational functionality, as noted with respect to FIG. 8C.

Figure 8C:
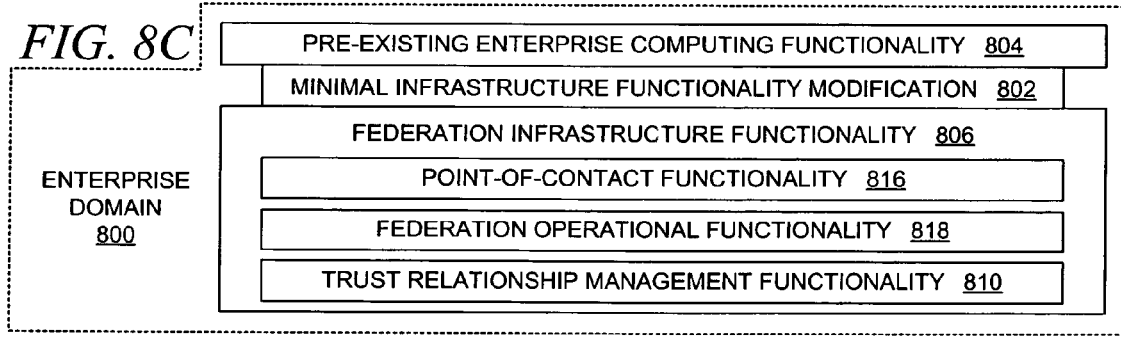
FIG. 8C depicts a block diagram that illustrates a high-level abstraction of the logical functionality of a federated computing environment that shows the manner in which the present invention provides for the further separation of federation operational functionality from point-of-contact functionality.

With reference now to FIG. 8C, a block diagram depicts a high-level abstraction of the logical functionality of a federated computing environment that illustrates the manner in which the present invention provides for the further separation of federation operational functionality from point-of-contact functionality. As explained hereinabove, within the federation infrastructure functionality 806 of the present invention, trust relationship management functionality 810 is separated from other functions that are provided within the federation infrastructure of the present invention; moreover, further distinctions can be made between these other functions such that point-of-contact functionality 816 can be illustrated as being separate from federation operational functionality 818. This separation of point-of-contact functionality from federation operational functionality and the advantages therefrom are described hereinabove in more detail with respect to federated infrastructure components that are shown in FIG. 5 and with respect to functional processes that are shown in FIG. 6, wherein federation user lifecycle management application 508 in FIG. 5 (similarly, FULM application in FIG. 6) represents one aspect of federation operational functionality.

Thus, the present invention facilitates the compartmentalization or modularization of different functionalities. In one embodiment of the present invention, a combination of point-of-contact functionality and federation operational functionality is separated from trust relationship management functionality. In another embodiment of the present invention, in addition to the continuing compartmentalization of trust relationship management functionality, point-of-contact functionality is separated from federation operational functionality, one aspect of which is federation user lifecycle management functionality. Further distinctions concerning the separation of the trust relationship management functionality and the federation user lifecycle management functionality is described hereinabove with respect to FIG. 7. Given these compartmentalizations, FIG. 8D shows yet another embodiment of the present invention in which further distinctions are illustrated.

Figure 8D:
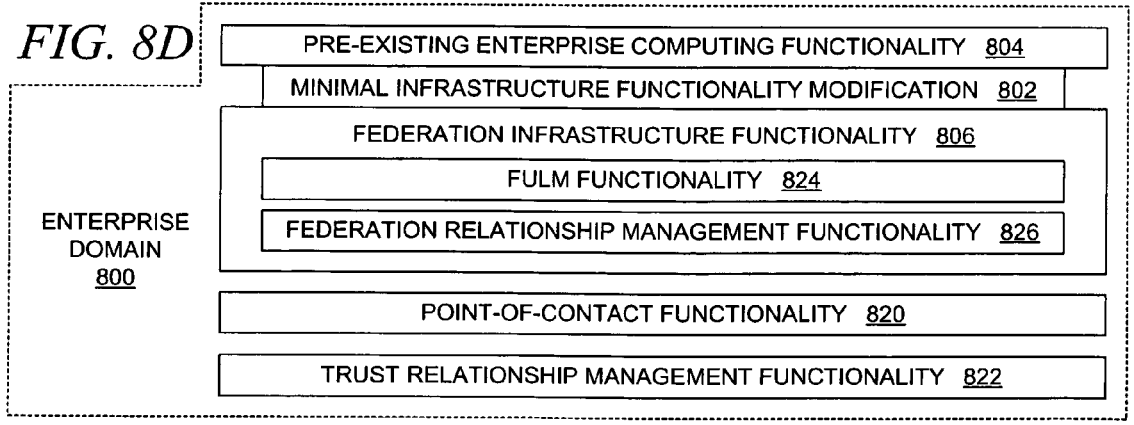
FIG. 8D depicts a block diagram that illustrates a high-level abstraction of the logical functionality of a federated computing environment that shows the manner in which the present invention provides for the further separation of federation operational functionality into federation user lifecycle management functionality and federation relationship management functionality.

With reference now to FIG. 8D, a block diagram depicts a high-level abstraction of the logical functionality of a federated computing environment that illustrates the manner in which the present invention provides for the further separation of federation operational functionality into federation user lifecycle management functionality and federation relationship management functionality. As noted above with respect to FIG. 8C, point-of-contact functionality 816 can be illustrated as being separate from federation operational functionality 818. Moreover, as explained with respect to FIG. 5 and FIG. 6, a point-of-contact entity can operate independently from the federation operational functionality within a domain with only minimal configurational changes for recognizing incoming requests for federation operations in comparison to requests to access protected resources. Hence, this ability is reflected in FIG. 8D by showing that point-of-contact functionality 820 is separate from federation infrastructure functionality 806.

As noted above with respect to FIG. 8B, a combination of point-of-contact functionality and federation operational functionality 808 can be separated from trust relationship management functionality 810 within the federation infrastructure functionality 806 in an embodiment of the present invention. After federated user lifecycle management functionality was described hereinabove with respect to FIG. 5 and FIG. 6, the description of FIG. 7 explained the manner in which the trust relationship management functionality can continue to be implemented separately from the federated user lifecycle management functionality. Moreover, the description of FIG. 7 noted that the same functionality can be made available to different federation partners in a modular manner.

In other words, the trust relationship management functionality can be implemented in a manner such that it interfaces with the federation infrastructure functionality but is independent of such functionality. Hence, this ability is reflected in FIG. 8D by showing that trust relationship management functionality 822 is separate from federation infrastructure functionality 806. The importance of this distinction is illustrated in more detail hereinbelow.

FIG. 8D also illustrates further distinctions in the federation operational functionality of the present invention. Federation operational functionality, such as federation operational functionality 818, comprises those operations or functions that enable transactions or interactions between federation partners in a federated computing environment. Federation operational functionality can be contrasted with federation infrastructure functionality, e.g., federation infrastructure functionality 806, which comprises those operations or functions that enable a federated partner to implement federation operational functionality in conjunction with pre-existing enterprise functionality.

It was noted above that federation user lifecycle management functionality, e.g., as represented by federation user lifecycle management application 508 in FIG. 5 and FULM application in FIG. 6, is merely one aspect of federation operational functionality. As defined above, federated user lifecycle management functionality comprises functions for supporting or managing federated operations with respect to the particular user accounts or user profiles of a given user at multiple federated domains; in some cases, the functions or operations are limited to a given federated session for the user. In other words, federated user lifecycle management functionality refers to the functions that allow management of federated operations across a plurality of federated partners, possibly only during the lifecycle of a single user session within a federated computing environment.

FIG. 8D reflects that federation operational functionality in the present invention may comprise multiple aspects. Along with federation user lifecycle management functionality 824 as one aspect of federation operational functionality, an embodiment of the present invention may also implement federation relationship functionality 826, as illustrated in more detail hereinbelow; the difference between a trust relationship between federation partners and a federation relationship between federation partners is also explained in more detail further below.

Figure 9A:
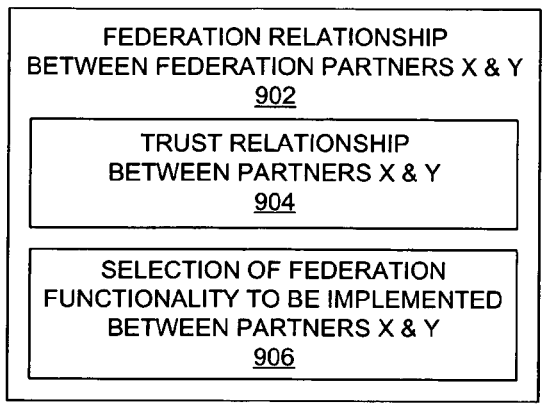
FIGS. 9A-9B depict Venn diagrams that illustrate manners in which a federation relationship includes a trust relationship in association with a selection of federation functionality.
Figure 9B:
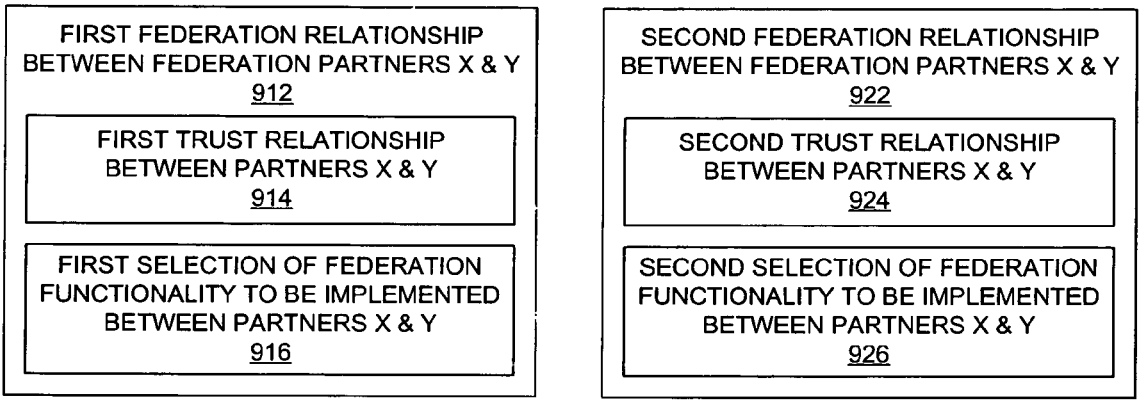

With reference now to FIGS. 9A-9B, Venn diagrams depict manners in which a federation relationship includes a trust relationship in association with a selection of federation functionality. A core object of a federation is the exposure of business processes between business partners. The exposure of an enterprise's business processes, though, is not performed without consideration of many factors; for example, enterprises would only consider exposing business processes to trusted partners. Hence, the present invention recognizes a need to allow an enterprise to restrict the exposure of its business processes only to trusted federation partners, particular in light of the fact that different business partners may have different levels of trust between themselves.

However, even within the same federated computing environment, different sets of federation partners would have different requirements for interacting with each other. Hence, the present invention recognizes a need to allow an enterprise to restrict the exposure of its business processes to different federation partners in different ways.

Thus, in the present invention, federation functionality comprises electronic operations or functions that support electronic transactions between trusted federation partners. Since there must be some level of trust between federation partners before the exposure of business processes, a trust relationship should exist between federation partners before a federation relationship associates. In other words, federation functionality comprises a selection of electronic transactions that are subsequently associated with a trust relationship. This logic is reflected in the Venn diagrams of FIGS. 9A-9B.

Referring now to FIG. 9A, a diagram depicts that federation relationship 902 between two federation partners includes an association between trust relationship 904 of those two federation partners and a selection of a set of federation operations/functions 906 to be implemented by those two federation partners. When the diagram of FIG. 9A is compared with the manner in which an embodiment of the present invention can organize trust relationship management functionality and federation infrastructure functionality within an enterprise's computing environment, the advantages for implementing a federated computing environment become apparent, as illustrated in more detail further below.

Referring now to FIG. 9B, a diagram depicts that two federation partners may have multiple federation relationships between themselves. First federation relationship 912 between two federation partners includes an association between first trust relationship 914 of those two federation partners and a first selection of a set of federation operations/functions 916 to be implemented by those two federation partners. In addition, second federation relationship 922 between two federation partners includes an association between second trust relationship 924 of those two federation partners and a second selection of a set of federation operations/functions 926 to be implemented by those two federation partners. In this embodiment, multiple trust relationships between the two federation partners are used within their multiple federation relationships. The multiple trust relationships may have similar characteristics but different implementation data, e.g., different cryptographic keys of similar size or merely different digital certificates, thereby allowing, e.g., different federated operations to be performed with different digital certificates.

However, the two different selections of functionality 916 and 926 can employ trust relationships with different characteristics, thereby implying that different federation operations can be performed with respect to trust relationships that have different strengths. Different strengths of trust relationships may be based on various criteria, e.g., different cryptographic algorithms or different cryptographic key sizes. For example, single-sign-on operations may be performed using a weaker trust relationship while other federated operations, such as provisioning of users, are performed using a stronger trust relationship.

For example, a pair of federation partners may interact to support a first commercial project, possibly with many other federation partners, and the commercial project may require, through various negotiated business agreements, the use of a first trust relationship with particular characteristics. At the same time, these federation partners may interact to support a second commercial project, possibly with a different set of federation partners, and this commercial project may require the use of a second trust relationship with characteristics that differ from the first trust relationship, all of which is governed by a different set of business agreements. Hence, in this scenario, the different commercial projects would require different federation relationships comprising different trust relationships.

Figure 10:
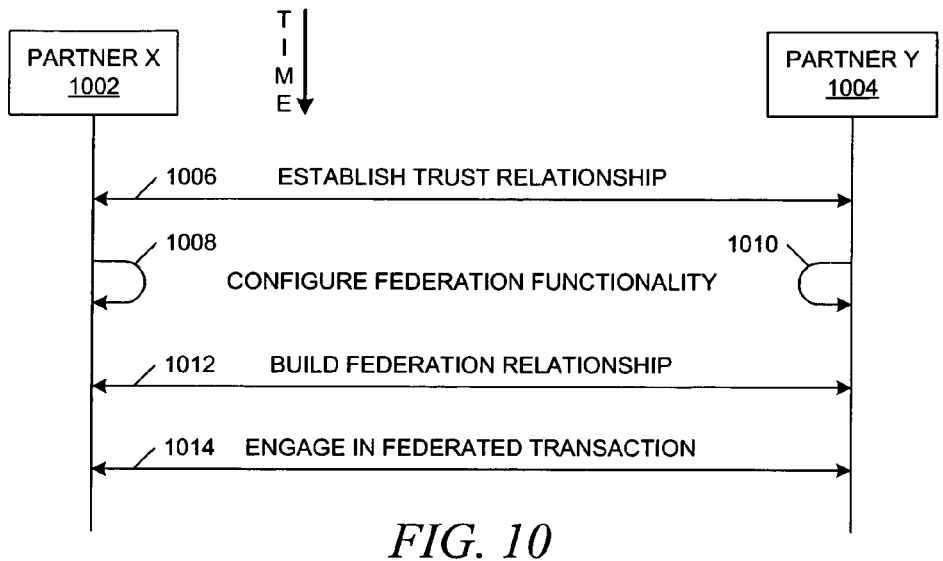
FIG. 10 depicts a dataflow diagram that illustrates a series of operations that are performed by a pair of business partners in order to interact within a federated computing environment.

With reference now to FIG. 10, a dataflow diagram depicts a series of operations that are performed by a pair of business partners in order to interact within a federated computing environment in accordance with the present invention. An enterprise, e.g., partner 1002, and its potential federation partners, e.g., partner 1004, must establish a federation relationship before attempting to interact within a federated computing environment. As noted above, though, a federation relationship is based on a trust relationship; this trust relationship represents a federation partner's trust in their business and legal agreements, thereby allowing partners to determine aspects of their interaction, e.g., what sort of liability is associated with a given action, given that it was performed under the auspices of a particular trust relationship, which, in turn, allows the partners to apply policies that govern allowable actions to the type of trust relationship under which they are requested. Hence, an enterprise and its potential federation partners must establish a trust relationship before attempting to interact within a federation, as shown by interactive dataflow 1006. Given that a federation relationship associates a selection of federation functionality with a trust relationship, federation functionality must be configured at each partner, shown as configuration operations 1008 and 1010, after which a federation relationship can be built, as shown by interactive dataflow 1012. After the federation relationship is established, the business partners can interact in a federated manner by engaging in a federated transaction, as shown by interactive dataflow 1014.

It should be noted though, assuming that an enterprise has the desire to have the proper support for successfully completing federation transactions, that the configuration of federation functionality only needs to be performed at any time before the initiation of a federation transaction. For example, the federation functionality may be configured before a trust relationship is established. Although it may facilitate the selection of federation functionality when configuring a federation relationship, the configuration of federation functionality may also be performed after a federation relationship is established. In addition, with the present invention, the federation functionality may be modified after a federation relationship is established, especially with regard to enhancing the federation functionality, without necessarily requiring a modification to a previously established federation relationship.

Figure 11:
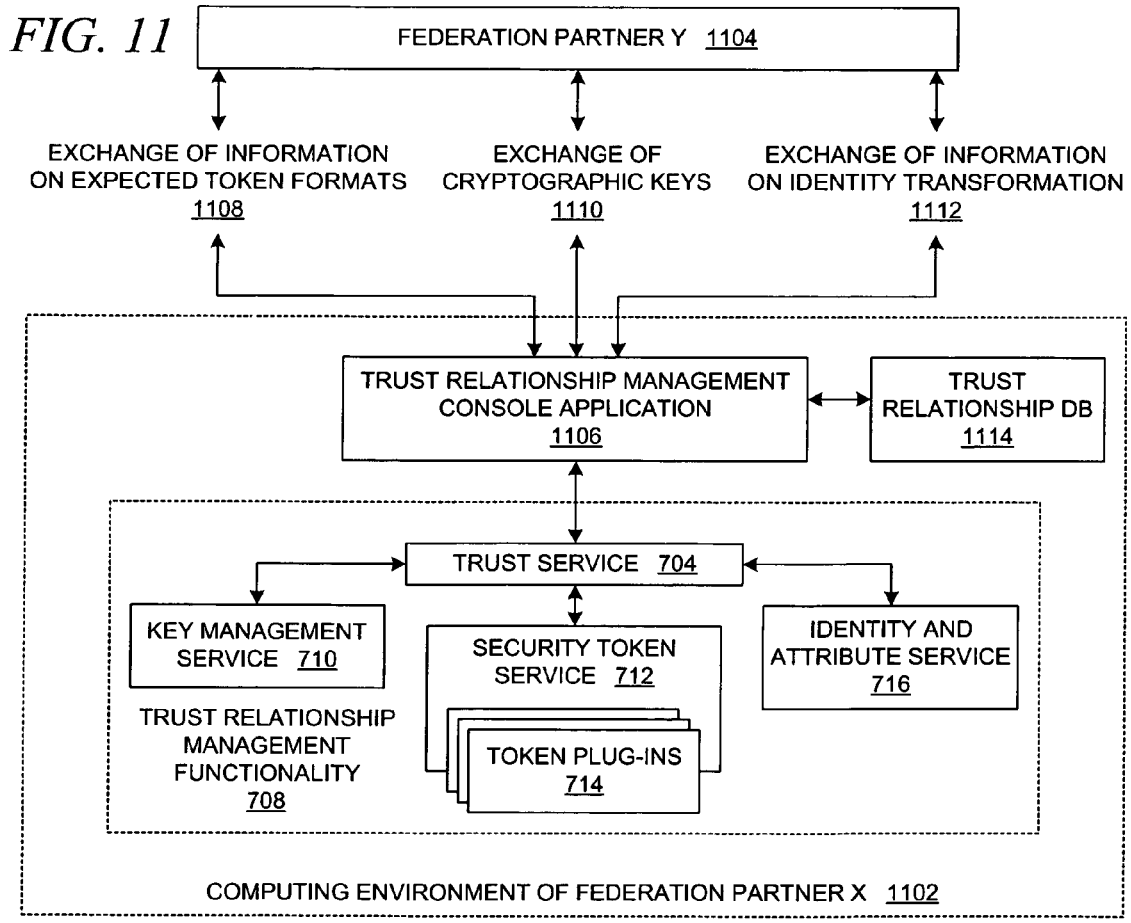
FIG. 11 depicts a block diagram that illustrates an interaction between business partners to establish a trust relationship in preparation for establishing a federation relationship.

With reference now to FIG. 11, a block diagram depicts an interaction between business partners to establish a trust relationship in preparation for establishing a federation relationship in accordance with an embodiment of the present invention. As noted further above, trust relationships involve some sort of a bootstrapping process by which initial trust is established between business partners. Part of this bootstrap process may include the establishment of shared secret keys and rules that define the expected and/or allowed token types and identity translations. This bootstrapping process can be implemented out-of-band as this process may also include the establishment of business agreements that govern an enterprise's participation in a federation and the legal liabilities associated with this participation.

The purpose of this bootstrapping process is to provide a binding of a business partner, i.e. an enterprise, to the business partner's trust information; this is over and above the binding of an identity to cryptographic keys as part of the creation of a digital certificate for a business partner; certificate creation is handled by a certificate authority that simply asserts the identity of a business partner. This federation trust bootstrapping asserts that the partner's identity, e.g., as claimed in a digital certificate, is bound to previously negotiated business agreements, legal agreements, or similar types of associations.

The present invention allows the form of a trust relationship to be flexible; e.g., federation partners can interact using different types of security tokens. As described above with respect to FIG. 7, an embodiment of the present invention may incorporate a trust service that manages the trust relationships between a given enterprise and its business partners while separating the functionality of the management of trust relationships from the functionality for the federated user lifecycle management. However, the description of FIG. 7 does not provide a further description of the manner in which the trust relationships are established.

FIG. 11 depicts a manner in which trust service 704, such as that shown in FIG. 7, provides functional support in the computing environment of a federation partner 1102 in order to establish a trust relationship with federation partner 1104. Trust relationship management console application 1106 within computing environment 1102 relies on trust service 704 to enable an exchange of information with an entity at federation partner 1104, e.g., a similar configuration application within the computing environment of federation partner 1104. As noted above, a trust relationship between two partners is represented within the present invention as a tuple of security-related information, specifically a set of information items comprising {cryptographic keys, security tokens, and identity transformations}. Thus, trust service 704 enables the exchange of information about expected token formats 1108, cryptographic keys 1110, and identity transformations 1112, which are then stored in trust relationship database 1114 by trust relationship management console application 1106 or trust service 704. It should be noted that each trust relationship that is represented within trust relationship database 1114 may have additional information for describing or implementing the trust relationship.

Figure 12:
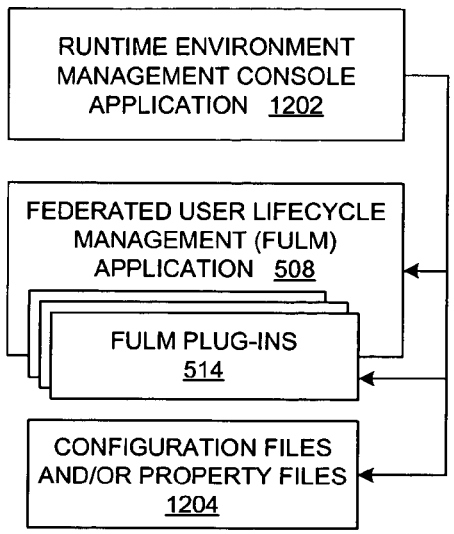
FIG. 12 depicts a block diagram that illustrates a configuration of a computing environment to include federation functionality.

With reference now to FIG. 12, a block diagram depicts a configuration of a computing environment to include federation functionality. As noted above with respect to FIG. 10, the configuration of federation functionality needs to be performed at some point in time before the initiation of a federation transaction. As described above with respect to FIG. 5, federated user lifecycle management application 508 comprises support for interfacing to, interacting with, or otherwise interoperating with federated user lifecycle management plug-ins 514, which are also shown in FIG. 12.

In one embodiment of the present invention, federated protocol runtime plug-ins provide the functionality for various types of independently published or developed federated user lifecycle management standards or profiles. Referring to FIG. 12, a system administrative user within an enterprise's computing environment employs runtime environment management console application 1202 to manage FULM application 508 and federated user lifecycle management plug-ins 514. For example, the administrator may use a graphical user interface that is provided by runtime environment management console application 1202 to configure plug-ins 514 within a specific directory on a particular server. When a new federation operation is to be supported, a new plug-in may be deployed by the administrator by storing the new plug-in in the appropriate directory; an updated version of the new plug-in may be retrieved by the management application from a third-party vendor, a centralized federation database, or some other location. Configuration files and/or property files contain runtime parameters for plug-ins 514, such as URI's that are to be used during federation transactions; these can be created, modified, and deleted by the administrator via runtime environment management console application 1202.

Figure 13B:
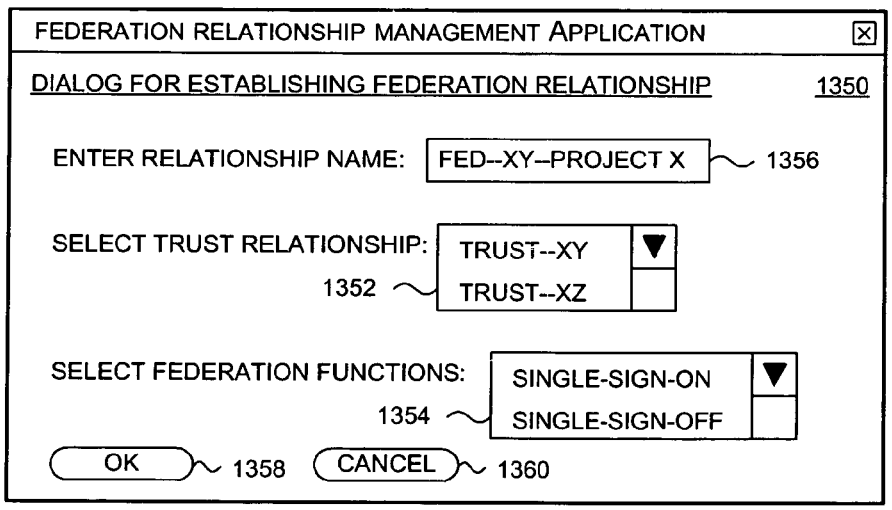
FIG. 13B depicts a diagram that shows a graphical user interface window within a federation relationship management application for use by an administrative user for establishing a federation relationship between federation partners.
Figure 13A:
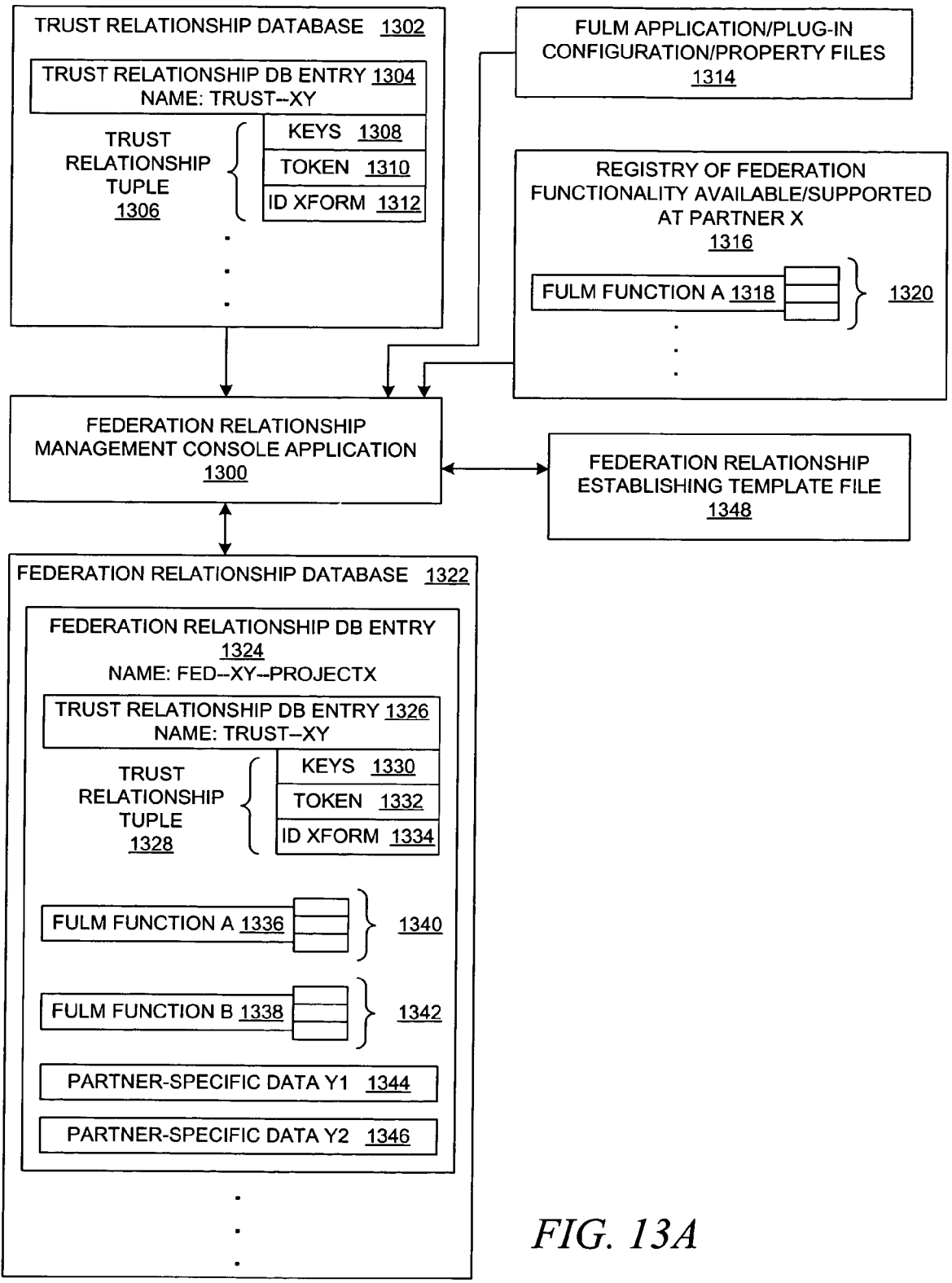
FIG. 13A depicts a block diagram that illustrates a federation relationship management console application that may be used by a system administrative user to establish federation relationships within an enterprise's computing environment.

With reference now to FIG. 13A, a block diagram depicts a federation relationship management console application that may be used by a system administrative user to establish federation relationships within an enterprise's computing environment in accordance with an embodiment of the present invention. As noted above, a federation relationship includes a selection of federation functionality, which must be agreed upon between partners; for example, both partners may agree to leverage single-sign-on functionality. However, in order to implement this functionality, both parties also need to be aware of partner-specific information for the selected functionality, such as the URI to which to send a single-sign-on request/response message. The partner-specific information that needs to be collected by one federation partner from the other federation partner depends on the federation functionality that has defined or selected for the particular federation relationship between the federation partners. This partner-specific information needs to be exchanged between the partners.

Thus, a single configuration form file or template file cannot be distributed by a first federation partner to all federation partners because the information that is need from each federation partner may be different; the information that is needed at runtime to execute a federation transaction in accordance with a defined federation relationship is partner-specific. If an administrator at the first partner did not tailor this configuration form or template for each federation partner based on the configured functionality of their particular federation relationship, the other partner would be required to provide all information that might be requested within the configuration form or template, regardless of whether or not it is needed for their particular federation relationship.

The present invention takes an approach that while a federation relationship is being built, a federation-relationship-specific XML configuration file is dynamically generated and exported to the federation partner, who provides the requested partner-specific configuration information and returns it to the requester. After the completed file is received from a partner, the requesting partner can import the partner-specific configuration information and associate it with the appropriate federation relationship, as explained in more detail hereinbelow.

Referring to FIG. 13A, an administrative user employs federation relationship management console application 1300 to establish a federation relationship. Since each federation relationship comprises a trust relationship, federation relationship management console application 1300 retrieves information about previously established trust relationships from trust relationship database 1302. Trust relationship database 1302 contains an entry for each trust relationship that has been established between an enterprise and its trusted business partners, e.g., as discussed above with respect to FIG. 11; trust relationship database 1302 in FIG. 13A is similar to trust relationship database 1114 in FIG. 11; it should be noted that databases, configuration files, data structures, etc., as described herein may be implemented as generic datastores or multiple different types of datastores such that any datastore may be implemented as a database, file, data structure, etc. In the example that is shown in FIG. 13A, trust relationship database 1302 contains a trust relationship that is named "Trust-XY", which is represented by trust relationship database entry 1304. As described above, each trust relationship comprises a tuple of information; trust relationship database entry 1304 contains tuple 1306, which comprises cryptographic key information 1308, token format information 1310, and identity transformation information 1312. Each trust relationship also comprises any additional partner-specific information for implementing the represented trust relationship, e.g., the identities of the partners that are participating in the trust relationship, information about the identity or the location of a trust service that may be contacted to perform operations with respect to the trust relationship, or other similar types of information.

Since a federation relationship also comprises partner-specific information about the federation functionality that is to be supported within the federation relationship, federation relationship management console application 1300 also retrieves federation-function-specific information about federation functionality that may have already been configured within the enterprise's computing environment or that will be configured within the enterprise's domain or computing environment. For example, assuming that the enterprise's computing environment has been implemented in accordance with an embodiment of the present invention that is similar to that described above with respect to FIG. 5, federation relationship management console application 1300 may retrieve information about a FULM application and/or its associated plug-ins from various information sources, e.g., by scanning directories that contain these files, by reading configuration and/or property files 1314 that are associated with the FULM application and/or its associated plug-ins, or in some other manner. In one embodiment, after gathering this information, federation relationship management console application 1300 may build registry 1316, which is a compilation of information about the federation functionality that is supported within the enterprise's domain or computing environment or available to the enterprise's domain or computing environment. In the example that is shown in FIG. 13A, registry 1316 contains entry 1318 for a type of federation function that is available; registry entry 1318 is also associated with multiple fields 1320 that represent the multiple metadata parameters that are required by a given federation function; the metadata indicates the partner-specific configuration data that is needed by a federation partner to invoke or to administrate the given federation function during an instance of a federation transaction that employs the federation function. In one embodiment, registry 1316 is a temporary datastore or data structure that is dynamically generated each time that federation relationship management console application 1300 is used by an administrative user; in an alternative embodiment, registry 1316 is maintained by some other configuration utility within the enterprise's domain or computing environment, e.g., such as runtime environment management console application 1202 that is shown in FIG. 12.

In some cases, information about the metadata parameters that are associated with a federation function would be determined when the software modules that implement the federation function are created; in other words, these metadata parameters are federation-function-specific, and the metadata parameters are, in some manner, associated with the software modules that implement those federation functions. Hence, the identity of the metadata parameters 1320 that are associated with a federation function should accompany the software modules that implement the federation function, preferably as function-specific metadata parameters within configuration and/or property files 1314; these configuration and/or property files 1314 are deployed or configured within an enterprise's computing environment when the software modules are deployed, e.g., when a FULM application and/or its plug-ins are deployed. Alternatively, the number and the nature of metadata parameters 1320 may be retrieved from some other data source, such as a common, centralized, federation database. In yet another alternative, the number and the nature of metadata parameters 1320 may be derived from electronic files that describe the specification of a federation protocol; the specification files may describe a standard set of metadata parameters such that any implementation of a federation function for a federation protocol that adheres to the particular federation protocol requires certain metadata parameters, thereby mandating the interface or data exchange that should be expected to be implemented by any software modules for the federation protocol. In any case, the number and the nature of metadata parameters 1320 are available for retrieval by federation relationship management console application 1300.

Federation relationship management console application 1300 retrieves information about trust relationships and federation functionality while supporting an administrative user to establish a federation relationship. These federation relationships are represented by entries within federation relationship database 1322. In the example that is shown in FIG. 13A, federation relationship database entry 1324 represents a federation relationship named "Fed-XY-ProjectX"; in this example, the identifier for the federation relationship provides an indication of the federation partners that are cooperating in the federation relationship, e.g., Partner "X" and Partner "Y", along with an indication of the purpose of the federation relationship. Given that federation partners may interact for many different purposes, and given that each purpose may have its own requirements, it is possible that a pair of federation partners may have a plurality of federation relationships, as described above with respect to FIGS. 9A-9B.

In the example that is shown in FIG. 13A, trust relationship database entry 1304 has been copied into federation relationship database entry 1324 as trust relationship data 1326, which comprises trust relationship tuple 1328 that includes cryptographic keys 1330, token format information 1332, and identity/attribute transformation information 1334. Alternatively, federation relationship database entry 1324 may merely store a reference or pointer to trust relationship database entry 1304 within trust relationship database 1302 such that trust relationship database entry 1304 can be modified without requiring an update to federation relationship database entry 1324; individual data items that comprise the elements of a trust relationship, such as cryptographic keys and certificates, may also be included merely by reference to enhance the efficiency of managing these data items. Federation relationship database entry 1324 also contains information about the federation operations/functions that are to be supported by the federation relationship that is represented by federation relationship database entry 1324, e.g., functions 1336 and 1338 and associated metadata information 1340 and 1342 about their implementation requirements, respectively; alternatively, federation relationship database entry 1324 may merely store reference or pointers to appropriate locations, such as configuration and/or property files 1314, from which information about supported federation functions/operations may be retrieved.

At some future point in time, federation relationship database entry 1324 will be used to initiate a federation transaction that will use the federation functionality that is indicated within federation relationship database entry 1324, i.e. functions 1336 and 1338. However, in order to initiate or complete the federation transaction, partner-specific information must be used in those instances in which the federation functionality indicates through its metadata information that it requires partner-specific information, i.e. in accordance with information 1340 and 1342 that is associated with functions 1336 and 1338. For example, this partner-specific information may include one or more URI's that indicate the target destinations of request messages that are to be sent to a federation partner to request a federated transaction with that particular federation partner.

In an embodiment of the present invention, while an administrative user employs federation relationship management console application 1300 or a similar administrative software tool to build or establish a federation relationship, federation relationship management console application 1300 attempts to obtain the partner-specific information and then store it within federation relationship database entry 1324 as partner-specific data items, e.g., data items 1344 and 1346. In order to do so, federation relationship management console application 1300 dynamically generates federation relationship establishing template file 1348; this can be an XML-formatted file or some other type of file. Template 1348 is exported by the originating partner, e.g., Partner "X", to the trusted partner with which the administrative user is attempting to establish a federation relationship, e.g., Partner "Y", as Indicated within trust relationship data 1326. When the trusted partner has provided the required partner-specific information by modifying template file 1348 to include the information, federation relationship management console application 1300 at the requesting partner imports the modified template file 1348, extracts the provided information, and stores it within federation relationship database entry 1324, as explained in more detail further below.

It should be noted that partner-specific configuration information may also need to be transmitted from the computing environment of the above-mentioned administrative user, i.e. the originating/source partner or Partner "X", to the cooperating/target federation partner, i.e. Partner "Y". The target federation partner may need certain partner-specific information about the originating partner for configuring the federation relationship from the perspective of the cooperating/target federation partner; e.g., the federation partner may need similar metadata information, such as URI's of point-of-contact servers, so that the cooperating/target federation partner can initiate a federation transaction using the federation functionality in conjunction with the partner-specific configuration data in the opposite direction towards the domain of the administrative user, e.g., Partner "X", which is the federation partner that, in this example, has previously originated or initiated the building of the federation partnership between the two partners. Hence, template file 1348 may also contain partner-specific information for the domain of the administrative user, i.e. Partner "X". Alternatively, the partner-specific information for the originating partner, i.e. Partner "X", can be transmitted in an accompanying file or in a subsequently transmitted file such that two files are used to transport partner-specific information between the partners. The partner-specific information that is transmitted from the originating/source partner to the cooperating/target partner might be entered by the administrative user through federation relationship management console application 1300 while the administrative user is building the federation relationship, or some or all of the data might be obtained from a configuration database that is also managed by federation relationship management console application 1300.

It should also be noted, though, that the partner-specific information that is exchanged between the federation partners in the above-described manner may not be symmetrical. In other words, the federation partners may engage in a federation transaction by assuming very different roles, and these different roles may require that different types of information should be provided to their respective federation partners. For example, the administrative user may operate an enterprise that acts as an identity provider. The federation relationship may support a subset of the functionality that is specified by the Liberty Alliance's Liberty ID-FF specifications. In this scenario, the federated functionality may include: browser/artifact single-sign-on; identity-provider-initiated HTTP-Redirect-based Register Name Identifier; and service-provider-initiated SOAP/HTTP Federation Termination Notification. For this particular federation functionality, the types of partner-specific information that are provided by the identity provider to a service provider may differ from the types of partner-specific information that are provided by the service provider to the identity provider. If the partner-specific information differs in accordance with the assumed role of a federation partner with respect to a federation relationship, then the administrative user would inform federation relationship management console application 1300 of the role that is to be performed by the administrative user's enterprise, assuming that said role was not already previously configured or stored within a configuration file or within the federation relationship management database; the administrative user may inform the federation relationship management console application by selecting or entering an appropriate data option within a GUI that is provided by the federation relationship management console application, e.g., as illustrated within FIG. 13B.

With reference now to FIG. 13B, a diagram depicts a graphical user interface window within a federation relationship management application for use by an administrative user for establishing a federation relationship between federation partners in accordance with an embodiment of the present invention. Dialog window 1350 contains drop-down menu 1352 for allowing a user to select a trust relationship on which to base the federation relationship that is being created by a federation relationship management console application, such as federation relationship management console application 1300 that is shown in FIG. 13A. Alternatively, the user may be able to invoke, e.g., by selecting a menu item or by pushing a dialog button, functionality within the federation relationship management console application or some other application, such as trust relationship management console application 1106 that is shown in FIG. 11, in order to dynamically build a new trust relationship, if necessary, for this particular federation relationship. The building of a trust relationship may involve using existing information for the administrative user's enterprise, such as existing private keys, digital certificates, tokens, identity mapping information, etc.; the administrative user could then configure the remainder of the trust relationship using known information for the trusted partner if available, e.g., public keys, digital certificates, identity mapping information, etc., although token information is not configured because this is unchangeable configured by each partner.

Drop-down menu 1354 allows a user to select the federation functions that are to be supported within the federation relationship that is being created. Text entry field 1356 can be used to enter a name for the federation relationship that is being created. Button 1358 closes the dialog window and continues the building of the federation relationship by generating an entry in an appropriate datastore, e.g., in a manner similar to that shown in FIG. 13A; button 1360 closes the dialog window and cancels the creation of a federation relationship. For example, when the administrative user selects button 1358, the console application initiates the transfer of partner-specific configuration information between the two partners that will participate in federation relationship, e.g., by exporting and importing the partner-specific federation relationship establishing template file that was mentioned above and that is described in more detail hereinbelow.

Figure 13C:
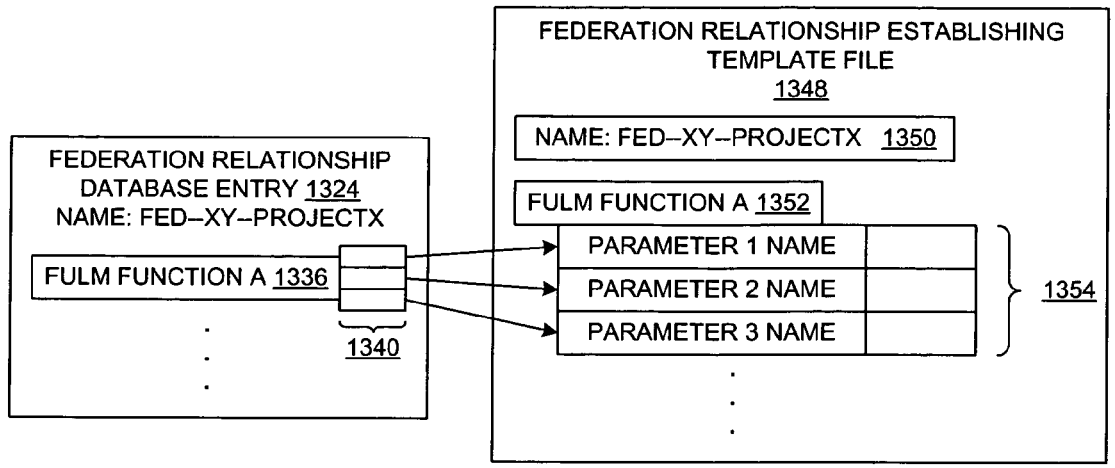
FIGS. 13C-13D depict block diagrams that show dataflows that are initiated by a federation relationship management console application for obtaining partner-specific data in order to establish federation relationships within an enterprise's computing environment.
Figure 13D:
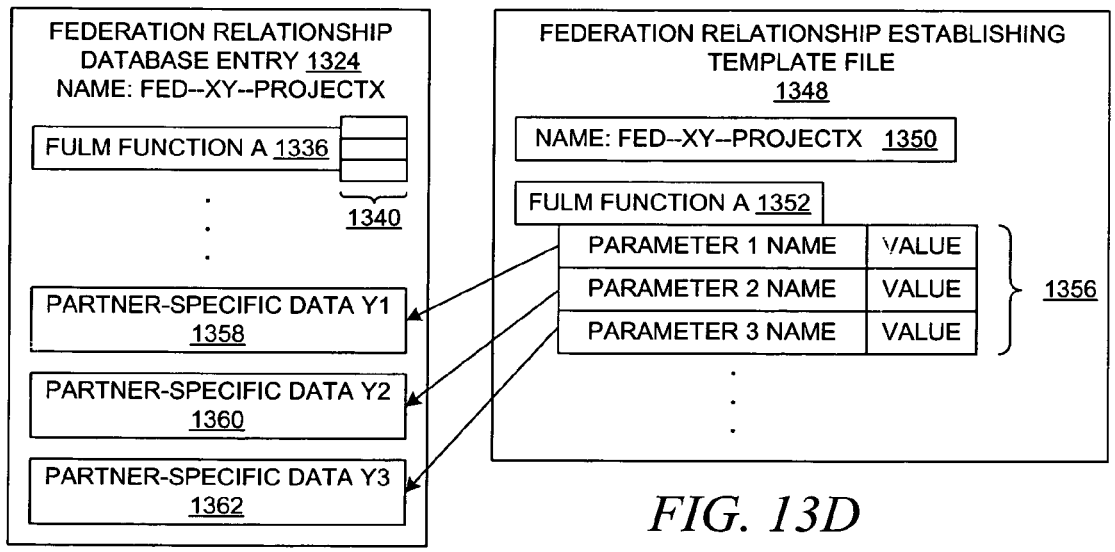

With reference now to FIGS. 13C-13D, a block diagram depicts dataflows that are initiated by a federation relationship management console application for obtaining partner-specific data in order to establish federation relationships within an enterprise's computing environment in accordance with an embodiment of the present invention. As noted above with respect to FIG. 13A, federation relationship management console application 1300 dynamically generates federation relationship establishing template file 1348. For example, federation relationship management console application 1300 may create template 1348 after the user has instructed the application to do so through dialog window 1350 that is shown in FIG. 13B. The content of template 1348 is dynamically determined based on the federation relationship for which federation relationship management console application 1300 is attempting to obtain partner-specific data. Referring to FIG. 13C, federation relationship management console application 1300 creates template 1348 based on the federation relationship that is represented by federation relationship database entry 1324. In a manner similar to FIG. 13A, federation relationship database entry 1324 contains information about the federation operations/functions that are to be supported by the federation relationship that is represented by federation relationship database entry 1324, e.g., function 1336 and associated metadata information 1340 about the parameters that are required to implement the associated function. When federation relationship management console application 1300 generates template 1348, the application extracts metadata information 1340 and creates fields or elements 1354, possibly as name-value pairs, within template 1348 for the indicated metadata parameter items as necessary from federation relationship database entry 1324; if template 1348 is an XML-based file, the name-value pairs may be included as tagged elements within the file. At this point, template 1348 does not yet contain any partner-specific data; at some subsequent point in time, template 1348 is transmitted to a cooperating/target federation partner to obtain the partner-specific data that is required to execute a federated transaction at some future point in time with the cooperating/target federation partner.

Referring to FIG. 13D, template 1348 contains modified name-value pairs 1356 after the cooperating/target federation partner has returned template 1348; the cooperating/target federation partner has parsed template 1348, extracted the requests for the name-value pairs, and then obtained the required values, possibly in an automatic processing fashion but possibly through interaction with an administrative user via a graphical user interface application at the cooperating/target federation partner. Subsequently, at the originating/source federation partner, federation relationship management console application 1300 extracts the returned name-value pairs 1356 and stores the partner-specific information that has been provided by the cooperating/target federation partner as data items 1358-1362 within federation relationship database entry 1324. Data items 1358-1362 are subsequently used at some future point in time to complete a federated transaction with the federation partner. Again, partner-specific configuration information about the originating/source federation partner may be transmitted in template 1348 to the federation partner such that the federation partner has equivalent or corresponding information for subsequently initiating a similar federated transaction in the opposite direction or for merely engaging in a federated transaction; in this manner, a single file is transmitted back and forth, although modified before its return.

Alternatively, partner-specific configuration information about the originating/source federation partner, i.e. the federation partner that originated the building of the federation partner between the two partners, may be transmitted in a second message or file, either at the same time as the transmission of the first file or at some other point in time; this second file provides partner-specific information about the originating/source federation partner to the cooperating/target federation partner and is not returned. For example, the first file is sent to the federation partner as an "empty" file which inherently requests the inclusion of partner-specific information from the cooperating/target federation partner, which is then returned with modifications such that the first file contains partner-specific information for the federation partner. In contrast, the second file is sent to the federation partner as a "full" file which provides partner-specific information from the originating/source federation partner to the cooperating/target federation partner.

Figure 14:
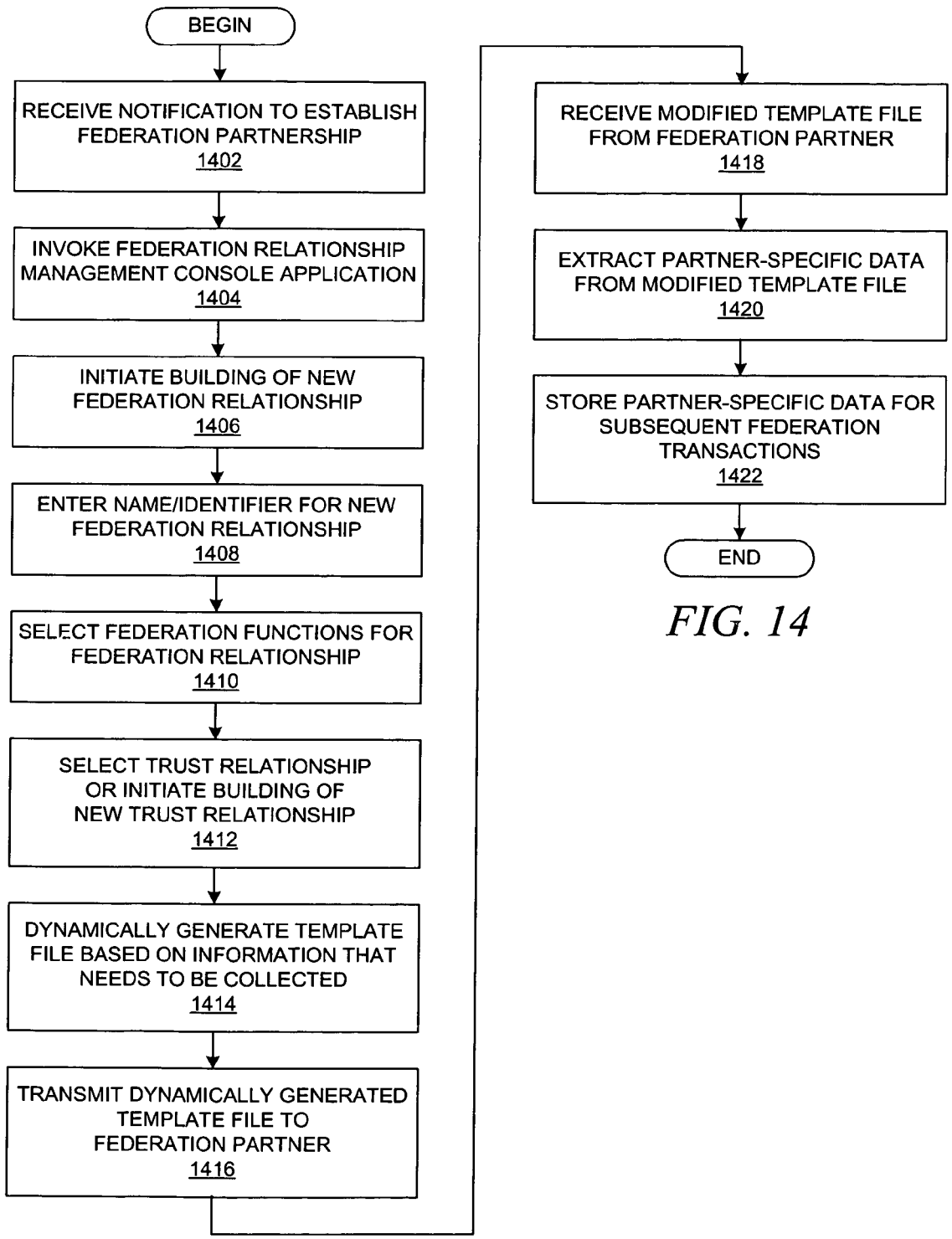
FIG. 14 depicts a flowchart that shows a process by which a federation relationship is established in an automated manner through the use of an exported/imported file that is exchanged between federation partners that will interact through the federation relationship.

With reference to FIG. 14, a flowchart depicts a process by which a federation relationship is established in an automated manner through the use of an exported/imported file that is exchanged between federation partners that will interact through the federation relationship in accordance with an embodiment of the present invention. The process commences when an administrative user with the computing environment of a given enterprise, e.g., identified as Partner "X", receives a notification to establish a federation relationship with trusted business partner, e.g., identified as Partner "Y" (step 1402). Although the notification may be received in some out-of-band manner, this notification is preferably received electronically through email or in some manner within a management console application, such as federation relationship management console application that is shown in FIG. 13A, although this may occur in some manual manner, such as by mail or phone. In general federations often have the notion of a power sponsor, which is a federation partner that will act as the originating/source partner to configure the information for a federation relationship.

If the administrative user has not already done so, the administrative user invokes the federation relationship management console application (step 1404). Alternatively, this functionality might be initiated and/or performed through some workflow-type actions that are started by an application within the computing environment of the originating/source federation partner. Hence, the process that is shown in FIG. 14 could be completely automated, preferably based on policy determinations that are incorporated into the computing environment's infrastructure, e.g., possibly using functionality that is configured to implement WS-Policy specifications.

It should be noted that the process that is shown within FIG. 14 is depicted from the perspective of originating/source federation partner, federation Partner "X", and the process steps that are described with respect to FIG. 14 occur within the computing environment of the cooperating/target federation partner, federation Partner "X"; similar actions may occur at the federation Partner "Y" federation partner in response to receiving information from federation Partner "X", as described in more detail hereinbelow.

The administrative user initiates the configuring or building of a new federation relationship (step 1406) within the federation relationship management console application of federation Partner "X"; the user enters a name or an identifier for the new federation relationship (step 1408), e.g., "Fed-XY-PROJECTX", or it is created automatically based on some set of information, such as the partners that are creating the federation relationship, etc.

If the operation to configure/build the federation relationship is initiated automatically through a workflow process, then the received request message or similar initiating event may contain an indication of the federation functionality that is to be supported within the requested federation relationship; alternatively, or in addition to this, the user can select the appropriate federation functions within the federation relationship management console application (step 1410), e.g., as shown in FIG. 13B, or the received request message can be processed automatically to determine the requested federation functionality.

The user then selects, configures, or builds a trust relationship on which the federation relationship is to be based (step 1412), e.g., as shown in FIG. 13B. If only a single trust relationship exists between the partners, then the trust relationship might be selected automatically; if none of the pre-existing trust relationships are appropriate for the selected federation functionality, then the federation relationship management console application may prompt the user to configure or build a new trust relationship.

As is explained in more detail further below, a trust relationship between two business partners can be configured or built at the same time that a federation partnership is configured or built between those two business partners. Hence, information for configuring a trust relationship can be transferred between the business partners during the same period of time in which information for configuring a federation relationship is transferred.

In contrast, the federation partners that are configuring a federation relationship may already have a trust relationship, though. This trust relationship may have been configured for some other purpose other than for cooperating within a federation. This trust relationship may have been configured through a simple exchange of information; alternatively, this trust relationship may have been configured using other software applications within their respective computing environments but outside of the considerations of the federation. For example, the federation partners may have already exchanged public keys/digital certificates and other trust-related information that they desire to use for any transaction between themselves; this information may have been exchanged through a simple transfer of electronic information, through some other type of software application, or in some other manner.

Moreover, a pre-existing trust relationship may have already been built for the purpose of interacting within the federation. In other words, given that a pair of business partners may cooperate through multiple, concurrent, federation relationships, a trust relationship may have already been built for a previously established federation relationship.

In any case, there may be one or more pre-existing trust relationships between the two business partners that desire to build or configure a new federation relationship, whether or not there is a pre-existing federation relationship between the two partners. If there is at least one pre-existing trust relationship, then the trust-related information in a trust relationship may be logically packaged as a unique, named, trust relationship that can be presented within the federation relationship management console application; if so, then the administrative user may be able to simply select this pre-existing, formally defined, trust relationship within a graphical user interface.

Alternatively, the trust-related information for one or more pre-existing trust relationships may be presented to the administrative user as separate data items of trust-related information within a graphical user interface. In this scenario, the user may construct or build a new trust relationship by selecting the data items that are to be employed within the new trust relationship; for example, a single digital certificate can be employed within multiple trust relationships because other trust-related information with the multiple trust relationships may differ, thereby making the multiple trust relationships unique while the same digital certificate is employed in each.

In yet another alternative, the partners may not have a pre-existing trust relationship. In this scenario, the administrative user enters or chooses the partner's "self" information, i.e. trust information about the originating/source partner; this may be partner-specific information, such as a digital certificate, but it may also include preferred characteristics for the trust relationship that can be represented by simple, non-partner-specific, values that might be specified within various trust-related protocol specifications. For example, the administrative user could choose among multiple asymmetric cryptographic key pairs which the federation relationship establishing console application has retrieved from a keystore within the partner's computing environment; in addition, the user could choose various trust-relationship characteristic parameters through check boxes, radio buttons, menus, etc., within a graphical user interface, wherein these trust-relationship characteristic parameters indicate different processing options with respect to the trust-related information.

Given that a trust relationship requires interaction between partners, the choices of partner-specific, trust-related information along with the choices of various trust-related characteristics would dictate the partner-specific trust-related information that the originating/source partner requires from the cooperating/target partner. In other words, the information that is exchanged between the partners must correspond in some manner. Thus, the choices of the administrative user subsequently results in the inclusion of the originating/source partner's partner-specific trust-relation information within a template/configuration file/files that is/are exported to the cooperating/target partner; in addition, the choices of the administrative user also subsequently results in the inclusion of information-requesting elements within the template/configuration file/files that is/are exported to the cooperating/target partner by the originating/source partner. In some instances, the federation functionality may not require any trust support, so there would be no need to select a trust relationship; since a federation relationship is defined as comprising a trust relationship, in this scenario, the federation relationship can be described as comprising a null trust relationship.

Preferably, the trust relationship and/or the trust relationship information is selected or entered after the federation functionality is selected because certain functionality may be more appropriately associated with certain trust relationships, i.e. certain choices of options with respect to trust-related processing. For example, particular token types may have requirements concerning the encryption or signatures that should be performed on instances of the token type.

After the creation of the federation relationship has been initiated at federation Partner "X", a federation relationship establishing template file is dynamically generated (step 1414); the template file is structured in accordance with the data that needs to be collected from the federation partner, as discussed above with respect to FIG. 13C. The template file is then transmitted to federation Partner "Y" (step 1416), which modifies the received template file to include the required partner-specific information and then returns the modified template file to federation Partner "X". After the modified template file is received (step 1418), the requested partner-specific information is extracted (step 1420) and stored at federation Partner "X" for use during subsequent federation transactions (step 1422), thereby completing the process.

It should be noted that the template file (or within a second file) may contain partner-specific information about Partner "X" that is sent to Partner "Y"; when the template file with the information about federation Partner "X" is sent to federation Partner "Y", this information is imported into the computing environment of federation Partner "Y" to configure the federation relationship at federation Partner "Y"; the importation of information about federation Partner "X" at the computing environment of federation Partner "Y" can be performed automatically such that an administrative user at Partner "Y" does not have to Manually configure the information for the federation relationship.

In yet another alternative embodiment, instead of selecting a previously created trust relationship, the trust relationship may also be built while the federation relationship is being built, possibly using functionality within the trust relationship management console application that is shown in FIG. 11 along with the federation relationship management console application that is shown in FIG. 13A. Alternatively, the federation relationship management console application may also contain functionality for entering trust information from an administrative user or for obtaining trust information from an appropriate datastore, such as a keystore. In this case, the administrative user also enters information or selects information to build a trust relationship on which the federation relationship is based, e.g., by choosing from or entering multiple private keys or multiple certificates. The administrative user's enterprise, e.g., Partner "X", can add this trust information, e.g., a public-key certificate, to a template file or an accompanying file that is transmitted to the federation partner. Likewise, the modified template file that is received from the federation partner may have partner-specific information for building a trust relationship in addition to partner-specific information for building a federation relationship. The trust relationship information would also be extracted from the received file along with the Federation relationship information, and the extracted trust relationship information would be associated with the configuration information for the federation relationship in some manner. It should also be noted that the administrative user may obtain all or a remainder of the trust relationship information and/or federation relationship information from one or more other sources and then enter this information through the federation relationship management console application to configure the desired trust relationship or the desired federation relationship.

Hence, it should be noted that a trust relationship is built in two phases. In a first phase, an administrative user collects all of the trust information for federation Partner "X", e.g., its private keys, that will be used to secure information, e.g., by encryption and/or digital signatures, that will be sent to federation Partner "Y" and/or its other federation partners. If federation Partner "X" has only one set of cryptographic keys, then there may be no choice of trust relationship for the administrative user at federation Partner "X", but the administrative user would have the option of adding new keys when configuring the federation relationship such that the administrative user also configures a new trust relationship.

In a second phase, all of the trust information is collected for federation Partner "Y", e.g., public keys and/or digital certificates, that will be used to validate or verify information that is received from federation Partner "Y". If federation Partner "X" has already stored such information about federation Partner "Y", then the administrative user could use that information; the administrative user may be presented with a list of cryptographic keys, etc., while configuring a trust relationship through a management console application. If federation Partner "X" has not already stored such information about federation Partner "Y", then the administrative user at Partner "X" could use the management console application to choose to add such trust information, such as new keys, at runtime. Alternatively, as mentioned above, the administrative user at federation Partner "X" could choose to import the trust information for federation Partner "Y" through a partner-specific configuration file, after which the appropriate application at federation Partner "X" would automatically update the trust information about federation Partner "Y" in a datastore at federation Partner "X", thereby establishing a trust relationship between the two federation partners.

CONCLUSION

The advantages of the present invention should be apparent in view of the detailed description of the invention that is provided above. The present invention leverages the existing environment in which a federated user lifecycle management solution is to be integrated. The federated user lifecycle management application can be easily modified to support new protocols/standards as they evolve with minimal changes to the overall infrastructure. Any changes that might be required to support new federated user lifecycle management functionality are located almost exclusively within the federated user lifecycle management application, which would require configuring the federated user lifecycle management application to understand the added functionality.

There may be minimal configuration changes in other federated components, e.g., at a point-of-contact server in order to allow the overall infrastructure to be able to invoke new federated user lifecycle management functionality while continuing to support existing federated user lifecycle management functionality. However, the federated user lifecycle management applications are functionally independent from the remainder of the federated components in that the federated user lifecycle management applications do not require interaction with other federated components of the federated environment.

Hence, an existing environment needs minimal modifications to support federated user lifecycle management functionality when implemented in accordance with the present invention. Moreover, changes to federated user lifecycle management functionality, including the addition of new functionality, has minimal impact on an existing federated environment. Thus, when a new single-sign-on standard is published, support for this standard is easily added.

Among the advantages of the present invention, the trust proxies allow the pre-existing security services in a given domain to establish trust relationships with other domains without having to subscribe to the same trust root or use the same trust-establishment technology. Hence, the federated architecture of the present invention provides a loose coupling of entities. Federations allow users to seamlessly traverse different sites within a given federation in a single-sign-on fashion.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for providing federated functionality within a data processing system, the method comprising:
    configuring one or more pluggable modules into a federated user lifecycle management functionality with a federated computing environment, each of the pluggable modules having associated therewith a set of one or more runtime parameters to be used during federation transactions;
    receiving an incoming request at point-of-contact functionality within a domain, wherein the domain is associated with a plurality of domains within the federated computing environment;
    analyzing an incoming request with the point-of-contact functionality;
    in response to a determination that the received request is directed to accessing a resource that is controlled by resource accessing functionality without the request requiring processing by federated user lifecycle management functionality, sending the received request from the point-of-contact functionality to the resource accessing functionality; and
    in response to a determination that the received request requires processing by federated user lifecycle management functionality, sending the received request from the point-of-contact functionality to the federated user lifecycle management functionality, wherein the federated user lifecycle management functionality invokes one of the pluggable modules and its associated runtime parameters to provide a federated user lifecycle management function during a federation transaction;
    wherein the pluggable modules enable the federated user lifecycle management functionality to support multiple, simultaneous, federated user lifecycle management functions on an as-needed basis without requiring changes to an existing infrastructure.

2. The method of claim 1 wherein the point-of-contact functionality and the federated user lifecycle management functionality are implemented on the same server and the received request is sent from the point-of-contact functionality to the federated user lifecycle management functionality indirectly via a redirect through an application that generates the incoming request.

3. The method of claim 1 wherein the point-of-contact functionality and the federated user lifecycle management functionality are implemented within the same application.

4. The method of claim 1 wherein the point-of-contact functionality and the federated user lifecycle management functionality are implemented within the same domain.

5. The method of claim 1 further comprising:
    analyzing a received request message;
    invoking the resource accessing functionality to process a request that is received by the point-of-contact functionality which requests access to a controlled resource; and
    invoking the federated user lifecycle management functionality to process a request that is received by the point-of-contact functionality which requests or requires access to a federated user lifecycle management function.

6. The method of claim 1 wherein a pluggable module supports a federation protocol in accordance with a WS-Federation specification.

7. The method of claim 1 wherein a pluggable module supports a federation protocol in accordance with a Liberty Alliance specification.

8. The method of claim 1 wherein a pluggable module supports a federation protocol in accordance with a SAML (Security Assertion Markup Language) specification.

9. The method of claim 1 wherein a pluggable module supports a federation protocol in accordance with a proprietary specification.

10. The method of claim 1 further comprising:
    supporting a federation protocol at a first pluggable module in accordance with a first federation protocol profile; and
    supporting a federation protocol at a second pluggable module in accordance with a second federation protocol profile.

11. An apparatus for providing federated functionality within a data processing system, the apparatus comprising:
    a processor;
    a computer memory holding computer program instructions which when executed by the processor perform a method comprising:
    configuring one or more pluggable modules into a federated user lifecycle management functionality with a federated computing environment, each of the pluggable modules having associated therewith a set of one or more runtime parameters to be used during federation transactions;
    receiving an incoming request at point-of-contact functionality within a domain, wherein the domain is associated with a plurality of domains within the federated computing environment;
    analyzing an incoming request with the point-of-contact functionality;
    sending, in response to a determination that the received request is directed to accessing a resource that is controlled by resource accessing functionality, the received request from the point-of-contact functionality to the resource accessing functionality; and
    sending, in response to a determination that the received request is directed to accessing federated user lifecycle management functionality, the received request from the point-of-contact functionality to the federated user lifecycle management functionality, wherein the federated user lifecycle management functionality responds to requests for access to federated user lifecycle management functions by invoking one of the pluggable modules and its associated runtime parameters to provide a federated user lifecycle management function during a federation transaction;
    wherein the pluggable modules enable the federated user lifecycle management functionality to support multiple, simultaneous, federated user lifecycle management functions on an as-needed basis without requiring changes to an existing infrastructure.

12. The apparatus of claim 11 wherein the point-of-contact functionality and the federated user lifecycle management functionality are implemented on the same server.

13. The apparatus of claim 11 wherein the point-of-contact functionality and the federated user lifecycle management functionality are implemented within the same application.

14. The apparatus of claim 11 wherein the point-of-contact functionality and the federated user lifecycle management functionality are implemented within the same domain.

15. The apparatus of claim 11 wherein the method further comprises:
- analyzing a received request message;
- invoking the resource accessing functionality to process a request that is received by the point-of-contact functionality which requests access to a controlled resource; and
- invoking the federated user lifecycle management functionality to process a request that is received by the point-of-contact functionality which requests access to a federated user lifecycle management function.

16. The apparatus of claim 11 wherein a pluggable module supports a federation protocol in accordance with a WS-Federation specification.

17. The apparatus of claim 11 wherein a pluggable module supports a federation protocol in accordance with a Liberty Alliance specification.

18. The apparatus of claim 11 wherein a pluggable module supports a federation protocol in accordance with a SAML (Security Assertion Markup Language) specification.

19. The apparatus of claim 11 wherein a pluggable module supports a federation protocol in accordance with a proprietary specification.

20. The apparatus of claim 11 wherein the method further comprises:
- supporting a federation protocol at a first pluggable module in accordance with a first federation protocol profile; and
- supporting a federation protocol at a second pluggable module in accordance with a second federation protocol profile.

21. A computer program product on a computer storage medium for use in a data processing system for providing federated functionality, the computer program product holding computer program instructions which when executed by the data processing system perform a method comprising:
- configuring one or more pluggable modules into a federated user lifecycle management functionality with a federated computing environment, each of the pluggable modules having associated therewith a set of one or more runtime parameters to be used during federation transactions;
- receiving an incoming request at point-of-contact functionality within a domain, wherein the domain is associated with a plurality of domains within the federated computing environment;
- analyzing an incoming request with the point-of-contact functionality;
- sending, in response to a determination that the received request is directed to accessing a resource that is controlled by resource accessing functionality, the received request from the point-of-contact functionality to the resource accessing functionality; and
- sending, in response to a determination that the received request is directed to accessing federated user lifecycle management functionality, the received request from the point-of-contact functionality to the federated user lifecycle management functionality, wherein the federated user lifecycle management functionality responds to requests for access to federated user lifecycle management functions by invoking one of the pluggable modules and its associated runtime parameters to provide a federated user lifecycle management function during a federation transaction;
- wherein the pluggable modules enable the federated user lifecycle management functionality to support multiple, simultaneous, federated user lifecycle management functions on an as-needed basis without requiring changes to an existing infrastructure.

22. The computer program product of claim 21 wherein the point-of-contact functionality and the federated user lifecycle management functionality are implemented on the same server.

23. The computer program product of claim 21 wherein the point-of-contact functionality and the federated user lifecycle management functionality are implemented within the same application.

24. The computer program product of claim 21 wherein the point-of-contact functionality and the federated user lifecycle management functionality are implemented within the same domain.

25. The computer program product of claim 21 wherein the method further comprises:
- analyzing a received request message;
- invoking the resource accessing functionality to process a request that is received by the point-of-contact functionality which requests access to a controlled resource; and
- invoking the federated user lifecycle management functionality to process a request that is received by the point-of-contact functionality which requests access to a federated user lifecycle management function.

26. The computer program product of claim 21 wherein a pluggable module supports a federation protocol in accordance with a WS-Federation specification.

27. The computer program product of claim 21 wherein a pluggable module supports a federation protocol in accordance with a Liberty Alliance specification.

28. The computer program product of claim 21 wherein a pluggable module supports a federation protocol in accordance with a SAML (Security Assertion Markup Language) specification.

29. The computer program product of claim 21 wherein a pluggable module supports a federation protocol in accordance with a proprietary specification.

30. The computer program product of claim 21 wherein the method further comprises:
- supporting a federation protocol at a first pluggable module in accordance with a first federation protocol profile; and
- supporting a federation protocol at a second pluggable module in accordance with a second federation protocol profile.

31. A data processing system comprising:
- a management application having an associated interface for configuring one or more pluggable modules into a federated user lifecycle management functionality with a federated computing environment, each of the pluggable modules having associated therewith a set of one or more runtime parameters to be used during federation transactions;
- a point-of-contact server, wherein the point-of-contact server receives incoming requests directed to a domain, wherein the domain is associated with a plurality of domains within the federated computing environment;
- a first application server that interfaces with the point-of-contact server, wherein the first application server responds to requests for access to controlled resources; and a second application server that interfaces with the point-of-contact server, wherein the second application server responds to requests for access to federated user lifecycle management functions by invoking one of the pluggable modules and its associated runtime parameters to provide a federated user lifecycle management function during a federation transaction;

wherein the pluggable modules enable the federated user lifecycle management functionality to support multiple, simultaneous, federated user lifecycle management functions on an as-needed basis without requiring changes to an existing infrastructure.

32. The data processing system of claim 31 wherein the point-of-contact server further comprises:

a processor;

a computer memory holding computer program instructions which when executed by the processor perform a method comprising:

analyzing a received request message;

invoking the first application server to process a request that is received by the point-of-contact server which requests access to controlled resources; and invoking the second application server to process requests that are received by the point-of-contact server which request access to federated user lifecycle management functions.

33. The data processing system of claim 31 wherein a pluggable module supports a federation protocol in accordance with a WS-Federation specification.

34. The data processing system of claim 31 wherein a pluggable module supports a federation protocol in accordance with a Liberty Alliance specification.

35. The data processing system of claim 31 wherein a pluggable module supports a federation protocol in accordance with a SAML (Security Assertion Markup Language) specification.

36. The data processing system of claim 31 wherein a pluggable module supports a federation protocol in accordance with a proprietary specification.

37. The data processing system of claim 31 further comprising:

a first pluggable module for supporting a federation protocol in accordance with a first federation protocol profile; and a second pluggable module for supporting a federation protocol in accordance with a second federation protocol profile.

38. The data processing system of claim 31 further comprising:

a trust proxy, wherein the trust proxy generates security assertions sent from the domain and validates security assertions received at the domain.

39. The data processing system of claim 38 wherein the second application server invokes the trust proxy to generate secure messages that contain a request or a response.

40. The data processing system of claim 38 wherein the trust proxy maintains trust relationships with different domains within the federated computing environment.

41. The data processing system of claim 38 wherein the trust proxy interoperates with a trust broker to obtain assistance in translating an assertion that has been received from a different domain within the federated computing environment.

* * * * *